United States Patent [19]

Okamoto et al.

[11] Patent Number: 6,088,481
[45] Date of Patent: Jul. 11, 2000

[54] HANDWRITTEN CHARACTER INPUT DEVICE ALLOWING INPUT OF HANDWRITTEN CHARACTERS TO ARBITRARY APPLICATION PROGRAM

[75] Inventors: Masayoshi Okamoto, Gifu; Kazuhiro Ieda, Osaka; Hiroshi Horii, Gifu, all of Japan

[73] Assignee: Sanyo Electric Co., Ltd., Moriguchi, Japan

[21] Appl. No.: 08/497,553

[22] Filed: Jun. 30, 1995

[30] Foreign Application Priority Data

Jul. 4, 1994 [JP] Japan ................................. 6-152210

[51] Int. Cl.⁷ ........................................................ G06K 9/00
[52] U.S. Cl. ............................ 382/189; 345/346; 345/358
[58] Field of Search .................................. 382/187, 189, 382/179; 708/107, 141; 345/340, 342, 345, 346, 358, 145, 179

[56] References Cited

U.S. PATENT DOCUMENTS

| | | | |
|---|---|---|---|
| 4,890,098 | 12/1989 | Dawes et al. | 340/721 |
| 5,148,155 | 9/1992 | Martin et al. | 340/712 |
| 5,361,310 | 11/1994 | Ishigaki | 382/187 |
| 5,448,475 | 9/1995 | Senoo et al. | 364/419.1 |
| 5,502,461 | 3/1996 | Okamoto et al. | 382/187 |
| 5,550,930 | 8/1996 | Berman et al. | 382/187 |
| 5,559,942 | 9/1996 | Gough et al. | 395/155 |
| 5,566,248 | 10/1996 | Ulrich | 382/187 |
| 5,583,543 | 12/1996 | Takahashi et al. | 345/173 |
| 5,655,136 | 8/1997 | Morgan | 382/182 |
| 5,784,504 | 7/1998 | Anderson et al. | 382/309 |
| 5,848,187 | 12/1998 | Bricklin et al. | 382/187 |

FOREIGN PATENT DOCUMENTS

| | | | |
|---|---|---|---|
| 5-127824 | 5/1993 | Japan | G06F 3/033 |
| 5-197478 | 8/1993 | Japan | G06F 3/03 |

OTHER PUBLICATIONS

Nikkei Electronics, Apr. 15, 1991 (No. 525), pp. 115–133.

*Primary Examiner*—Andrew W. Johns
*Attorney, Agent, or Firm*—Armstrong, Wetserman, Hattorri, McLeland & Naughton

[57] ABSTRACT

Based on handwriting coordinate data input by a pen at an arbitrary position on a screen, a handwriting display portion displays a handwriting at the writing position. A recognition portion recognizes a written character or an editing symbol. A handwriting erase portion erases the handwriting, and returns the screen to a state before writing. A recognition result output portion supplies the recognition result to an application program having a keyboard focus in the same form as that of keyboard input. As a result, a character or the like can be directly written at an arbitrary position on a window displayed by the application program or on the screen, and input or editing can be carried out.

19 Claims, 50 Drawing Sheets

PRIOR ART

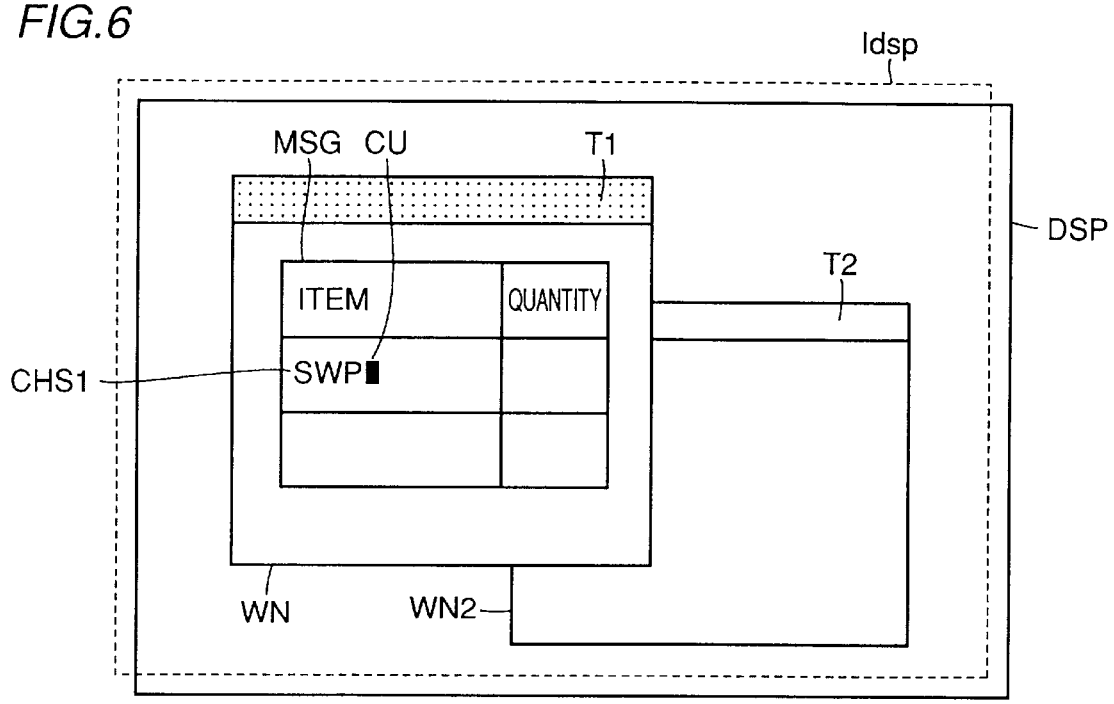

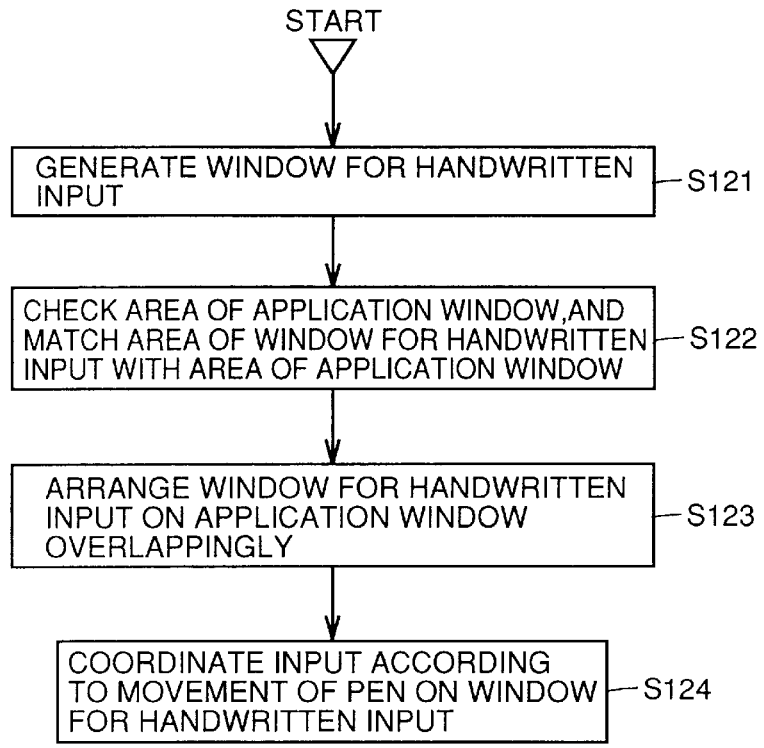
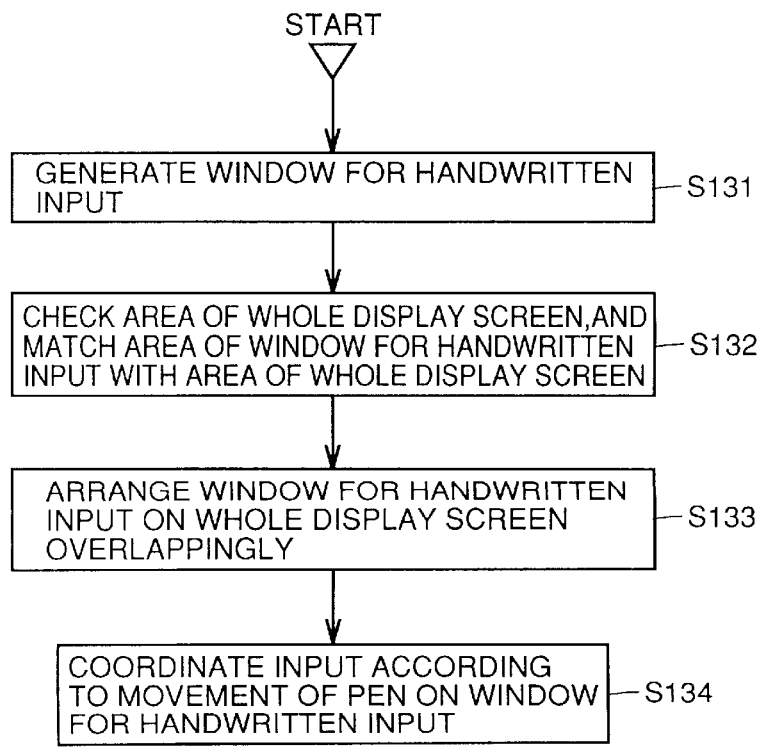

HANDWRITTEN CHARACTER INPUT DEVICE ALLOWING INPUT OF HANDWRITTEN CHARACTERS TO ARBITRARY APPLICATION PROGRAM

BACKGROUND OF THE INVENTION

1. Field of the Invention

The present invention generally relates to handwritten character input devices, and more particularly, to a handwritten character input device provided with a system program for operating in response to pen input usable with an application program adapted to mouse input and keyboard input and not adapted to pen input. More specifically, the present invention relates to a handwritten character input device such as a pen input type computer including a handwritten character recognition function not in the application program but in the system program.

2. Description of the Background Art

In preparing a sentence using a general computer, software for preparing a sentence is read, and the computer is operated according to the software. This software corresponds to an application program, and keyboards and mouses are used as its general input devices.

On the other hand, a computer has been recently proposed which carries out input operation with a pen type input device (hereinafter referred to as a "pen"). In this computer, characters are input and edited by designating a position by means of a pen, or by recognizing characters and editing symbols (such as a calibration symbol and a gesture) written with a pen, instead of a keyboard or a mouse. Such a pen input type computer is described in the article entitled "Birth of Handwritten Input OS", Nikkei Electronics of Apr. 15, 1991 (No. 525), pp. 115–133, published by Nikkei B P, Ltd., and known generally.

Actual operation of a pen input type computer is divided into the following two cases. The first case is to operate the pen input type computer by launching only a specific program using a function, library, or the like for pen input only. More specifically, the first case uses a program for pen input only. In this case, an area in which a character or an editing symbol can be written is designated by using a library, function, or the like for pen input only. When the area allowing writing is designated, the user can write a character or a symbol in this area. Then, the written character or symbol is recognized, and each processing such as input and editing is carried out based on the result of recognition.

Description will be given of a specific example of the above case with reference to FIGS. 1A and 1B. FIG. 1A shows a state at the time of writing, and FIG. 1B shows a state where the result of recognition is displayed after writing.

Referring to FIGS. 1A and 1B, DSP indicates a display screen, LWN indicates a window generated by an application program, LMSG indicates a message displayed by the application program, LAR indicates a writing area, LHS indicates a handwriting, and LRC indicates the result of recognition of the handwriting.

Referring to FIG. 1A, the application program declares the size of the writing area LAR (length, width, and position (upper left position on the area)) by a library for pen input only. The system program detects coordinate data of the handwriting LHS written in the writing area LAR, and displays the handwriting LHS in the writing area LAR.

By detecting no other operation for a prescribed time, completion of writing is determined. As shown in FIG. 1B, the handwriting LHS is recognized, and a character code of the recognition result LRC is supplied to the application program as a result of the library (function) for pen input only. Based on the recognition result, the application program displays the recognition result, that is, characters "ABC" in the figure.

In FIGS. 1A and 1B, one writing area LAR is set. However, a plurality of writing areas can be set. When a pen is operated outside the writing area LAR, the system program supplies the coordinate to the application program in the same form as that of mouse input.

The second case of the actual operation will now be described. In the second case, a pen is operated as an input device without changing the existing application program using a keyboard or a mouse as an input device. More specifically, in order to use pen input with the existing application program not adapted for pen input, a system program processing the pen input is used.

In this case, a system program for pen input called FEP (Front End Processor) or pen input OS (Operating System) displays a special writing frame for writing a character or an editing symbol. When a character or an editing symbol is written in this writing frame, the character or editing symbol is recognized, and the recognition result is supplied to a window (application program) having a keyboard focus in the same form as that of keyboard input. As a result, the application program receives the recognition result of the character or editing symbol, and carries out various processings such as input and editing based on the recognition result.

A window having a "keyboard focus" refers to a window to which key input is applied through a keyboard when a plurality of application program windows are opened in a multi-window system. The window having a keyboard focus is generally set by clicking a mouse after positioning a mouse cursor in a desired window.

A specific example of the above described second case is shown in FIGS. 2A to 2C. FIG. 2A shows a state before writing, FIG. 2B shows a state where a recognition result is displayed after writing, and FIG. 2C shows a state where an application program receives and displays the recognition result.

Referring to FIGS. 2A to 2C, FWN1 and FWN2 show windows generated by a first application program and a second application program, respectively. FMSG1 indicates the content of a message displayed by the first application program, and FCU indicates a cursor for character input. FWNP indicates a window of FEP. FWK1 to FWK3 each indicate a writing frame for writing a character, which also serves as an area displaying a recognition result. FHS1 to FHS3 each indicate handwriting display. FRC1 to FRC3 each indicate the recognition result. FCH1 to FCH3 each indicate a character input based on the recognition result. FRBT indicates a button for supplying the recognition result to the application program.

As shown in FIG. 2A, when characters are written in the writing frames FWK1 to FWK3, FEP displays the respective handwritings FHS1 to FHS3. FEP determines change of the writing frames in which characters are written and no other operation for a prescribed time as completion of writing, and displays the recognition results FRC1 to FRC3 as shown in FIG. 2B. When the button FRBT is touched with a pen, FEP supplies a character train of the recognition results FRC1 to FRC3 to a window having a keyboard focus in the same form as that of keyboard input.

When the window FWN1 has a keyboard focus, FEP supplies the character train of the recognition results FRC1 to FRC3 to the window FWN1, and the first application program receives the recognition results FRC1 to FRC3. As a result, as shown in FIG. 2C, the first application program displays the same character train of FCH1 to FCH3 as that of the recognition results FRC1 to FRC3 at the cursor position FCU. After supplying the recognition results FRC1 to FRC3 to the application program, FEP erases the characters in the writing frames FWK1 to FWK3, and prepares for the next writing.

Supplying pen input converted into keyboard input or mouse input to an application program is described in Japanese Patent Laying-Open Nos. 5-197478, 5-127824, and the like, and well known. An actual pen input OS such as "Windows for Pen Computing" of Microsoft Corporation in the United States carries out processing for outputting a handwriting coordinate of a pen to an application program in the same form as that of mouse input in order to operate with a pen the existing application program using a keyboard or a mouse as an input device. As a result, operation equivalent to that of a keyboard or a mouse is carried out with a pen. The processing using a pen for carrying out operation equivalent to the case of keyboard input is called keyboard emulation. The processing using a pen for carrying out operation equivalent to the case of mouse input is called mouse emulation.

As described above, in the example of the second case, the processing of pen input is left to the system program. Therefore, a conventional existing application program can be used without changing. However, as shown in FIGS. 2A to 2C, writing characters in the writing frame FWNP positioned distant from a desired input position (the cursor FCU position) gives the user uncomfortableness, and the operation is troublesome. Therefore, the above described "Windows for Pen Computing" provides a library only for implementing a circumstance in which writing can be directly carried out in a window. Development of a new application program using the library would allow pen input directly to a window.

As described above, in the existing application program for keyboard input and mouse input and not for pen input, it was not possible to carry out direct pen input in a window displayed by the application program. Further, in order to implement this, it was necessary to write a new application program adapted to pen input.

In addition, as described above, many of the existing application programs use a keyboard or a mouse as an input device. In operating such an existing application program with a pen, it is desired to directly write a character or the like at an arbitrary position in a window displayed by the application program or in a screen.

SUMMARY OF THE INVENTION

One object of the present invention is to provide a handwritten character input device which can carry out input and editing by directly writing a character or the like at an arbitrary position in a window displayed by an existing application program or in a display screen without changing the application program.

A handwritten character input device according to one aspect of the present invention recognizes a handwritten character and outputs a code corresponding to the recognized handwritten character to a prescribed application program not adapted to handwritten input, including an input device for inputting a handwritten character, a display unit displaying a first window displayed by the application program in a prescribed display screen, and a setting unit setting on the first window a second window allowing input of a handwritten character with the display content of the first window visually recognized.

Because of the above described configuration, the second window allowing input of a handwritten character can be displayed on the first window with the display content of the first window visually recognized. Therefore, it is possible to directly write a character or the like at an arbitrary position in the first window displayed by the existing application program or in the display screen without changing the application program. Therefore, input and editing can be carried out with ease.

A handwritten character input device according to another aspect of the present invention recognizes a handwritten character and outputs a code corresponding to the recognized handwritten character to a prescribed application program among a plurality of application programs not adapted to handwritten input, including a pen type input device for inputting a handwritten character, an identification unit identifying a handwritten character written by the input device and generating a code corresponding to the identified handwritten character, and an output unit outputting the code generated by the identification unit to an application program having a keyboard focus among the plurality of application programs.

Because of the above described configuration, the code corresponding to a handwritten character can be output to the application program having a keyboard focus. Therefore, it is possible to input a handwritten character written at an arbitrary position to the application program having a keyboard focus. As a result, it is possible to carry out input and editing with ease by directly writing a character or the like at an arbitrary position in a window displayed by the existing application program or in a screen without changing the application program.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is diagram for explaining third writing operation to an arbitrary position according to this embodiment.

FIG. 31 is a flow chart for explaining operation for matching an area of the window for handwritten input with an area of an application window according to this embodiment.

FIG. 32 is a flow chart for explaining display operation for displaying the window for handwritten input in the whole area of a display screen according to this embodiment.

DESCRIPTION OF THE PREFERRED EMBODIMENTS

Figure 1A:
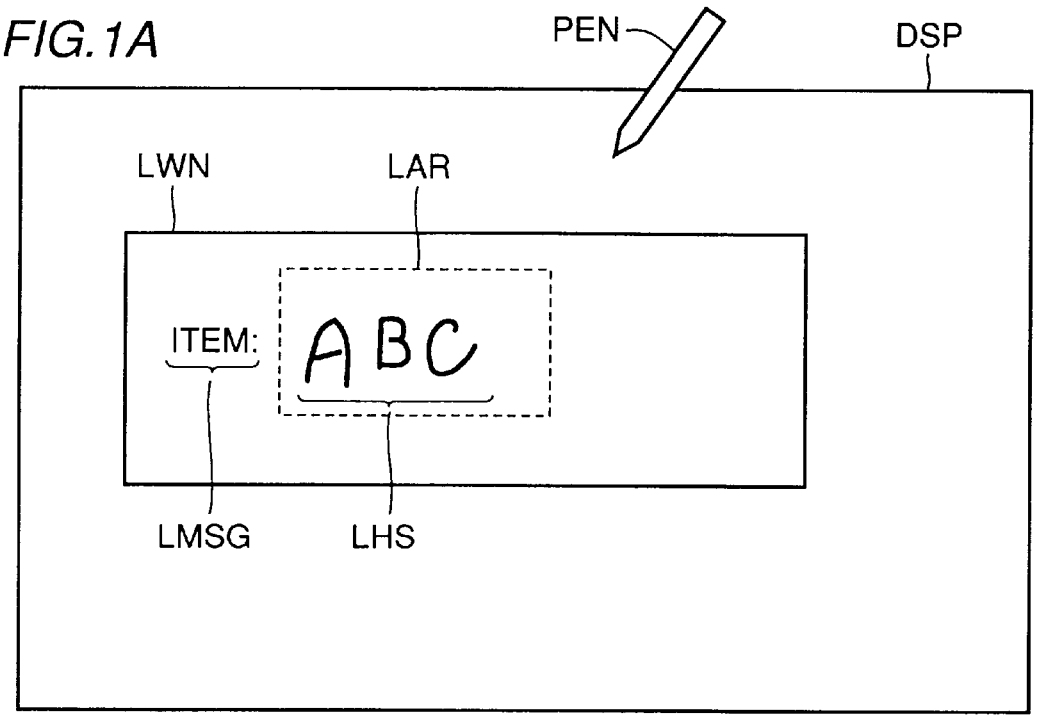
FIGS. 1A and 1B are diagrams for explaining a first conventional technique.
Figure 1B:
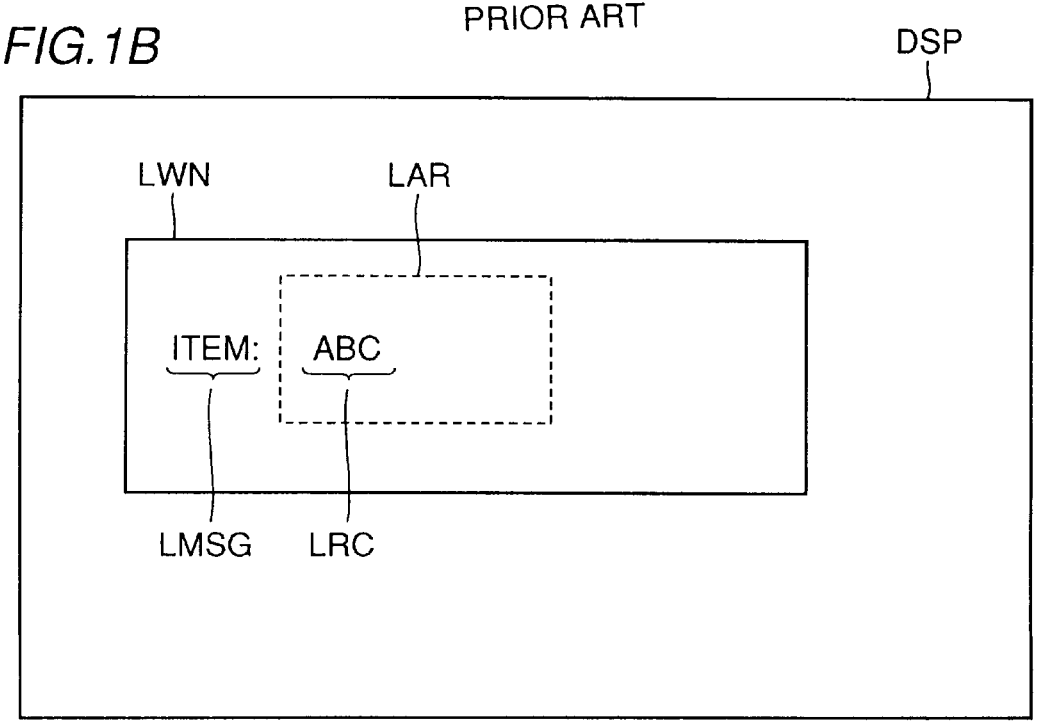
Figure 2A:
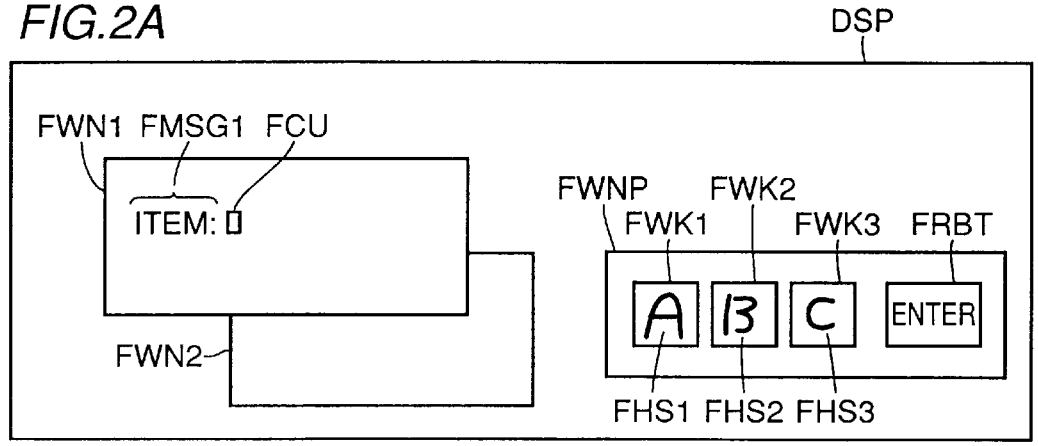
FIGS. 2A to 2C are diagrams for explaining a second conventional technique.
Figure 2B:
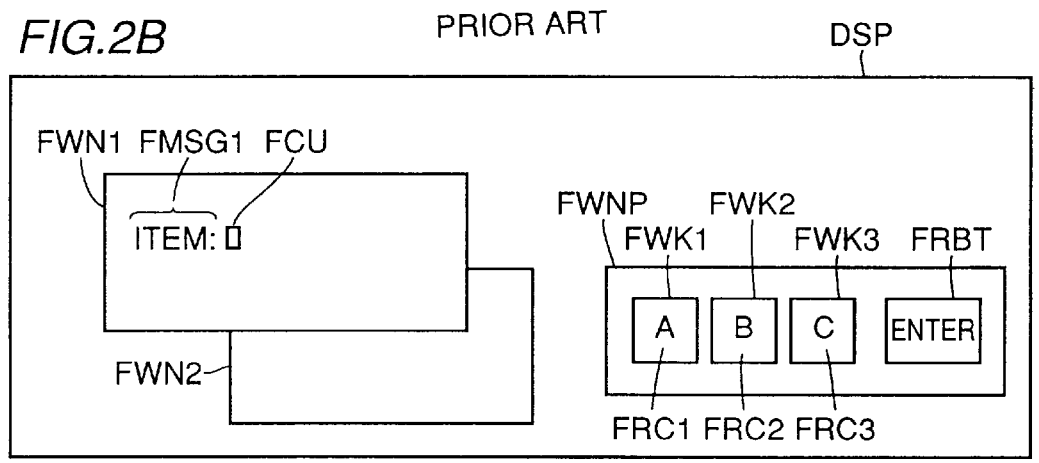
Figure 2C:
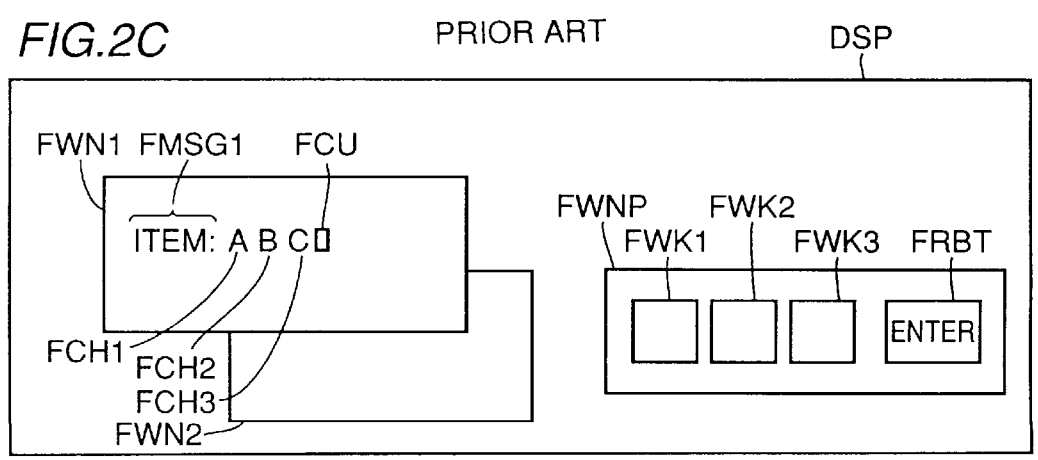
Figure 3:
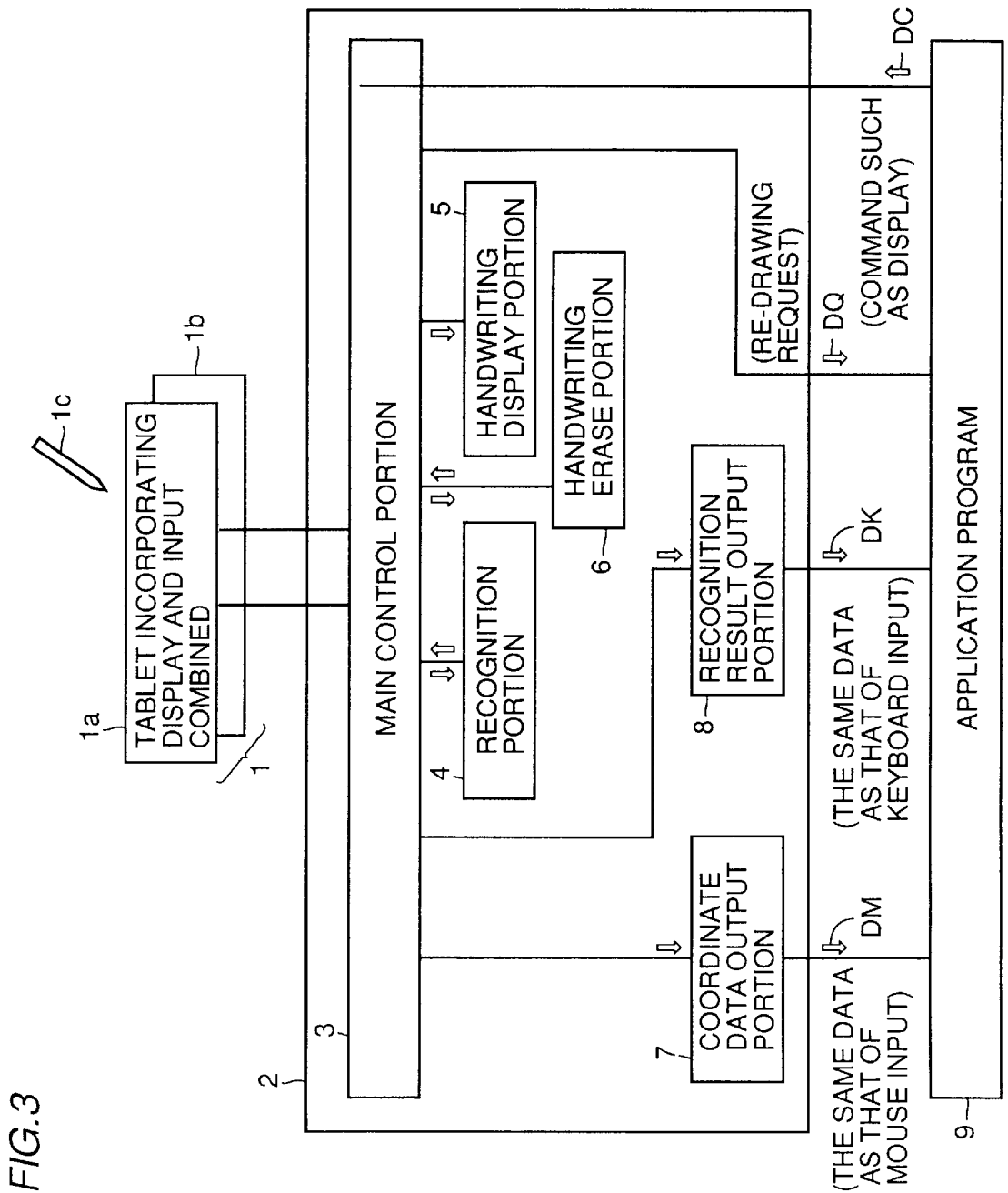
FIG. 3 is a block diagram functionally showing the configuration of a handwritten character input device according to one embodiment of the present invention.

Referring to FIGS. 3 to 28, description will be given of a handwritten character input device according to one embodiment of the present invention. FIG. 3 is a block diagram functionally showing the configuration of the handwritten character input device according to one embodiment of the present invention, which uses an FEP (Front End Processor).

Referring to FIG. 3, a tablet 1 incorporating display and input combined (hereinafter referred to as a "tablet") is formed by integrating an LCD display unit 1a (hereinafter referred to as a "display portion"), and a coordinate detecting portion 1b for detecting a coordinate of a position pointed by a pen 1c. The coordinate on display portion 1a is in one to one correspondence with the coordinate on coordinate detecting portion 1b.

FEP control portion 2 carries out operations such as display of a handwriting on tablet 1, output of the result of recognition to an application program 9, and control of display of tablet 1 according to the request of application program 9. FEP control portion 2 and application program 9 are configured of software. The software of the FEP program is a computer program product comprising a computer usable recording medium. The software is supplied in the form of floppy disk, ROM, CD-ROM, or the like. The computer usable recording medium has a computer readable program code. The computer readable program code causes a computer to effect the function of FEP control portion 2. For simplicity of description, one application program 9 is shown in FIG. 3. However, there may be a plurality of application programs. By selecting one application program among the plurality of application programs, data may be transferred to and from the selected application program.

FEP control portion 2 includes a main control portion 3, a recognition portion 4, a handwriting display portion 5, a handwriting erase portion 6, a coordinate data output portion 7, and a recognition result output portion 8. When a character is written by hand on tablet 1, main control portion 3 receives handwriting coordinate data from tablet 1 (coordinate detecting portion 1b). If the device is in a mouse emulation mode at this time, main control portion 3 transfers the handwriting coordinate data to coordinate data output portion 7. Coordinate data output portion 7 outputs the received handwriting coordinate data to an application program of a window having a writing position in the same form as that of mouse input (shown by DM in the figure).

If the device is in a character input and editing mode, main control portion 3 first outputs the handwriting coordinate data to handwriting display portion 5. Handwriting display portion 5 displays the handwriting at a handwriting position based on the handwriting coordinate data. At this time, handwriting display portion 5 sets a handwriting display area of a prescribed size allowing display of handwriting of a plurality of characters at a writing start position at the time of start of writing, and displays the handwriting in the area.

Main control portion 3 determines completion of writing upon detection of no other operation for a prescribed time, and outputs the handwriting coordinate data to recognition portion 4. Based on the handwriting coordinate data, recognition portion 4 recognizes a character or an editing symbol, and outputs the result of recognition to main control portion 3. Main control portion 3 receives the result of recognition, and makes an erasing request to handwriting erase portion 6. Upon reception of the request, handwriting erase portion 6 erases the handwriting display area. Then, handwriting display portion 5 outputs a re-drawing request DQ to application program 9 through main control portion 3. The re-drawing request DQ is made using an event of a window system (which corresponds to an Expose event in an X window system). It should be noted that the X window system is a window system developed by Massachusetts Institute of Technology in the United States.

Upon reception of the re-drawing request DQ, application program 9 re-draws a screen (screen displayed by the application program) in the erased handwriting display area. The screen of the handwriting display area is now in a state before writing, that is, in a state where only the handwriting is erased. Then, main control portion 3 outputs a code corresponding to a character or an editing symbol, which is the received recognition result, to application program 9 of a window having a keyboard focus in the same form as that of keyboard input. Application program 9 receives the recognition result, and carries out input and editing based on the result.

Description will now be given of operation of the handwritten character input device of this embodiment with reference to FIGS. 4A to 28. FIGS. 4A to 6 are diagrams showing an example of operation when a character is written at an arbitrary position in a display screen. Referring to FIGS. 4A to 6, DSP denotes a display screen, WN denotes a window displayed by one application program, and WN2 denotes a window displayed by another application program.

T1 and T2 each denote a title bar of a window manager (a program controlling movement of the window or change of the size). T1 and T2 are displayed on the application windows WN and WN2, respectively. Touching the title bars T1 and T2 with a pen and moving the pen as it is cause the corresponding windows WN and WN2 to move with the movement of the pen. This operation corresponds to the dragging operation of a mouse. The title bar T1 displayed in the window WN having a keyboard focus is highlighted by the window manager.

Figure 4A:
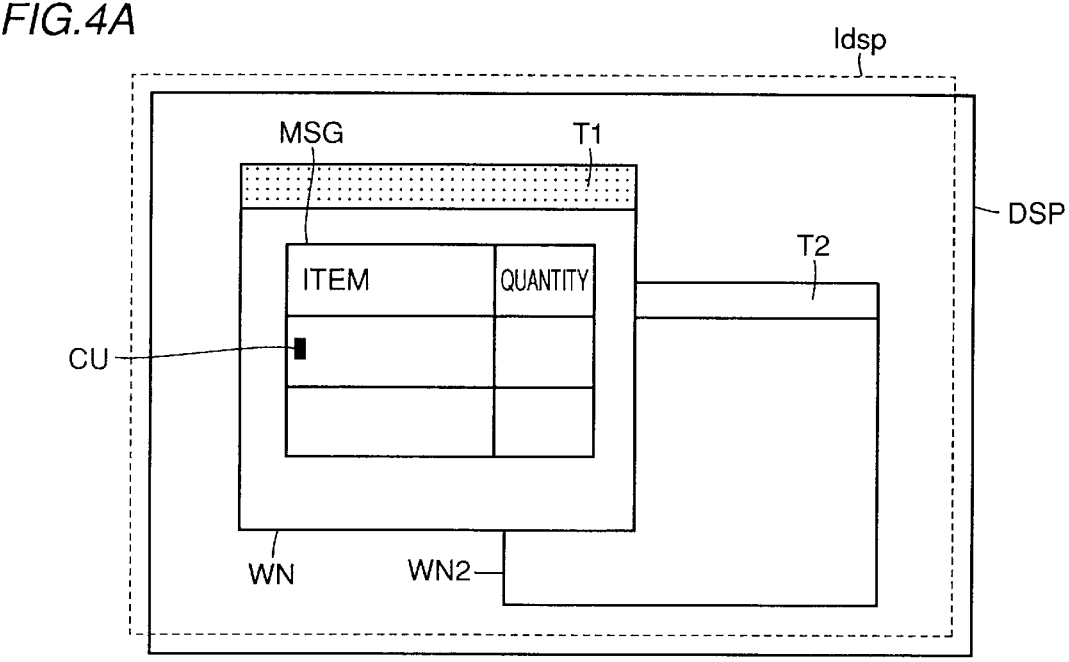
FIGS. 4A and 4B are diagrams for explaining first writing operation to an arbitrary position according to this embodiment.

FIG. 4A shows a state where the application program displays an image MSG including a graph and characters, and character writing is instructed by touching a specific area (a fixed menu area outside a display area) on the tablet with a pen.

Referring to FIG. 4A, CU indicates a cursor displayed by the application program. In this embodiment, when character writing is instructed, a window Idsp (transparent window) for handwriting coordinate input in the same size as the display screen DSP is opened at the same position as the display screen DSP. The window Idsp is positioned uppermost among windows displayed in a overlapping manner. The processing of determining to which window among the plurality of windows the coordinate input corresponds is carried out from the upper window to the lower window sequentially. The determining processing is generally carried out in the window system. In this embodiment, the window Idsp is positioned uppermost, and the coordinate input to the window Idsp is determined as writing of a character or an editing symbol. As shown in FIG. 4A, by opening the window Idsp for handwriting coordinate input in the same size and at the same position as the display screen, the coordinate input to any position in the display screen is determined as writing of a character or a gesture.

Figure 4B:
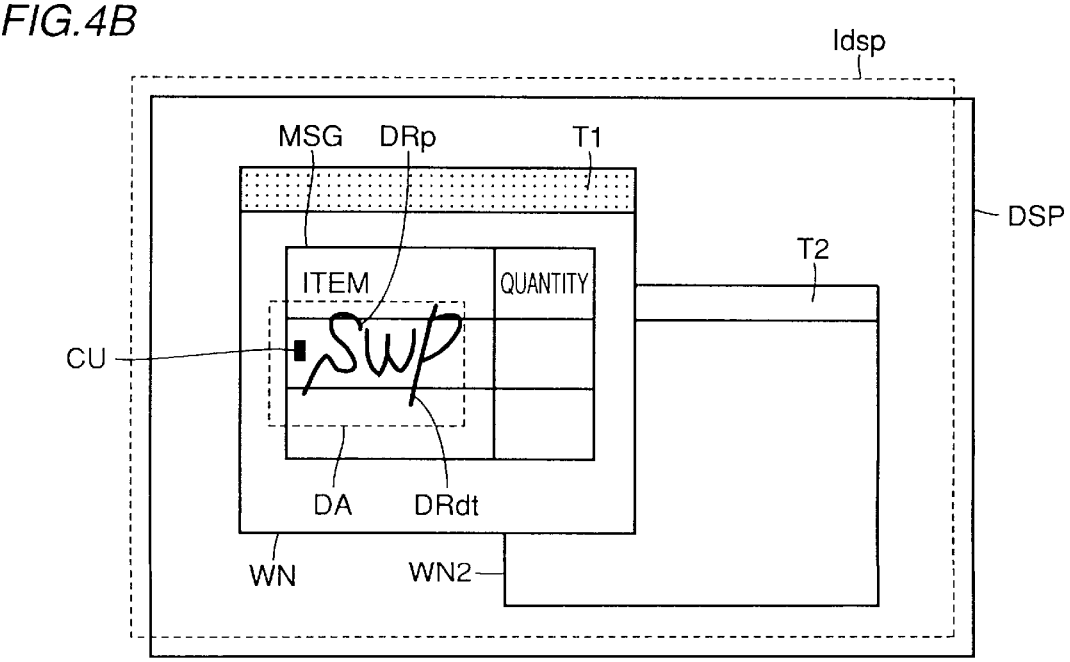

FIG. 4B shows a state where characters "SWP" are written. When writing is started, a handwriting display area DA is generated. The handwriting display area DA is set to a prescribed size allowing writing of several characters as an initial value, and the position of the handwriting display area DA is set upper left of a writing start point DRp. A handwriting DRdt is displayed on the handwriting display area DA. It is determined that writing is completed upon detection of no other operation for a prescribed time after writing. Based on coordinate data of the handwriting DRdt, a character or an editing symbol is recognized, and the handwriting DRdt is erased after recognition. Although the handwriting display area DA is shown by a dotted line in FIGS. 4A to 6, this dotted line cannot be seen on the actual screen.

The handwriting DRdt is erased by clearing the handwriting display area DA and re-drawing the area. When the handwriting display area DA is cleared, the display screen is in a state shown in FIG. 5A.

Figure 5A:
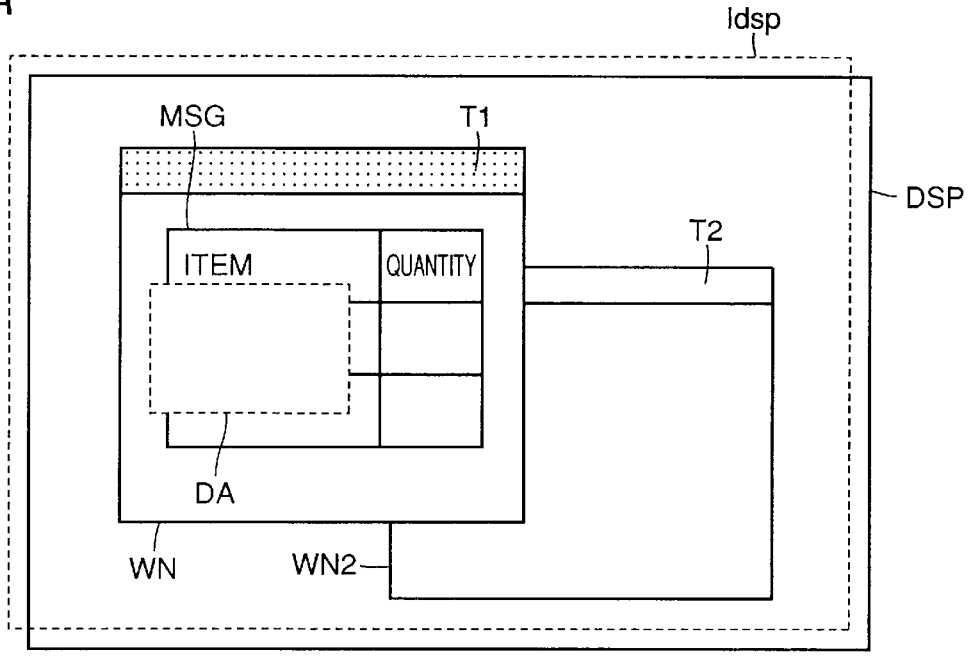
FIGS. 5A and 5B are diagrams for explaining second writing operation to an arbitrary position according to this embodiment.
Figure 5B:
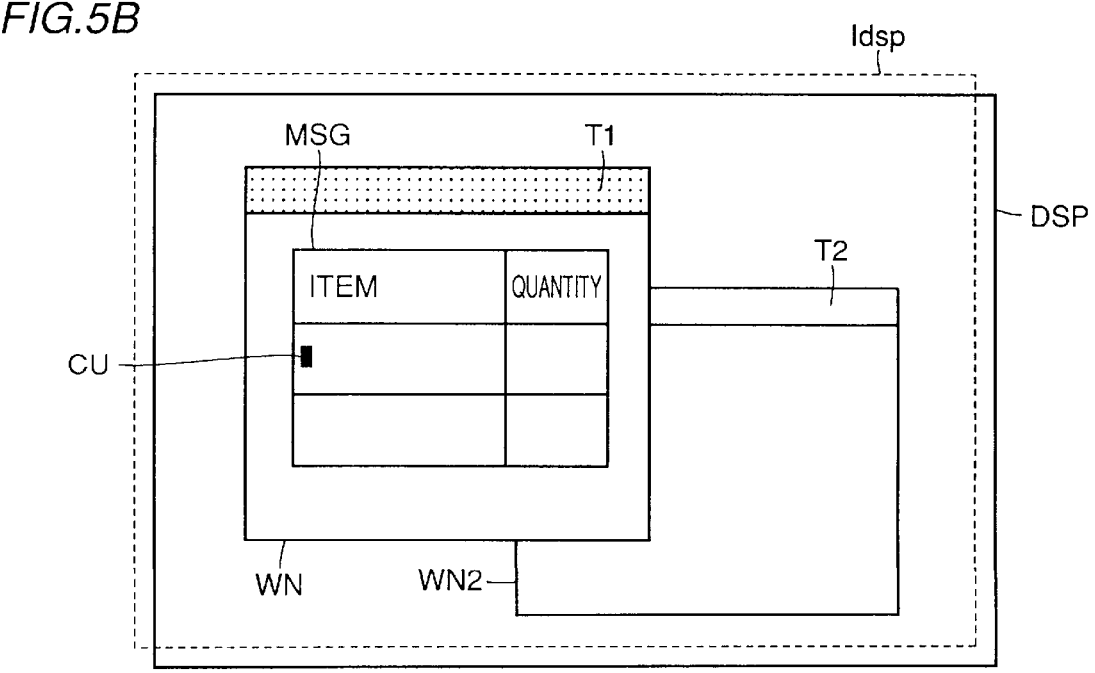

Then, a request of re-drawing of the handwriting display area DA on the application window WN is output to the application program. The application program displaying the application window WN receives the re-drawing request, and re-draws the display screen according to the request. As a result, as shown in FIG. 5B, the display screen is in a state before display of the handwriting DRdt (the same display screen as that of FIG. 4A). Then, the recognition result of the handwriting DRdt is output to the application program displaying the application window WN having a keyboard focus in the same form as that of keyboard input. Then, the application program displays the received recognition result at the position of the cursor CU. As a result, the display screen is in such a state as shown in FIG. 6. In this figure, CSH1 shows the recognition result "SWP".

Figure 7A:
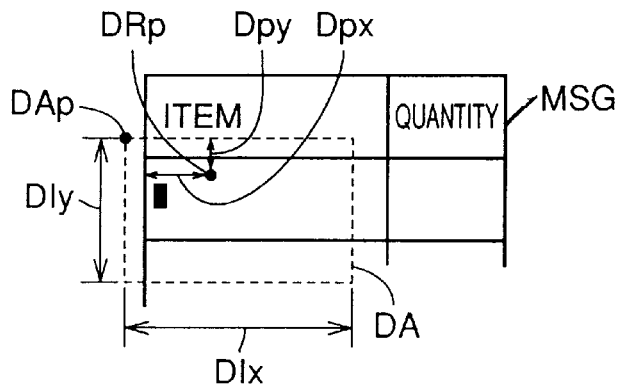
FIGS. 7A to 7C and FIG. 8 are diagrams for explaining handwriting display operation and handwriting erasing operation according to this embodiment.

Handwriting display operation will now be described in detail with reference to FIGS. 7A to 7C. FIG. 7A shows a part of the window WN of FIG. 4B at the time when writing is started.

In the figure, D1x and D1y denote the width and the length of the handwriting display area DA, respectively, with prescribed values set as their respective initial values. DAp denotes the upper left position of the handwriting display area DA, which is distant from the writing start point DRp by Dpx (prescribed value) in the leftward direction and Dpy (prescribed value) in the upward direction.

Figure 7B:
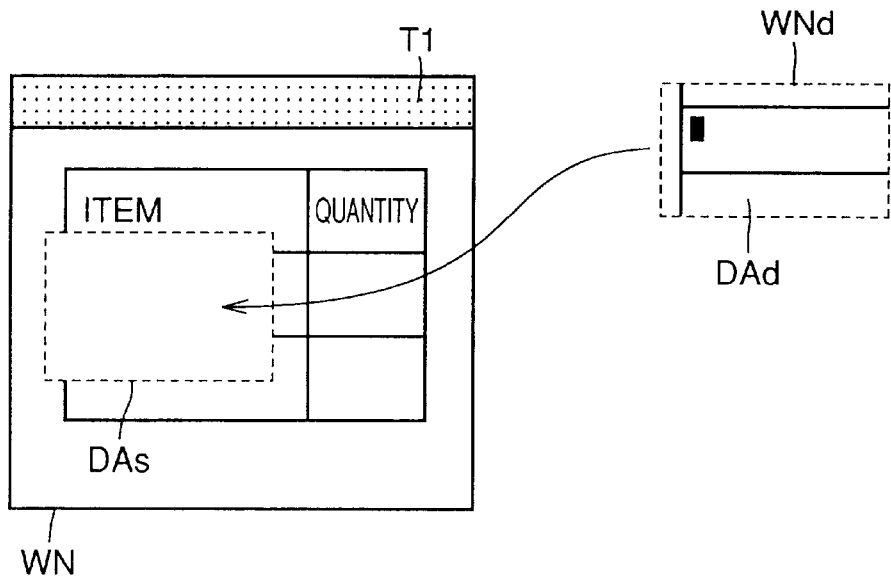

Specifically, the handwriting display area DA is generated by opening a handwriting display window WNd overlapping the same area DAs as the handwriting display area DA on the application window WN, as shown in FIG. 7B. The size of the window WNd is the same as that of the area DAs.

Figure 7C:
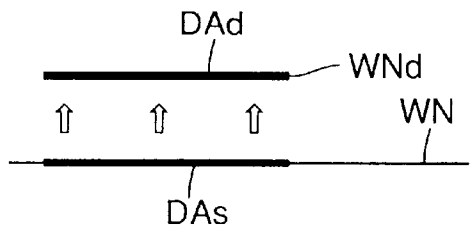
Figure 8:
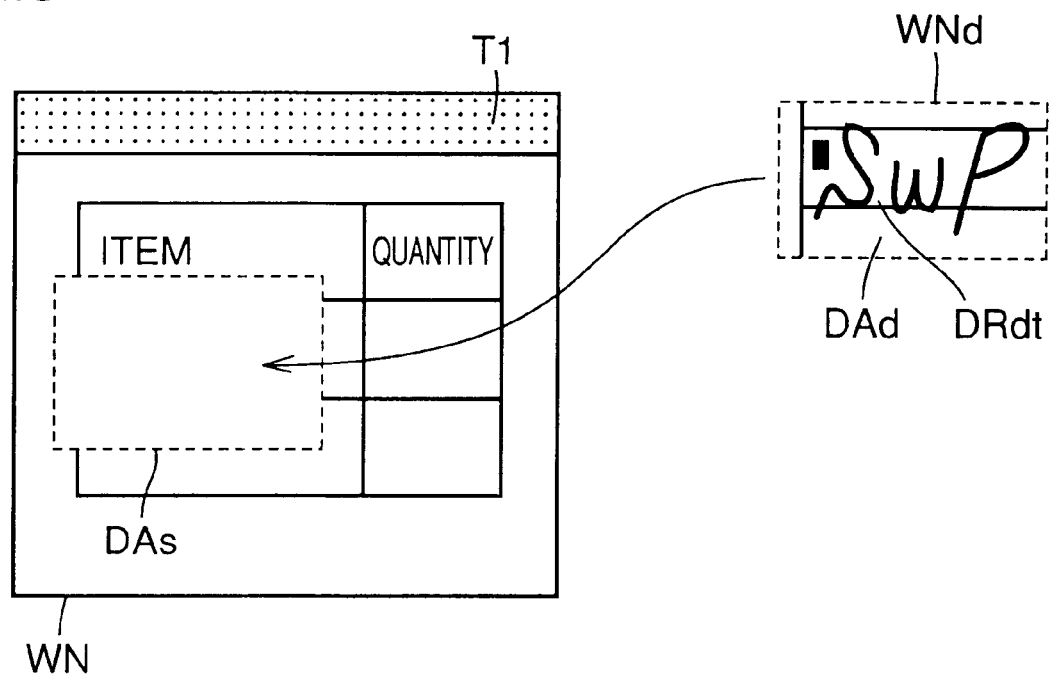

When the handwriting display window WNd is opened, as shown in FIG. 7C, an image of the area DAs on the application window WN is copied to an area DAd (which is the whole area of the window WNd having the same size as the area DAs) on the handwriting display window WNd, and the area DAs is cleared. Therefore, an image seen in the handwriting display area DA on the screen is that of the area DAd. However, since the image of the area DAd is the same as that of the handwriting display area DA on the application window WN, the screen is in the same state as the state before writing (FIG. 4A). There is no appearance change in the screen.

Then, a handwriting is displayed on the handwriting display window WNd. Then, the screen is in a state shown in FIG. 8, that is, the state (FIG. 4B) in which writing was carried out on the application window WN. Then, in the handwriting erasing operation, the handwriting display window WNd is erased, and the re-drawing request of the area DAs on the application window WN is output to the application window WN.

When the handwriting display window WNd is erased, the cleared area DAs on the application window WN is seen on the screen. This state corresponds to the state shown in FIG. 5A. When the area DAs is re-drawn by the application program, the screen is in the state before writing. This state corresponds to the state shown in FIG. 5B. More specifically, by the handwriting erasing operation, the content displayed before writing is not affected, and the screen is in the same state as a state where only the handwriting is erased.

In this embodiment, the area DAs on the application window WN is re-drawn in response to the re-drawing request to the application window WN. However, the screen may be returned to the state before writing by FEP storing the image of the handwriting display area DA before clear and re-drawing the image in the area DAs at the time of erasing the handwriting. When this method is employed, the re-drawing request to the application window WN is not needed.

By limiting the size of the handwriting display area DA to the size allowing writing of several characters as in this embodiment, an area to be re-drawn is also limited. Therefore, the screen change and the time required for re-drawing are reduced as compared to the case where the whole screen or the whole window is re-drawn, resulting in reduction of flicker of the screen in erasing the handwriting.

Figure 9A:
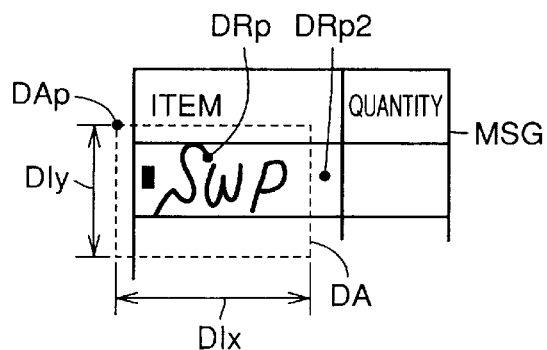
FIGS. 9A to 9E are diagrams for explaining control operation of a handwriting display area according to this embodiment.
Figure 9D:
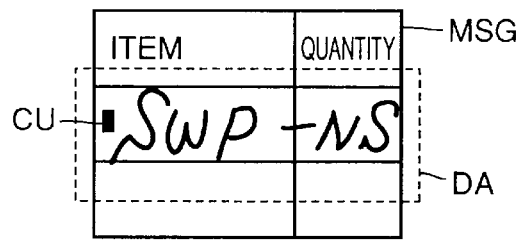
Figure 9B:
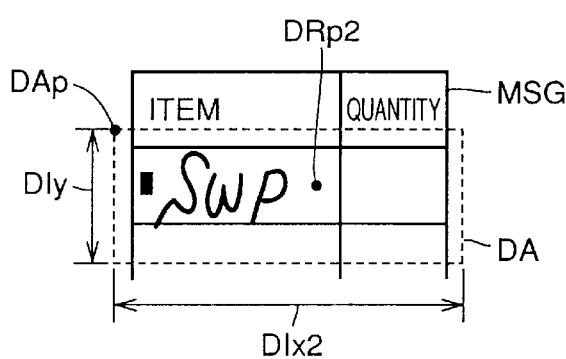
Figure 9E:
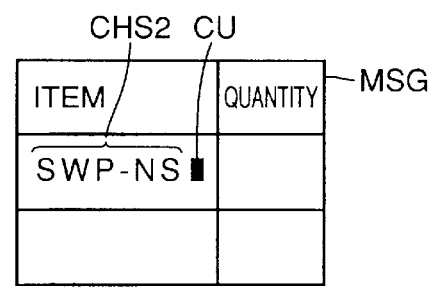
Figure 9C:
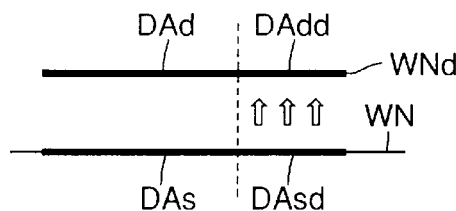

FIGS. 9A to 9E are diagrams for showing handwriting display when writing is carried out outside the handwriting display area DA. FIG. 9A shows a state where writing starts to be carried out at a coordinate point DRp2 outside the handwriting display area DA. At this time, FEP changes the size of the handwriting display area DA. FEP expands the width of the handwriting display area DA as shown in FIG. 9B so that the handwriting display area DA includes the coordinate point DRp2, and that a plurality of characters are further displayed from the position. D1x2 of FIG. 9B is the width of the handwriting display area DA after expansion. At this time, as shown in FIG. 9C, the handwriting display window WNd is also expanded, the screen of the expanded handwriting display area DAsd on the application window WN is copied to a corresponding area DAdd of the handwriting display window WNd, and the handwriting display area DAsd is cleared. Therefore, by expanding the handwriting display area DA, a handwriting can be displayed even if writing is carried out outside the handwriting display area.

A state where writing is carried out following FIG. 9B is shown in FIG. 9D. Then, FIG. 9E shows a state where the recognition result is displayed by the application program having the handwriting. In the figure, CHS2 is the recognition result.

Figure 10A:
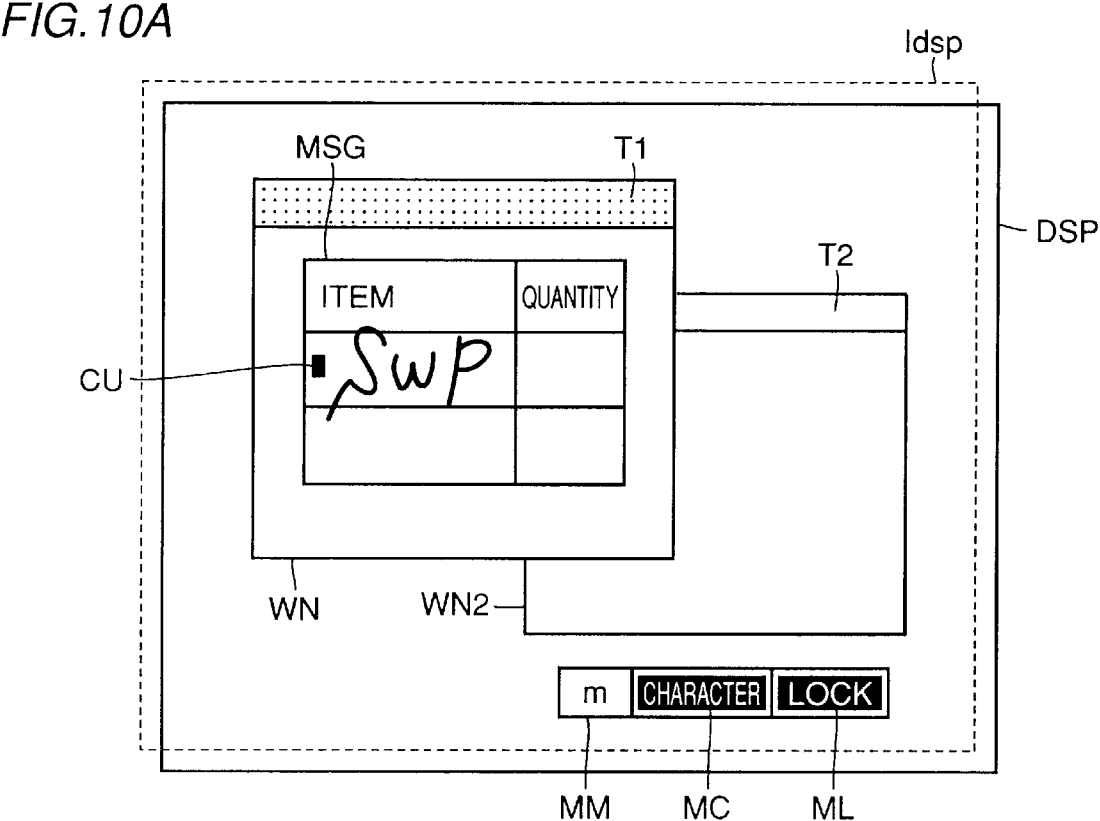
FIGS. 10A, 10B, 11A and 11B are diagrams for explaining operation in a lock mode of character input according to this embodiment.
Figure 10B:
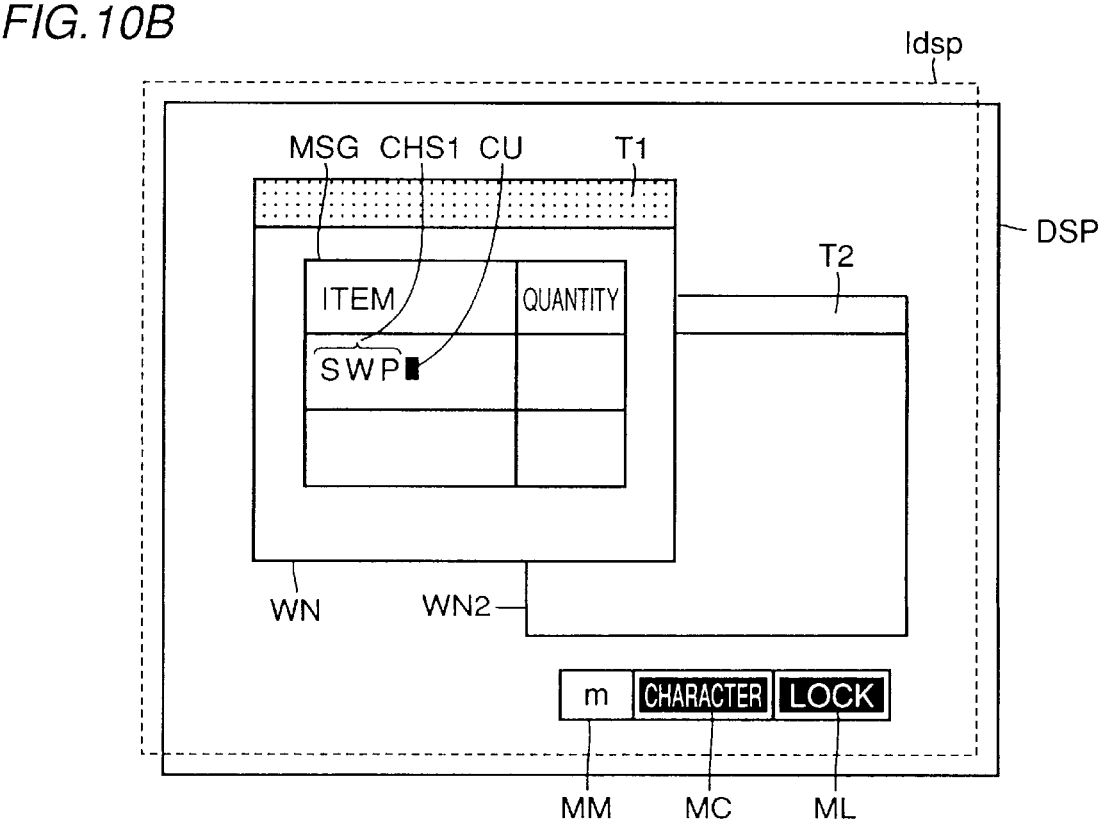

FIGS. 10A and 10B are diagrams showing an example of operation in a lock mode of character input. FIG. 10A shows a state where the lock mode of character input is released. In the figure, MM, MC and ML are menu windows showing the mouse emulation mode, the character input mode, and the lock mode of character input, respectively. By touching these areas (windows) with a pen, respective modes are selected. The menu window corresponding to the selected mode is highlighted, so that the user knows which mode is selected.

When the lock mode of character input is selected, both the windows MC and ML are highlighted. When the character input mode or the lock mode of character input is selected, the window Idsp for handwriting coordinate input (transparent window) is generated, and the input coordinate in the window Idsp excluding respective areas of the windows MM, MC and ML is detected as coordinate data. The input coordinate in these areas is processed not as character data but as menu selection data.

This exclusion processing is implemented by rearranging the windows MM, MC and ML above the window Idsp when the window Idsp is generated. The processing for detecting a window to which the coordinate input corresponds is carried out from the uppermost window to the lower windows sequentially. Therefore, by arranging the windows MM, MC and ML above the window Idsp, the respective menus of the windows MM, MC and ML can be selected even if the windows MM, MC and ML are positioned in the window Idsp.

The handwriting DRdt of FIG. 10A is recognized, and the recognition result is displayed on the application window WN as shown in FIG. 10B.

Figure 11A:
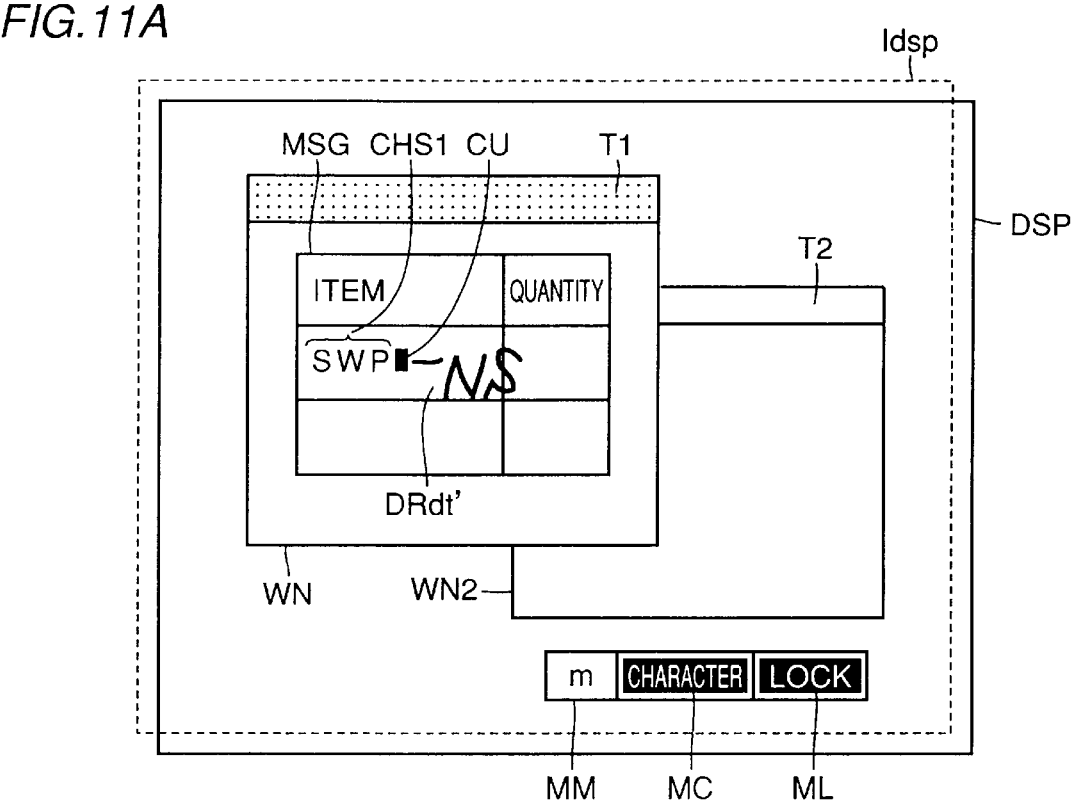
Figure 11B:
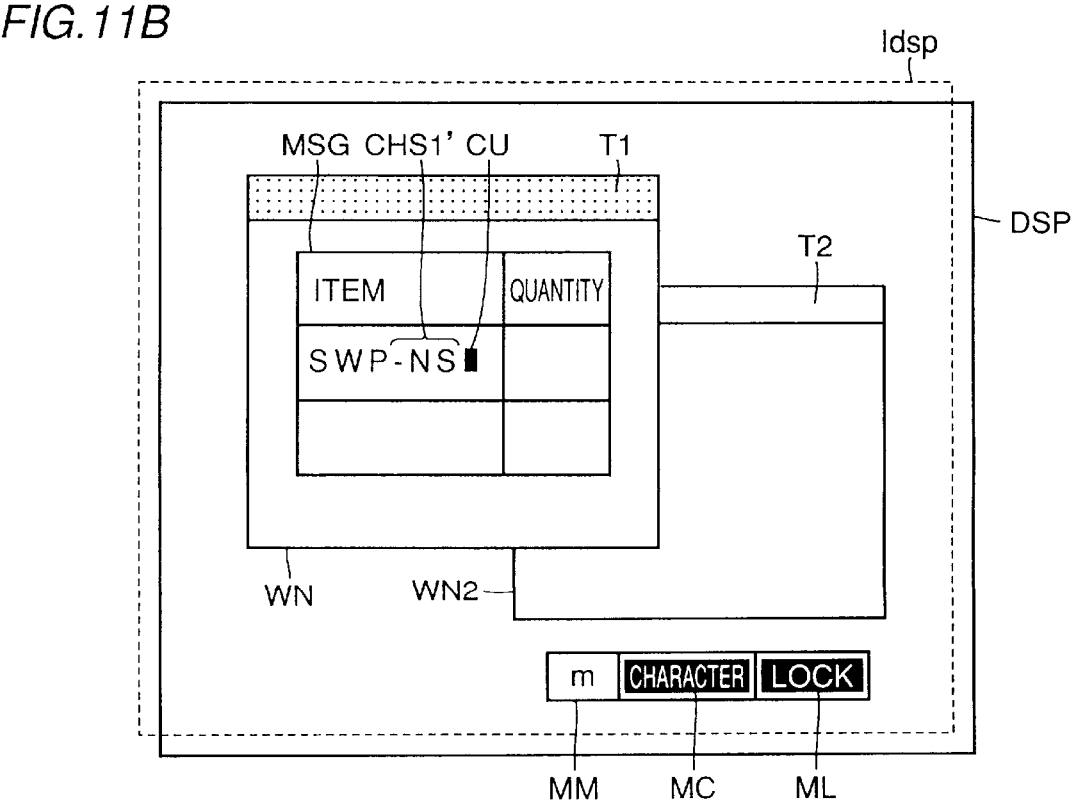

In the lock mode of character input, the character input mode continues even after the recognition processing is carried out after writing. Therefore, characters "-NS" can be written continuously as shown in FIG. 11A. The handwriting DRdt' is recognized, and the recognition result is displayed as shown in FIG. 11B. As described above, when a character train is input at successive positions at different times, selection of the lock mode of character input allows input of characters only by writing operation.

Figure 12A:
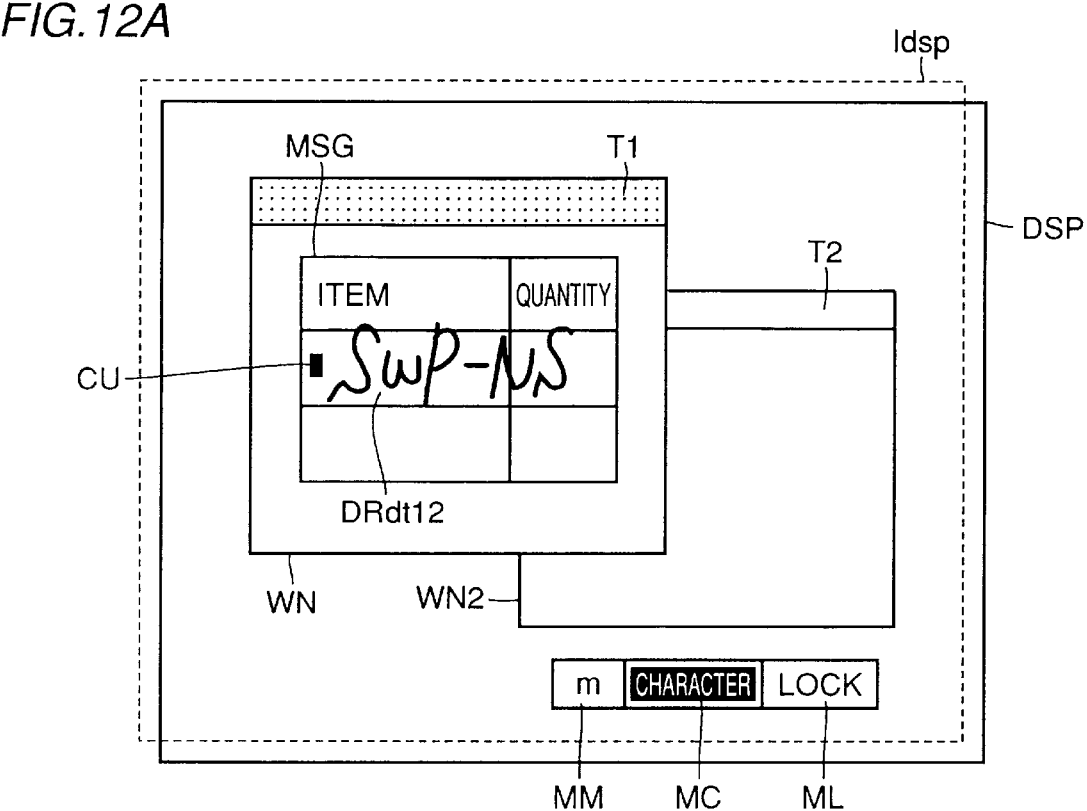
FIGS. 12A, 12B, 13A and 13B are diagrams for explaining operation in an unlock mode of character input according to this embodiment.
Figure 12B:
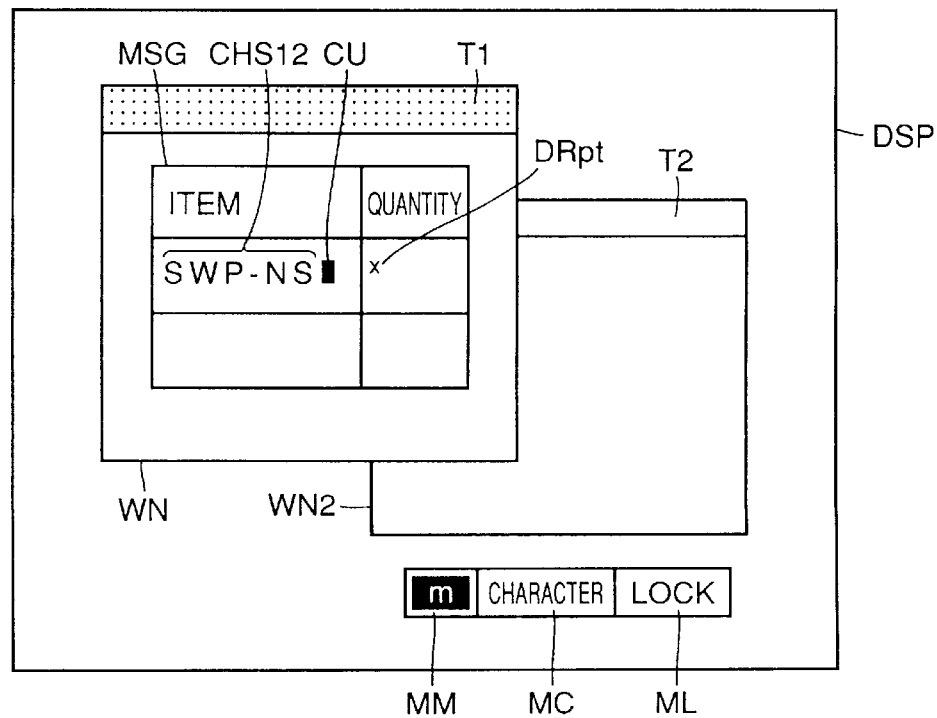

FIGS. 12A, 12B, 13A and 13B are diagrams showing an example of operation in an unlock mode of character input. FIG. 12A shows a state where the character input mode is selected, and a handwriting DRdt12 is displayed. The handwriting DRdt12 is recognized, and the recognition result is displayed on the application window WN as shown in FIG. 12B.

Figure 13A:
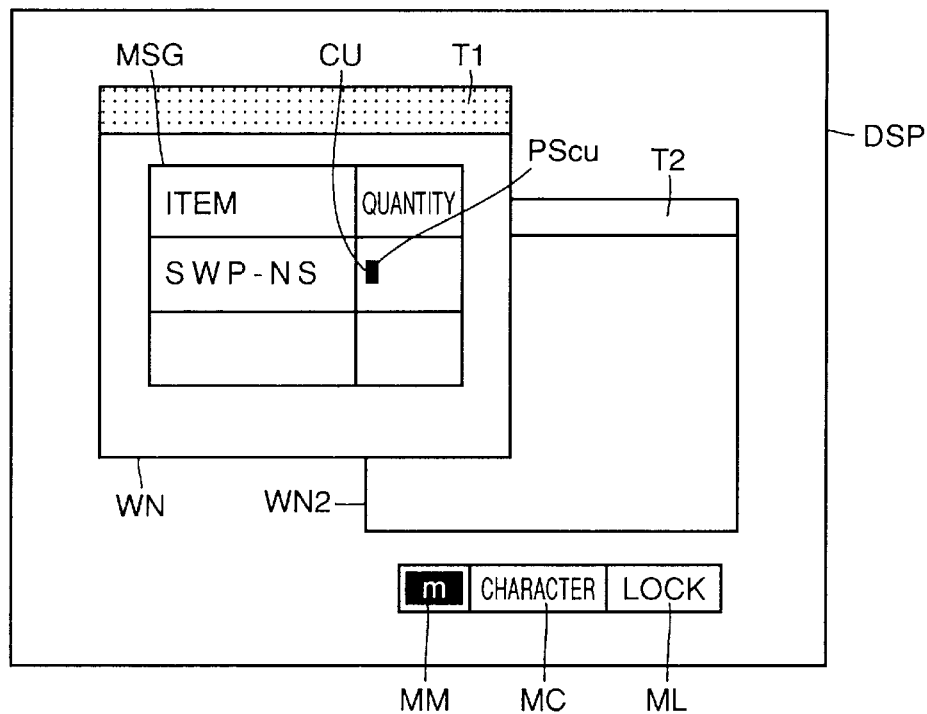
Figure 13B:
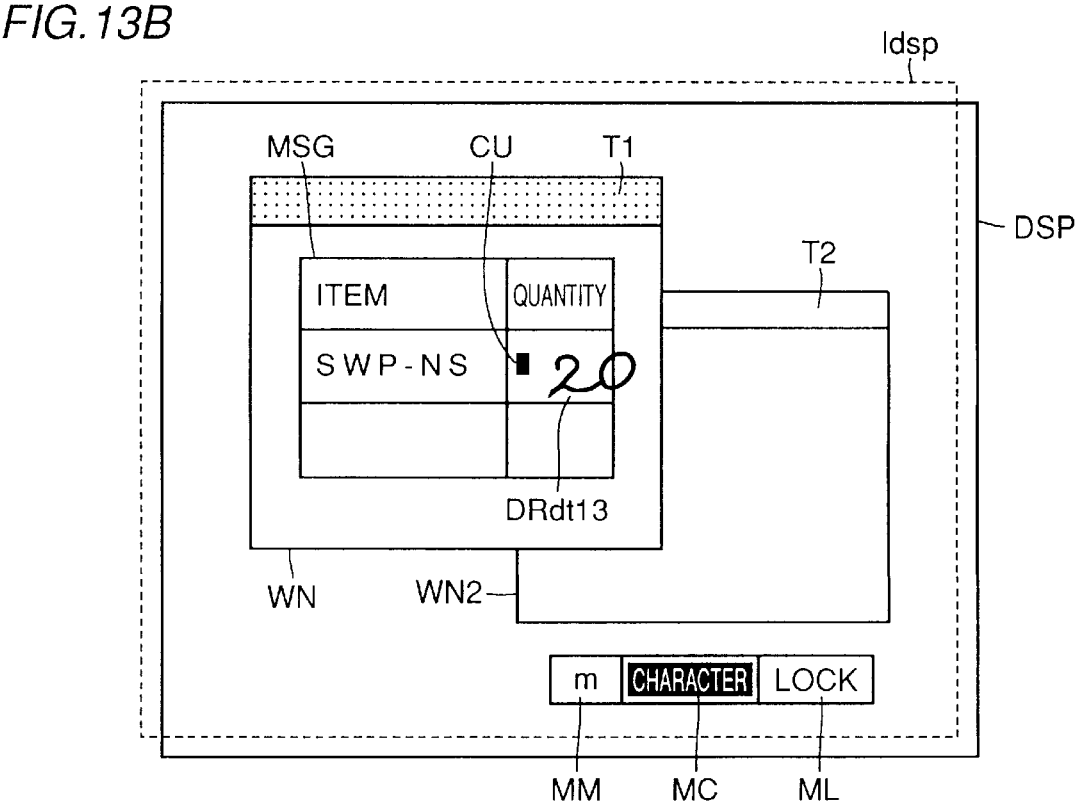

In the unlock mode, the input mode changes into the mouse emulation mode at this time. The window Idsp for handwriting coordinate input is erased, and the window MM is highlighted. In this state, operation can be carried out by mouse input such as pointing. When the position DRpt is touched with a pen, the application window WN is informed of the coordinate in the same form as that of mouse input. Therefore, the application program receives the coordinate, and moves the cursor CU to the position. Then, as shown in FIG. 13A, the position of the cursor CU moves to a position PScu. When a character is input to the position, the character input mode is again selected as shown in FIG. 13B, thereby allowing writing.

When it is intended to move the cursor, operation of selecting the mouse emulation mode after writing is required in the lock mode. However, in the unlock mode, the cursor can be moved immediately after writing by pointing, as shown FIGS. 12A, 12B, 13A and 13B.

Figure 14A:
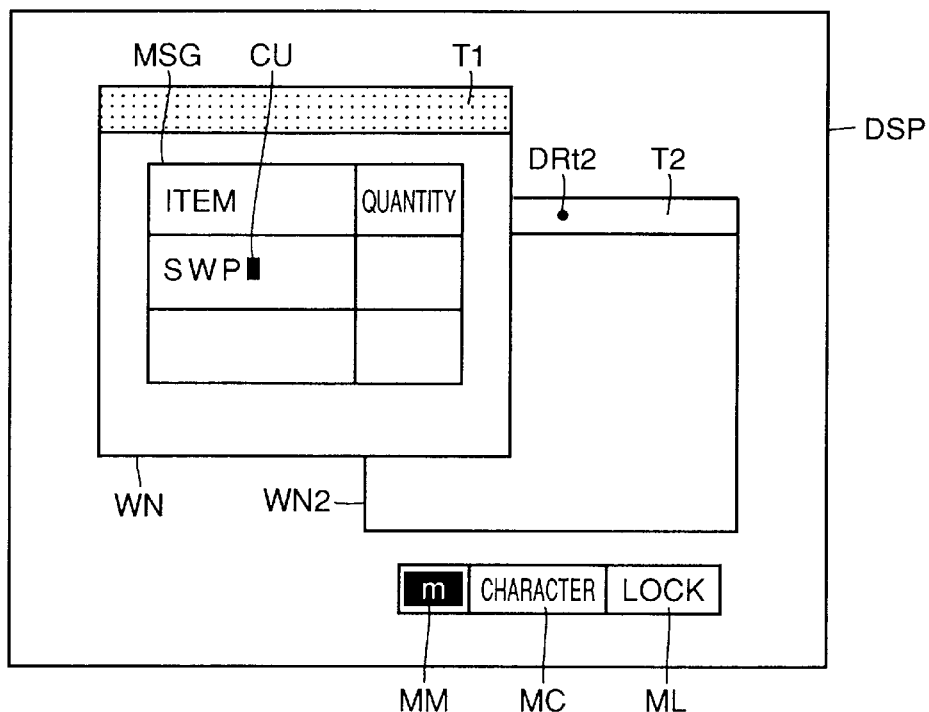
FIGS. 14A, 14B and FIG. 15 are diagrams for explaining movement of a keyboard focus according to this embodiment.
Figure 14B:
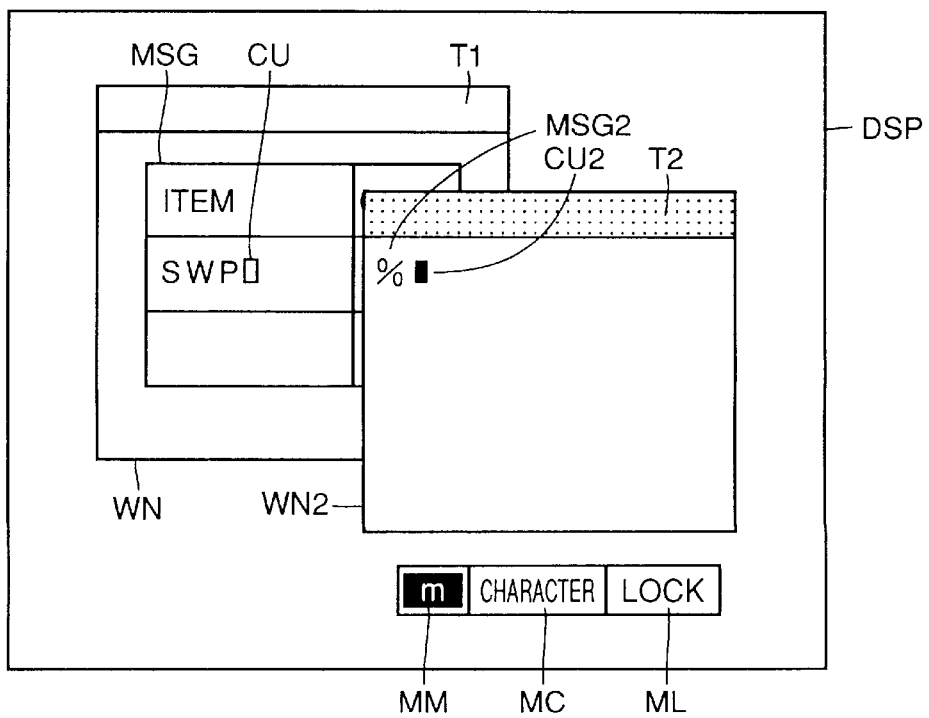
Figure 15:
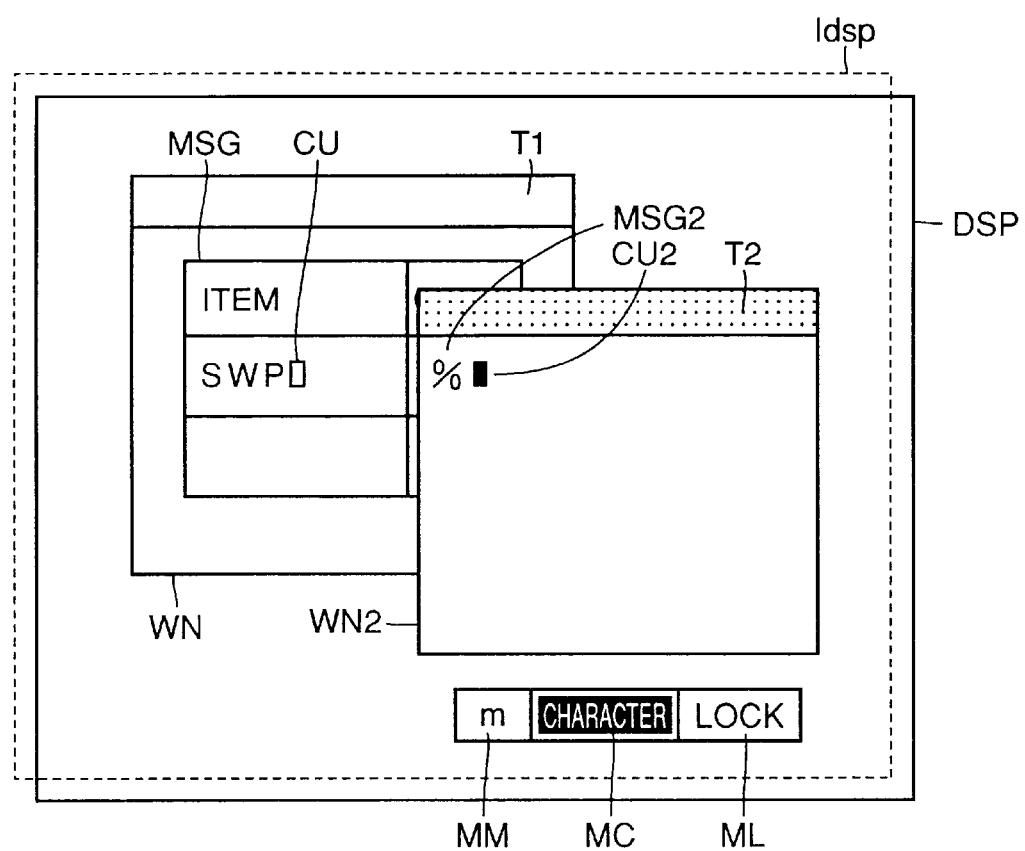

FIGS. 14A, 14B and 15 are diagrams showing an example of operation when a keyboard focus is moved for character input. In FIG. 14A, after input of the characters "SWP" on the application window WN, a point DRt2 on the title bar T2 of another application window WN2 is touched with a pen in the mouse emulation mode. When the point DRt2 is touched with a pen, the window manager moves the keyboard focus to the window WN2 connected with the title bar T2, and arranges the window WN2 uppermost. As a result, as shown in FIG. 14B, the title bar T2 is highlighted, and the window WN2 is displayed as if it were before the window WN. MSG2 is a prompt displayed by the application program (shell program by UNIX), and CU2 is a cursor of the program. By the window manager, the cursor CU2 in the window WN2 having a keyboard focus is also highlighted. On the contrary, highlighting of the cursor CU in the window WN not having a keyboard focus is released.

In FIG. 14B, when a character is input at a position of the cursor CU2, the character input mode is selected as shown in FIG. 15. Characters written and recognized hereafter are input in the window WN2.

Figure 16:
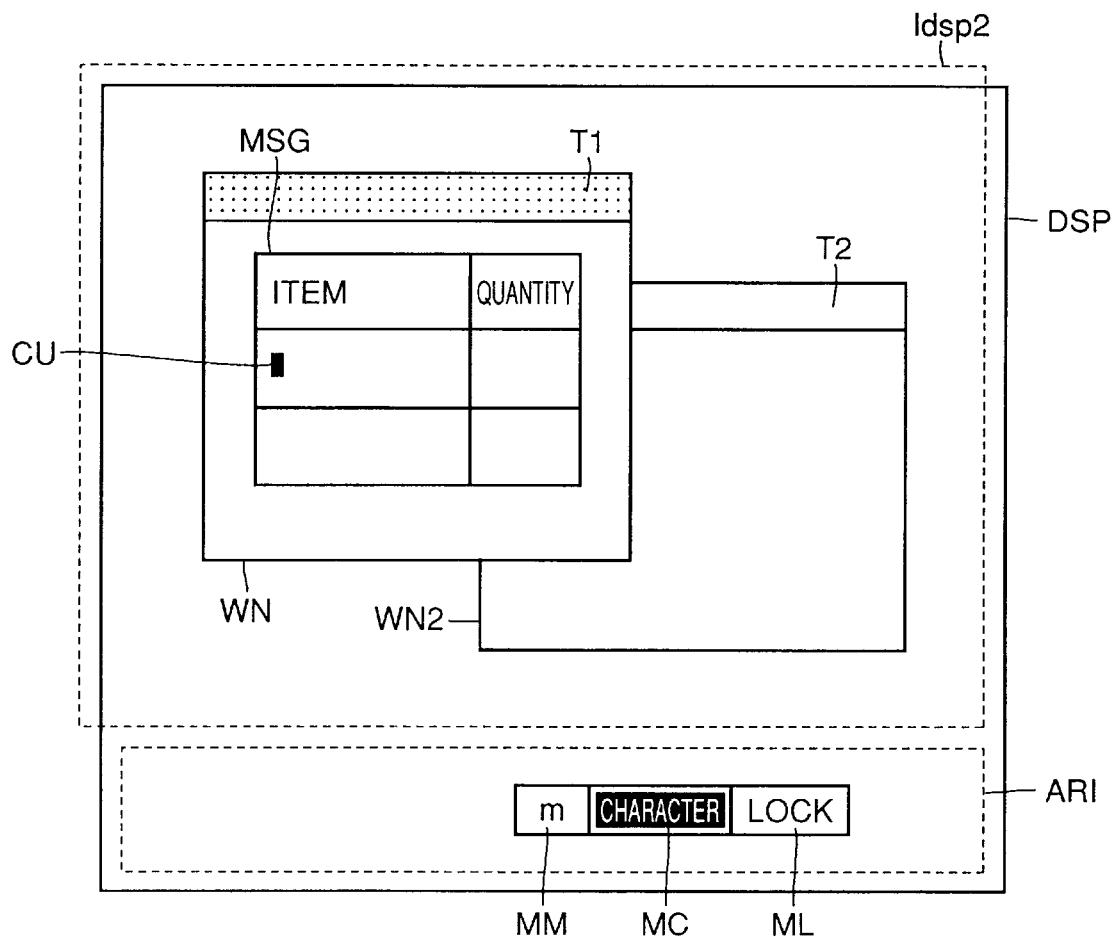
FIG. 16 is a diagram for explaining a specific area used in this embodiment.

FIG. 16 is a diagram showing an example of operation when a window for handwriting coordinate input is opened excluding a specific region. In FIG. 16, the character input mode is selected. In the figure, Idsp2 is a window for handwriting coordinate input, and ARI is a specific area not accepting a handwriting coordinate as input.

Coordinate input to the specific region ARI with a pen is carried out not by writing of a character or an editing symbol but by mouse input such as pointing. As a result, mode selection can be carried out by touching the windows MM, MC and ML with a pen even in the character input mode.

In the above described example shown in FIGS. 10A, 10B, 11A and 11B, the windows MM, MC and ML are excluded from the area for writing by arranging the windows MM, MC and ML above the window Idsp. However, in FIG. 16, the example of operation is shown which excludes the windows MM, MC and ML from the area for writing by shifting the specific area ARI in an X-Y plane. Therefore, in the example of FIG. 16, it is not necessary to rearrange the windows MM, MC and MR above the window Idsp2. Further, all the windows arranged in the specific area ARI can be excluded from the area for writing.

FIGS. 17A, 17B, 18A, 18B, 19A and 19B are diagrams showing an example of operation when a window for handwriting coordinate input is generated on the window basis.

Figure 17A:
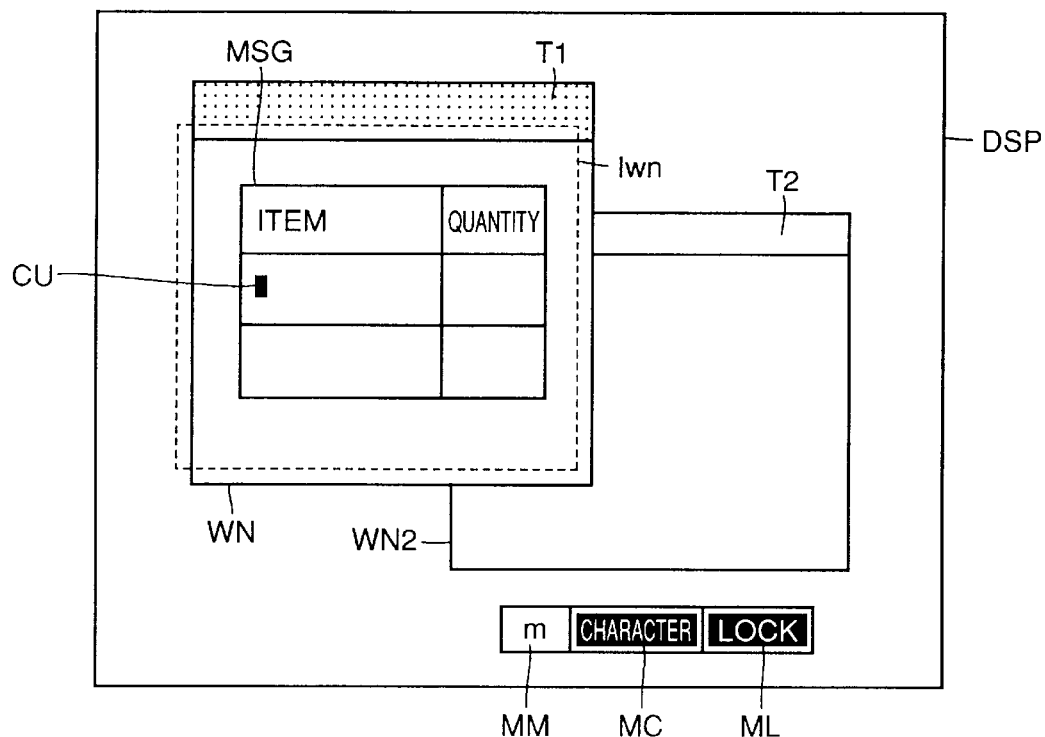
FIGS. 17A, 17B, 18A, 18B, 19A and 19B are diagrams for explaining writing input on the window basis according to this embodiment.

FIG. 17A shows a state where the lock mode of character input is selected. Here, Iwn is a window (transparent window) for handwriting coordinate input, which is opened in the same size as the window WN on the application window WN having a keyboard focus. The window Iwn can accept a character or an editing symbol as coordinate input. An area other than the window Iwn can correspond to mouse emulation as input coordinate.

Figure 17B:
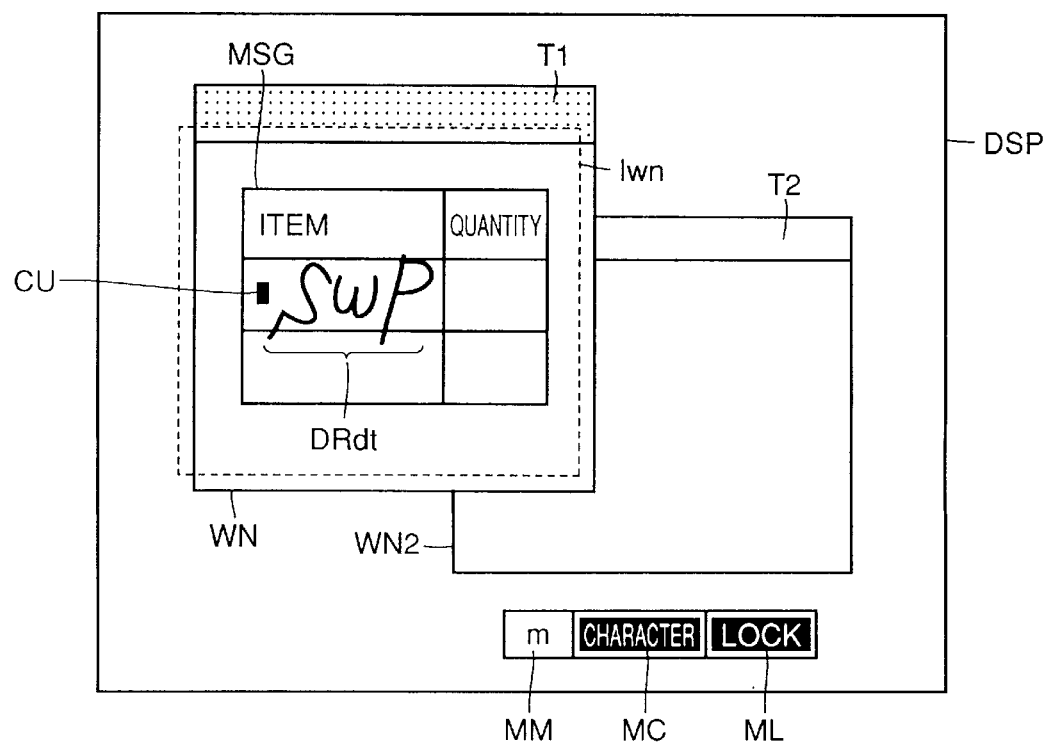
Figure 18A:
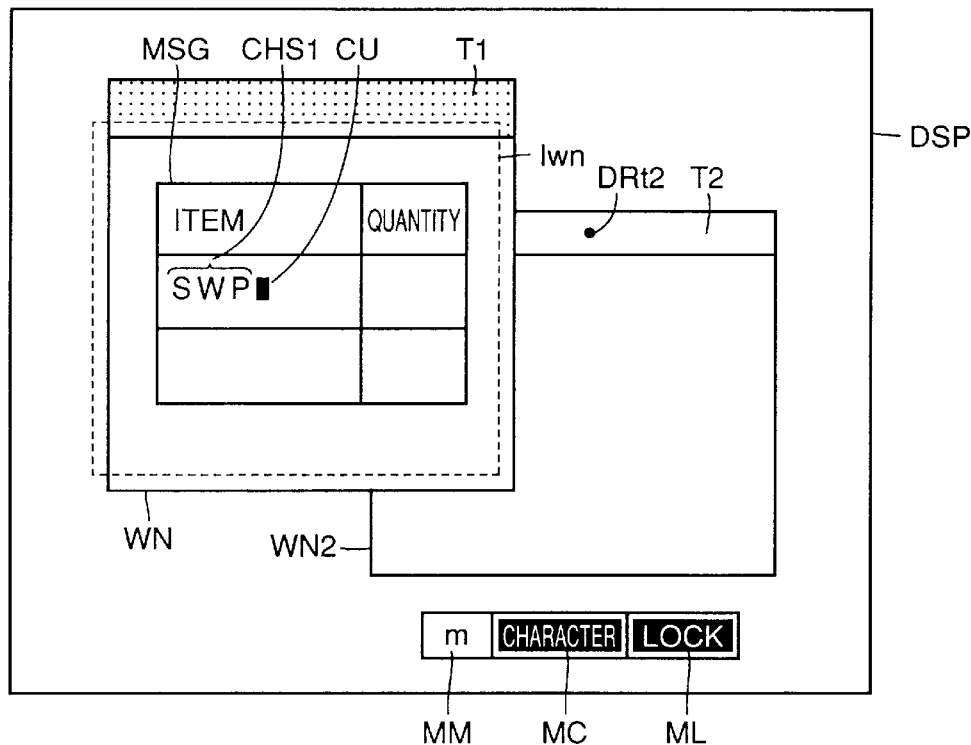

Characters are written in the window WN as shown in FIG. 17B. Here, DRdt is a handwriting of the written characters "SWP". The handwriting DRdt is recognized, and the recognition result is displayed as shown in FIG. 18A. In order to input a character to the window WN2 after that, it is necessary to move the keyboard focus to the window WN2. In this case, a part of the title bar T2 connected to the window WN2 is shown not overlapping with the window Iwn.

Therefore, it is possible to move the keyboard focus to the window WN2 by touching the title bar T2 with a pen still in the character input mode or the lock mode of character input without changing the operation mode to the mouse emulation mode.

Figure 18B:
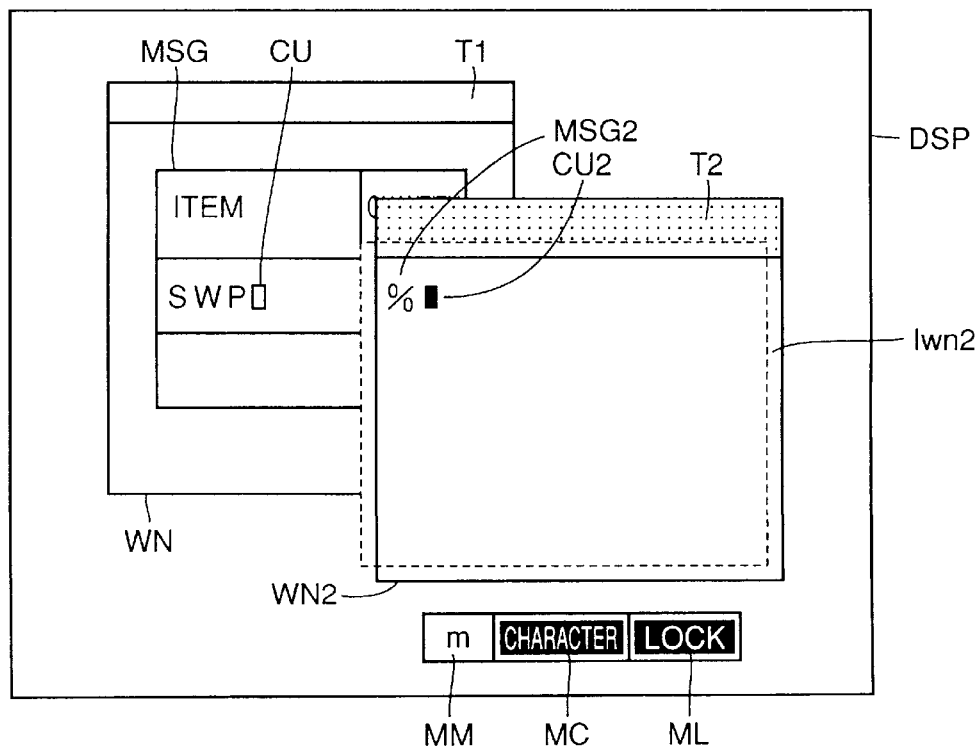

When a coordinate position DRt2 on the title bar T2 is touched with a pen, for example, the screen is as shown in FIG. 18B. When the keyboard focus changes, that is, a position outside the window Iwn is touched with a pen, the window Iwn is erased, and a window for handwriting coordinate input is again opened on the window WN2 having a keyboard focus.

Figure 19A:
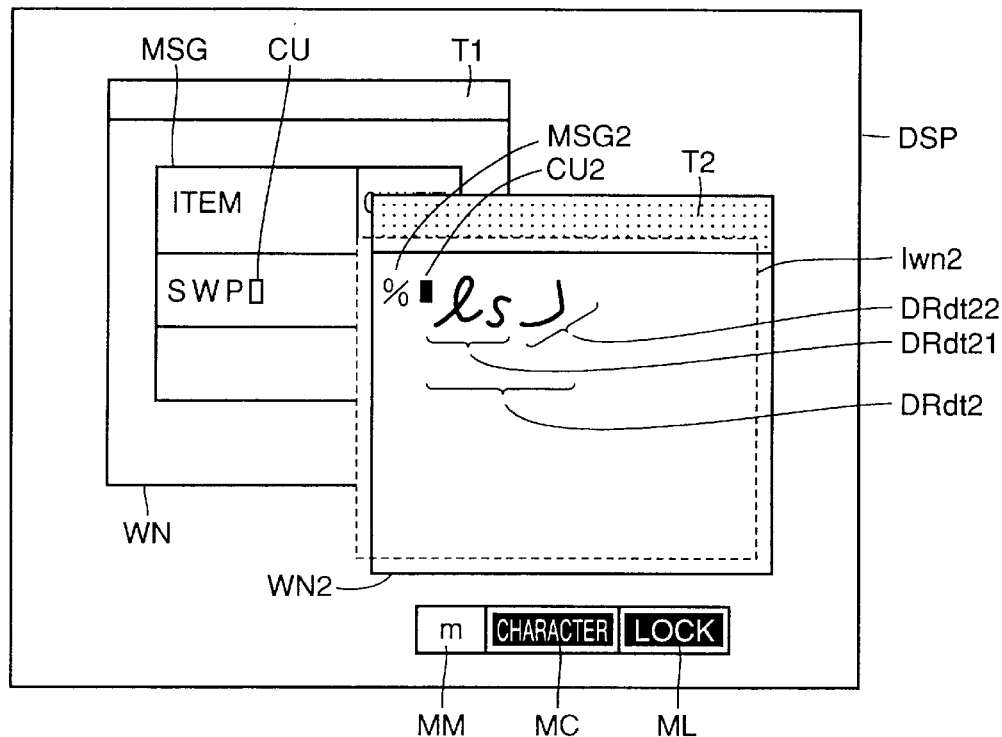

As a result, as shown in FIG. 19A, a character and an editing symbol can be written on the window WN2. Here, DRdt21 is a character and DRdt22 is an editing symbol indicating "return".

Figure 19B:
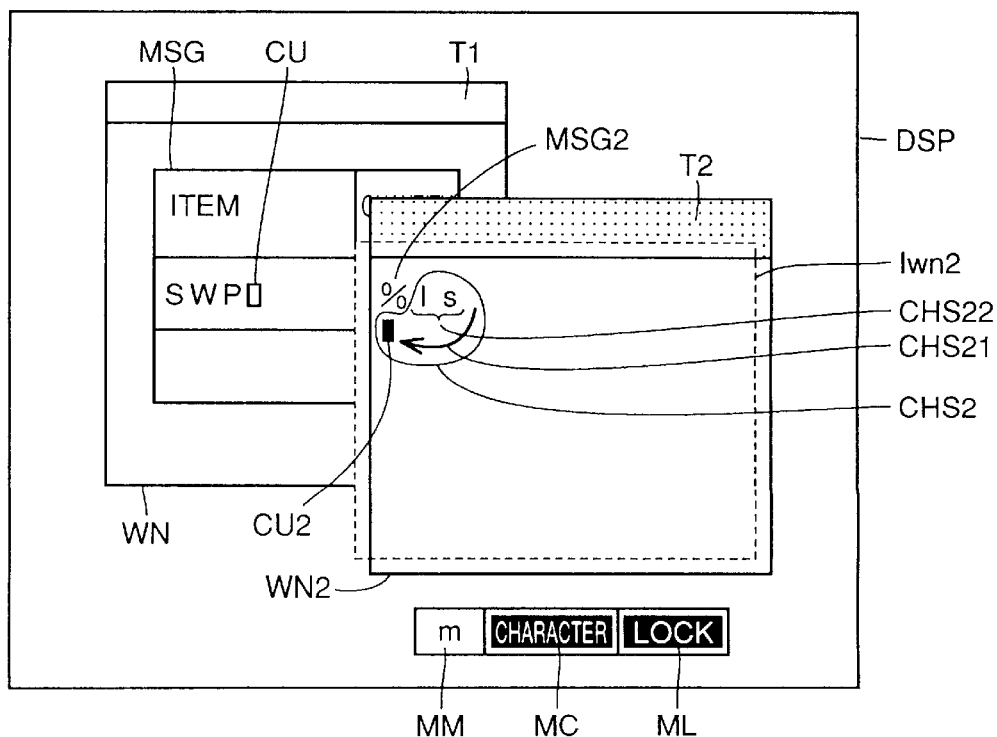

Then, the handwriting DRdt2 (character DRdt21 and editing symbol DRdt22) is recognized, and the recognition result is output to the window WN2. As a result, the screen is in a state as shown in FIG. 19B.

CHS2 (CHS21 and CHS22) is the recognition result of the handwriting DRdt2 (DRdt21 and DRdt22). CHS21 indicates return operation. In the UNIX system, "1s" is a command indicating a file name, and the file name is displayed at the cursor position CU2.

As shown in FIGS. 17A, 17B, 18A, 18B, 19A and 19B, even when the character input mode continues in the lock mode of character input, the keyboard focus can be easily moved by opening a window for handwriting coordinate input on the window basis without changing the mode. It should be noted that a character or an editing symbol can be written only in the window having a keyboard focus.

On the other hand, as shown in FIGS. 10A, 10B, 11A and 11B, by opening the window for handwriting coordinate input in the whole screen, a character or an editing symbol can be written at an arbitrary position on the screen. For example, a character or an editing symbol can be projected from the window. However, when the keyboard focus is changed in the lock mode of character input, the operation mode must be once changed into the mouse emulation mode. After that, the operation mode must be again changed back to the lock mode of character input.

Figure 20A:
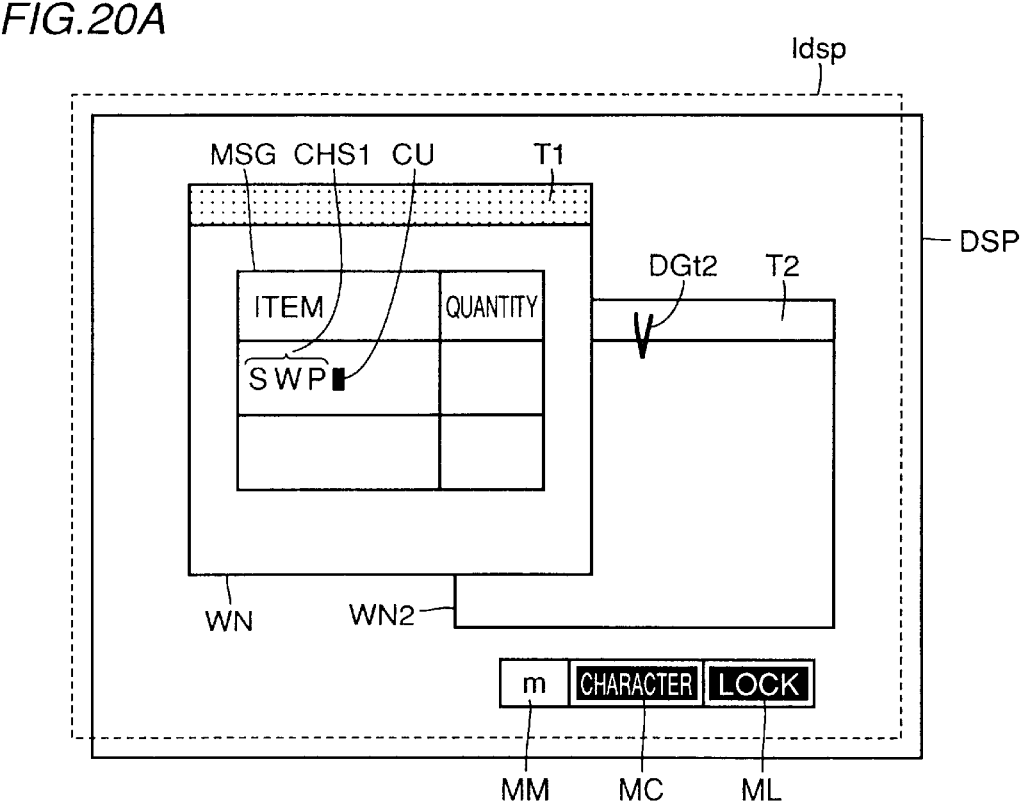
FIGS. 20A, 20B, 21A and 21B are diagrams for explaining operation corresponding to a specific editing symbol according to this embodiment.
Figure 20B:
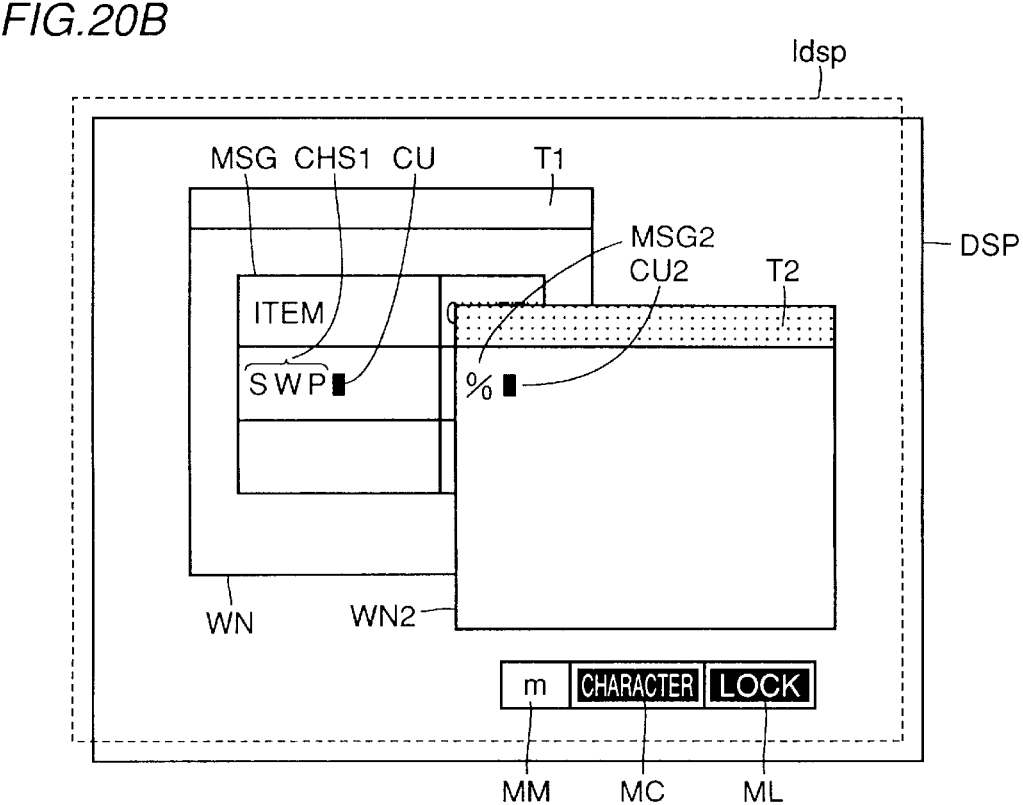

FIGS. 20A and 20B are diagrams showing an example of pointing operation to a position at which a specific editing symbol is written in the window for handwriting coordinate input, that is, an example of operation of the mouse emulation by an editing symbol in the character input mode.

In FIG. 20A, when the lock mode of character input is selected in the writing mode of the whole screen, an editing symbol DGt2 is written on the title bar T2 after the recognition result CHS1 is displayed. The editing symbol DGt2 indicates pointing in the character input mode. Recognition of the editing symbol is regarded as pointing to a coordinate at the center position of the editing symbol, and the coordinate is output to the window WN2 in the same form as that of mouse input. Then, the screen is in a state as shown in FIG. 20B. The keyboard focus is moved to the window WN2, and the title bar T2 is highlighted.

Figure 21A:
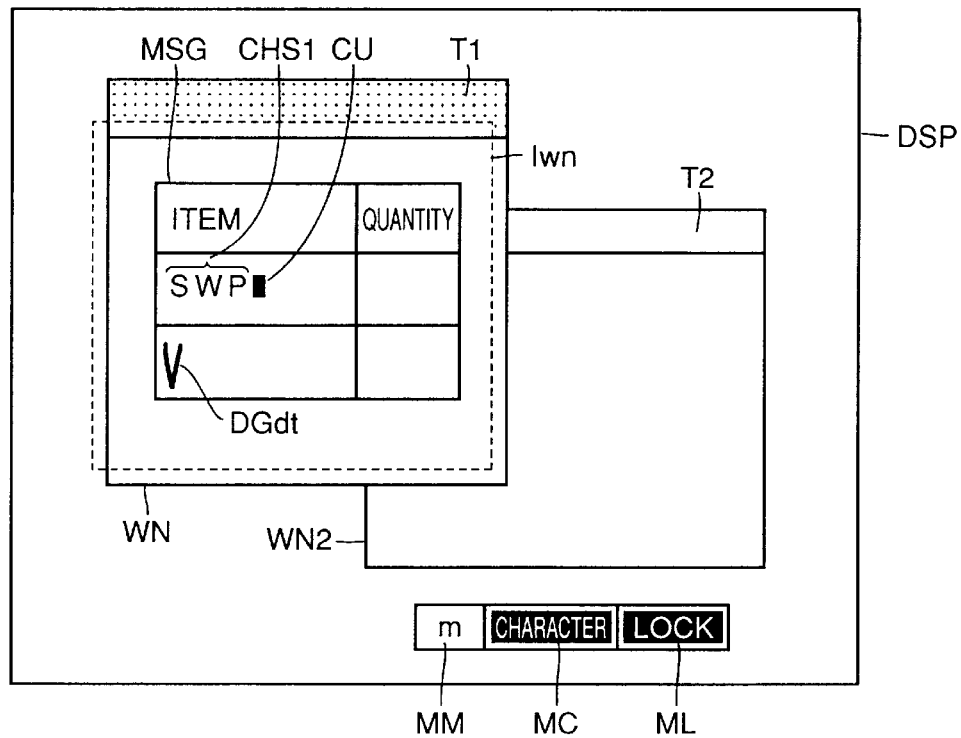
Figure 21B:
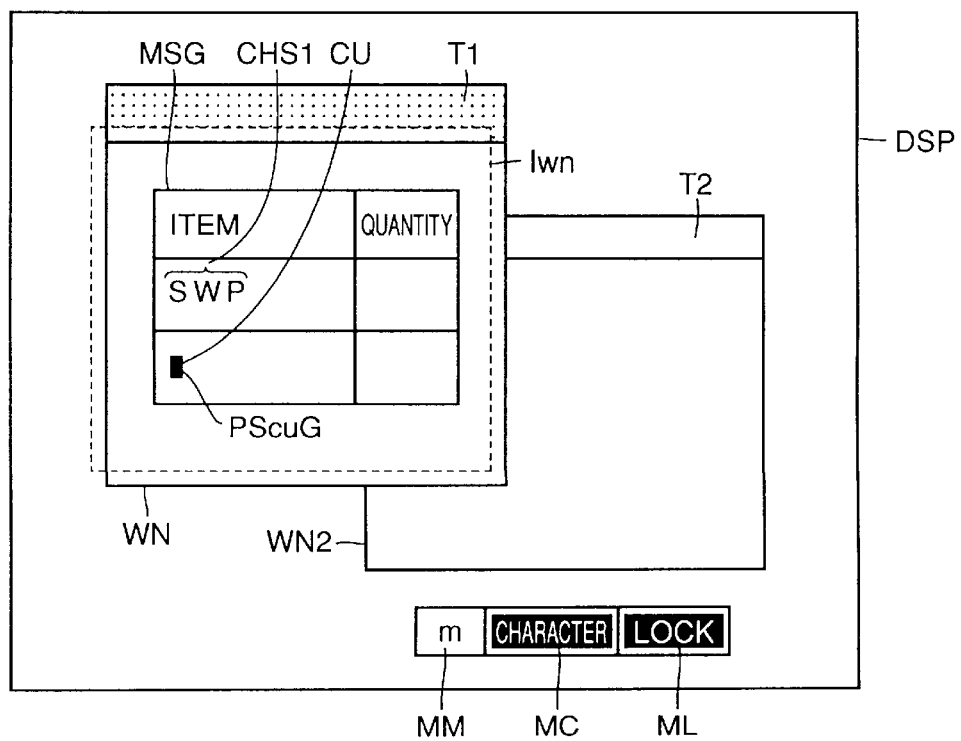

FIGS. 21A and 21B are diagrams showing an example in which the specific editing symbol shown in FIG. 20A is written in a window.

In FIG. 21A, when the lock mode of character input is selected in the writing mode on the window basis, an editing symbol DGdt is written after the recognition result CHS1 is displayed. When the editing symbol is recognized, the center position of the handwriting data is output to the application window WN in the same form as that of mouse input. At this time, the application program moves the cursor CU to a position PScuG of FIG. 21B according to the coordinate position. As a result, the recognition result of a character which is to be written thereafter is input at the cursor position PScuG.

As shown in FIGS. 20A, 20B, 21A and 21B, using a specific editing symbol, pointing can be carried out even in the lock mode of character input without changing the operation mode.

Figure 22A:
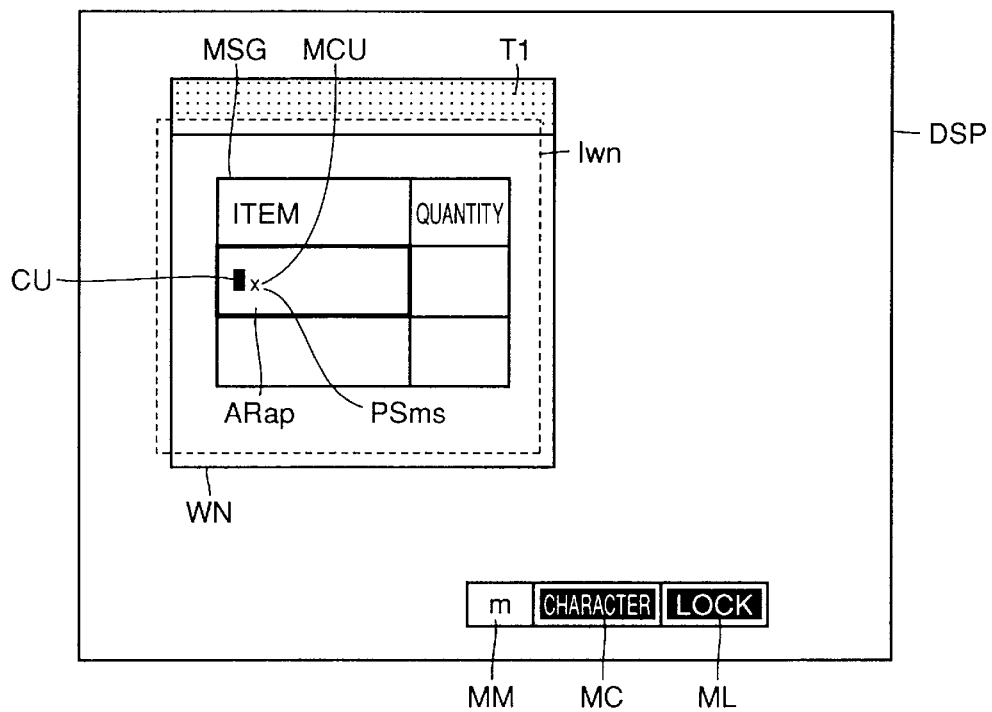
FIGS. 22A, 22B, 23A and 23B are diagrams for explaining control of a mouse cursor according to this embodiment.
Figure 22B:
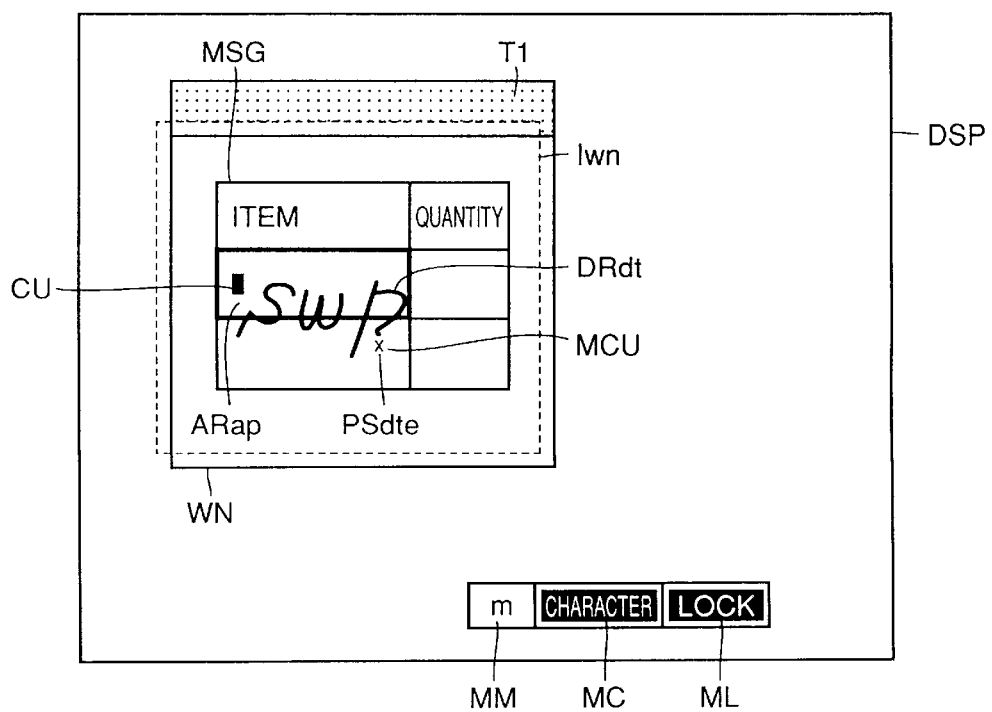

FIGS. 22A and 22B are diagrams showing an example of operation of returning the cursor to a position before writing when the recognition result is output to the application program.

In FIGS. 22A, 22B, 23A and 23B, first in the mouse emulation mode, a position PSms is pointed with a pen. By moving the mouse cursor to the position, the position of the cursor CU is designated. After that, the lock mode of character input is selected. On the application window WN, a window ARap displayed by the application program is opened.

FIG. 22B shows a state where characters "SWP" are written in the state shown in FIG. 22A. When the characters are written, a mouse cursor MCU moves to a writing end position PSdt. Some application programs check the position of the mouse cursor, and changes operation depending on the position. For example, some application programs accept character input only when the mouse cursor is within the window ARap.

This is because pointing with a mouse determines a position of character input and a character input area, exit of the mouse cursor from the determined character input area is interpreted as an instruction of character input to the next area, and operation of character input is once released by the application program. If the application window WN is generated by such an application program, when the recognition result is output to the application window WN in the state shown in FIG. 22B, the recognition result is not displayed at the cursor position CU. The recognition result may be completely ignored, or it may be displayed at another position. The operation is not guaranteed.

Figure 23A:
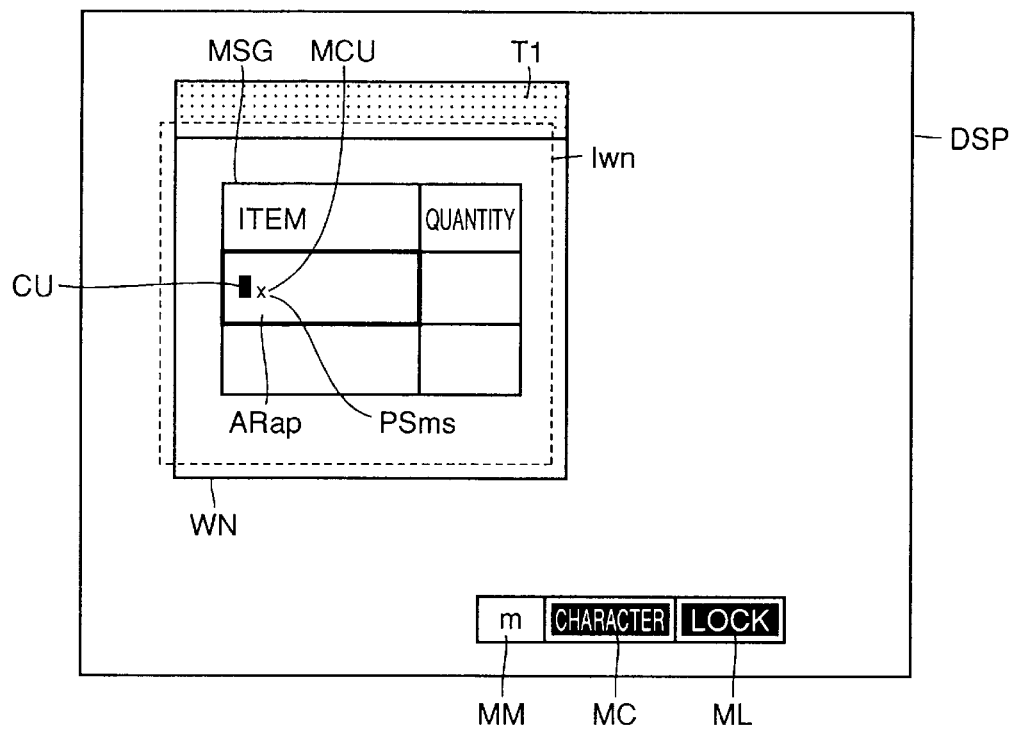
Figure 23B:
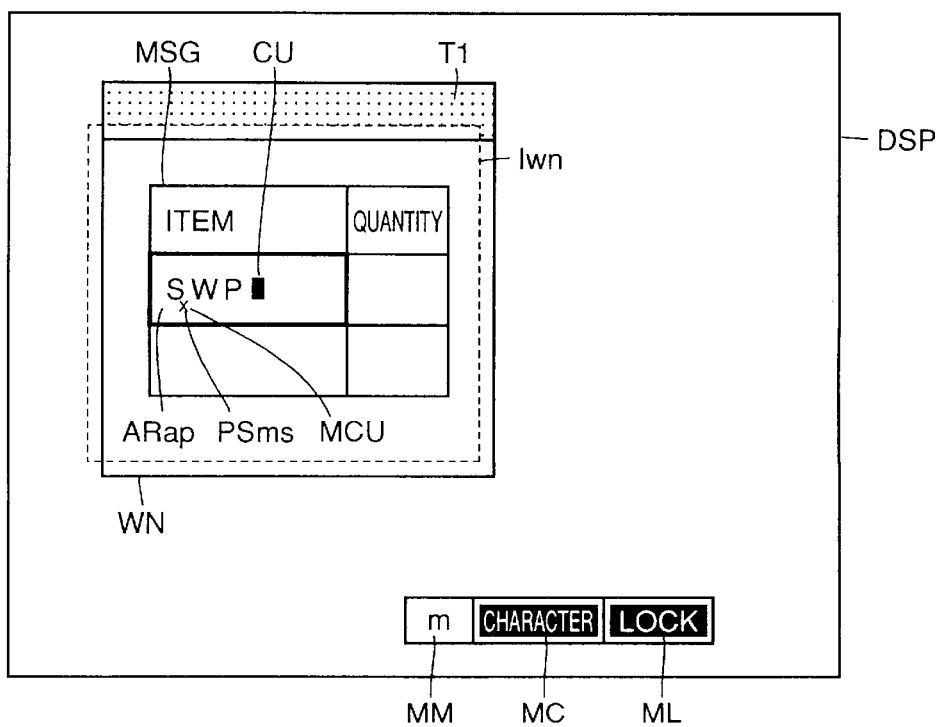

In the application program accepting keyboard input and mouse input, the position of character input is designated by a mouse, and a character is input through a keyboard. Therefore, it is not assumed that the mouse cursor moves during input of a character key. However, in character input by character writing with a pen, the mouse cursor may move according to the writing operation. In order to solve this problem, the position of the mouse cursor before writing is stored in this embodiment. Immediately before output of the recognition result to the application window, the mouse cursor is returned to the position before writing. When the handwriting is erased from the state shown in FIG. 22B, and the mouse cursor MCU is returned to the position PSms before writing, the screen is in a state shown in FIG. 23A. After that, when the recognition result is output to the application window WN, the recognition result is displayed as shown in FIG. 23B.

Figure 24A:
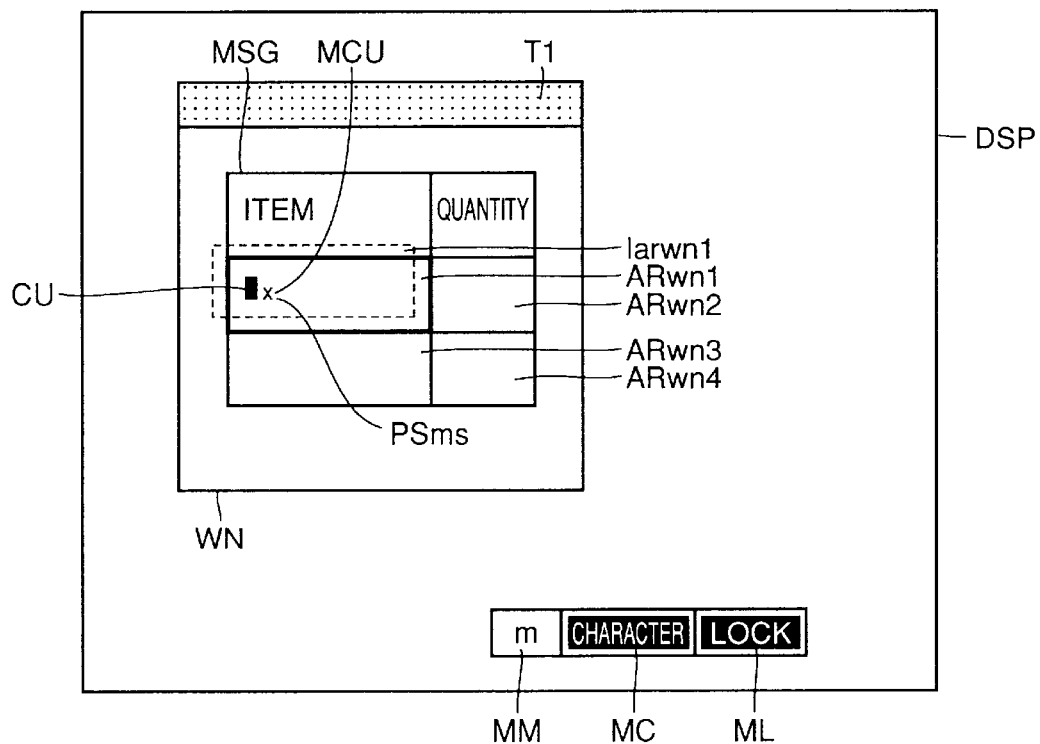
FIGS. 24A and 24B are diagrams for explaining writing input on the window basis according to this embodiment.
Figure 24B:
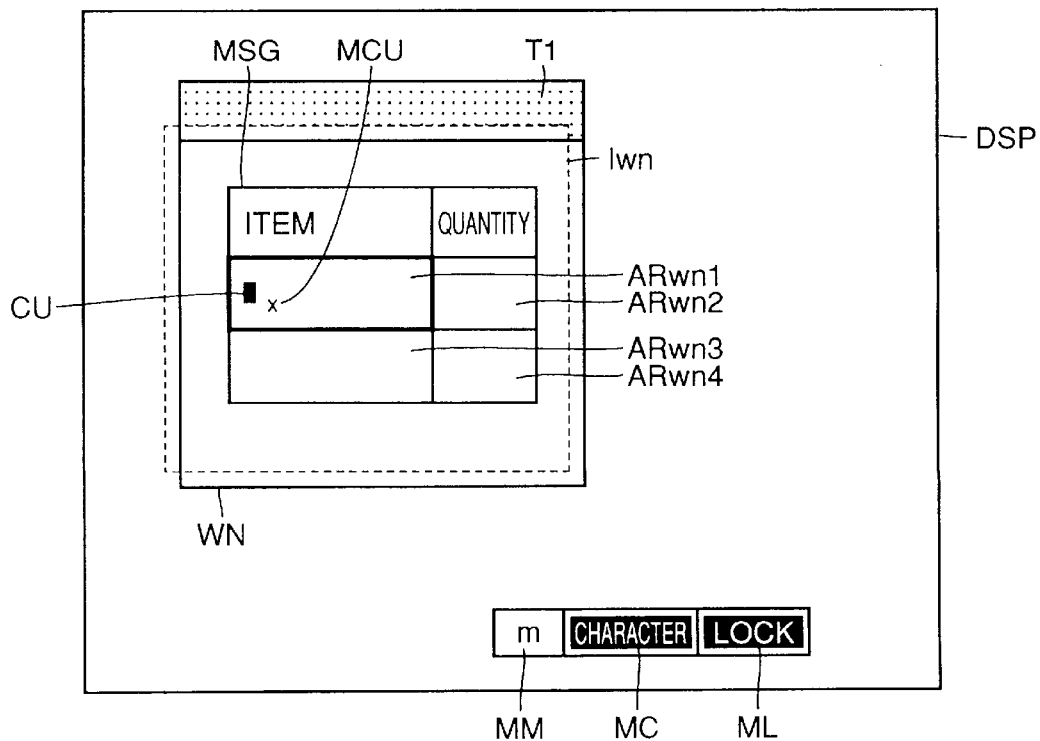

In FIGS. 24A and 24B, the operation mode is in the writing mode on the window basis, and a window having a keyboard focus is small. FIGS. 24A and 24B show an example of operation of this embodiment when it is difficult to carry out writing in the small window.

In FIG. 24A, first in the mouse emulation mode, the position PSms is pointed with a pen. After the position of the cursor CU is designated by moving the mouse cursor to the position PSms, the lock mode of character input is selected.

Usually, the keyboard focus is controlled by the window manager. However, some application programs set the keyboard focus by themselves. Consider the case where the application program opens windows ARwn1 to ARwn4, and the application program sets the keyboard focus in the window ARwn1 based on pointing operation, for example. In this case, when the character input mode or the lock mode of character input is selected, a window Iarwn1 for handwriting coordinate input is set in the same size as that of the window ARwn1.

However, when the size of the window for handwriting coordinate input is small as described above, an area in which writing can be carried out is limited, and it is difficult to write a character in the area. In this embodiment, when the size of the window for handwriting coordinate input is smaller than a prescribed size, if there is a parent window of the window for handwriting coordinate input, the parent window (the window WN in the figure) is set as the window for handwriting coordinate input. As a result, as shown in FIG. 24B, the window Iwn for handwriting coordinate input becomes wider, and it is easier to write a character.

Figure 25A:
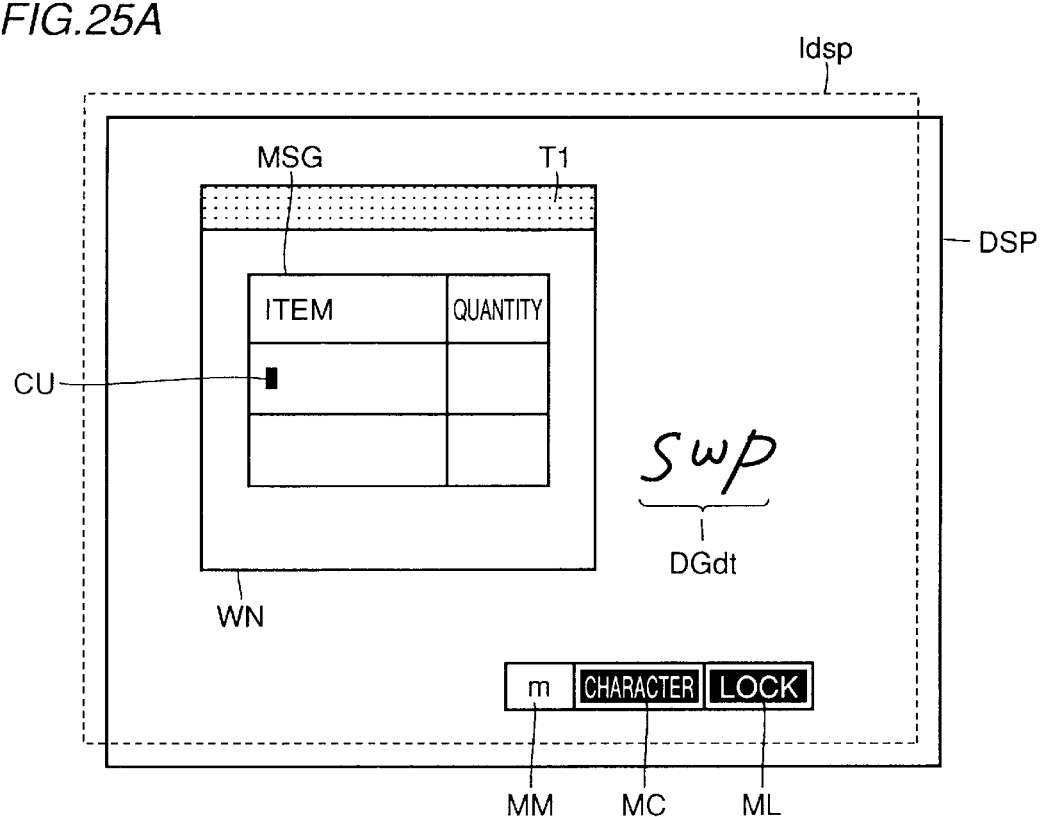
FIGS. 25A, 25B and FIG. 26 are diagrams for explaining temporary display operation of the result of recognition according to this embodiment.
Figure 25B:
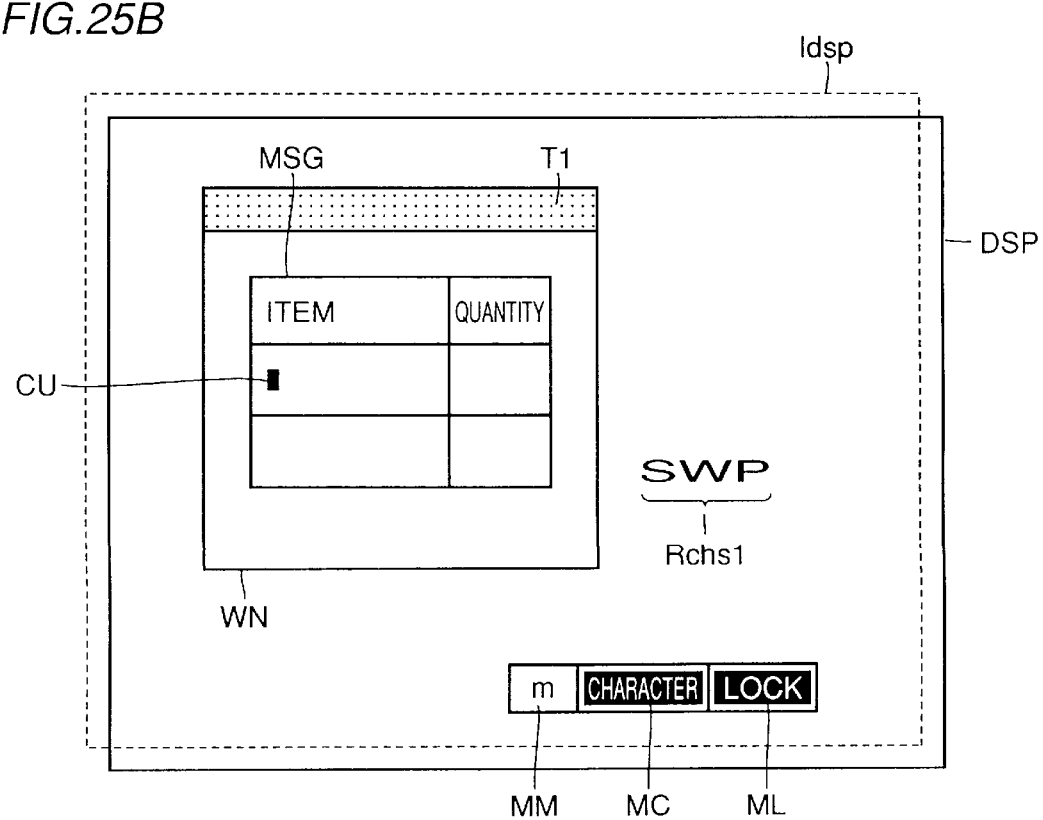
Figure 26:
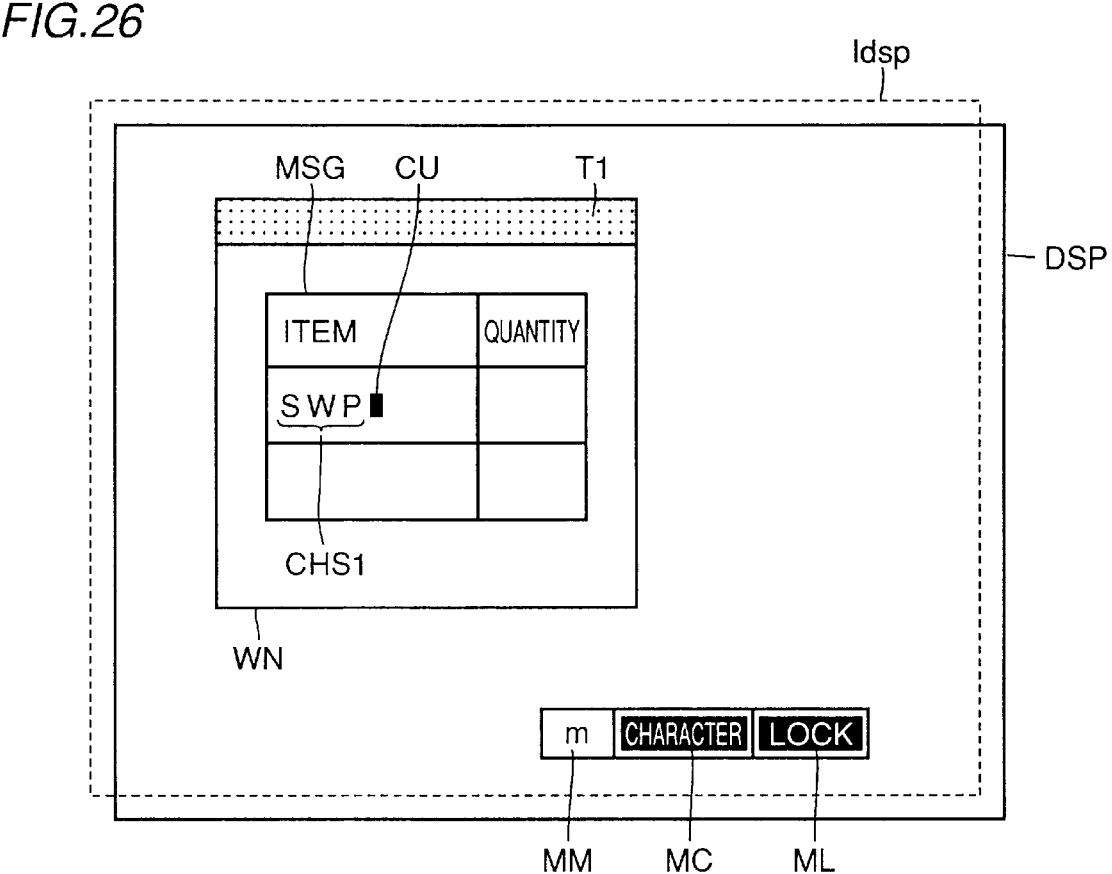

FIGS. 25A, 25B and 26 are diagrams showing an example of operation. In this operation, when the recognition result is output to the application window, the recognition result is once displayed at the writing position only for a prescribed time.

FIG. 25A shows a state where the characters "SWP" are written after the lock mode of character input is selected. When the handwriting DGdt is recognized, a recognition result Rchs1 is displayed at the writing position for a prescribed time as shown in FIG. 25B. Then, the recognition result is output to the application window WN. As a result, the screen is in a state shown in FIG. 26. As described above, by displaying the recognition result once at the writing position, the user can easily confirm the recognition result.

Figure 27:
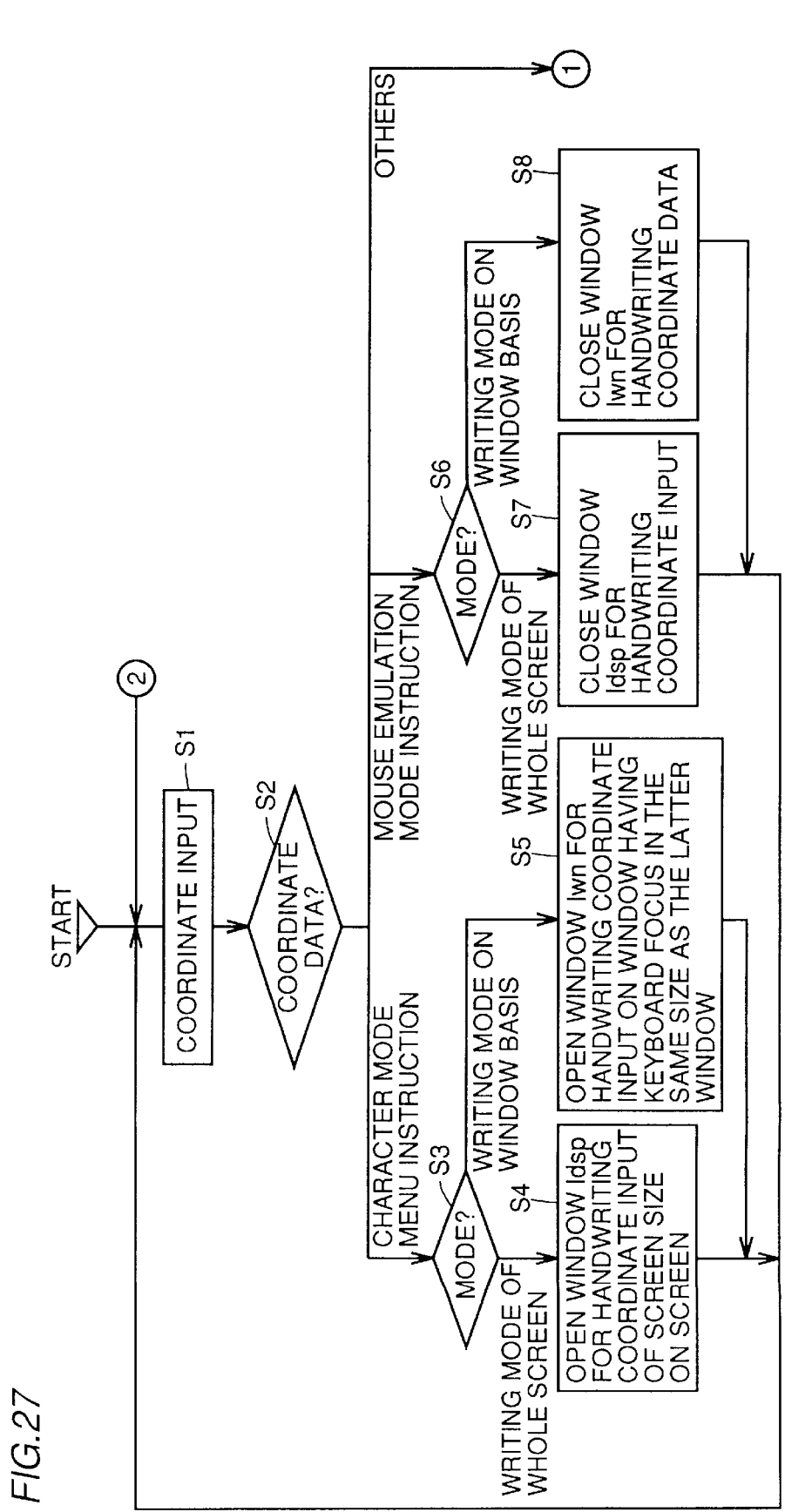
FIGS. 27 and 28 are flow charts for explaining the main operation of this embodiment.
Figure 28:
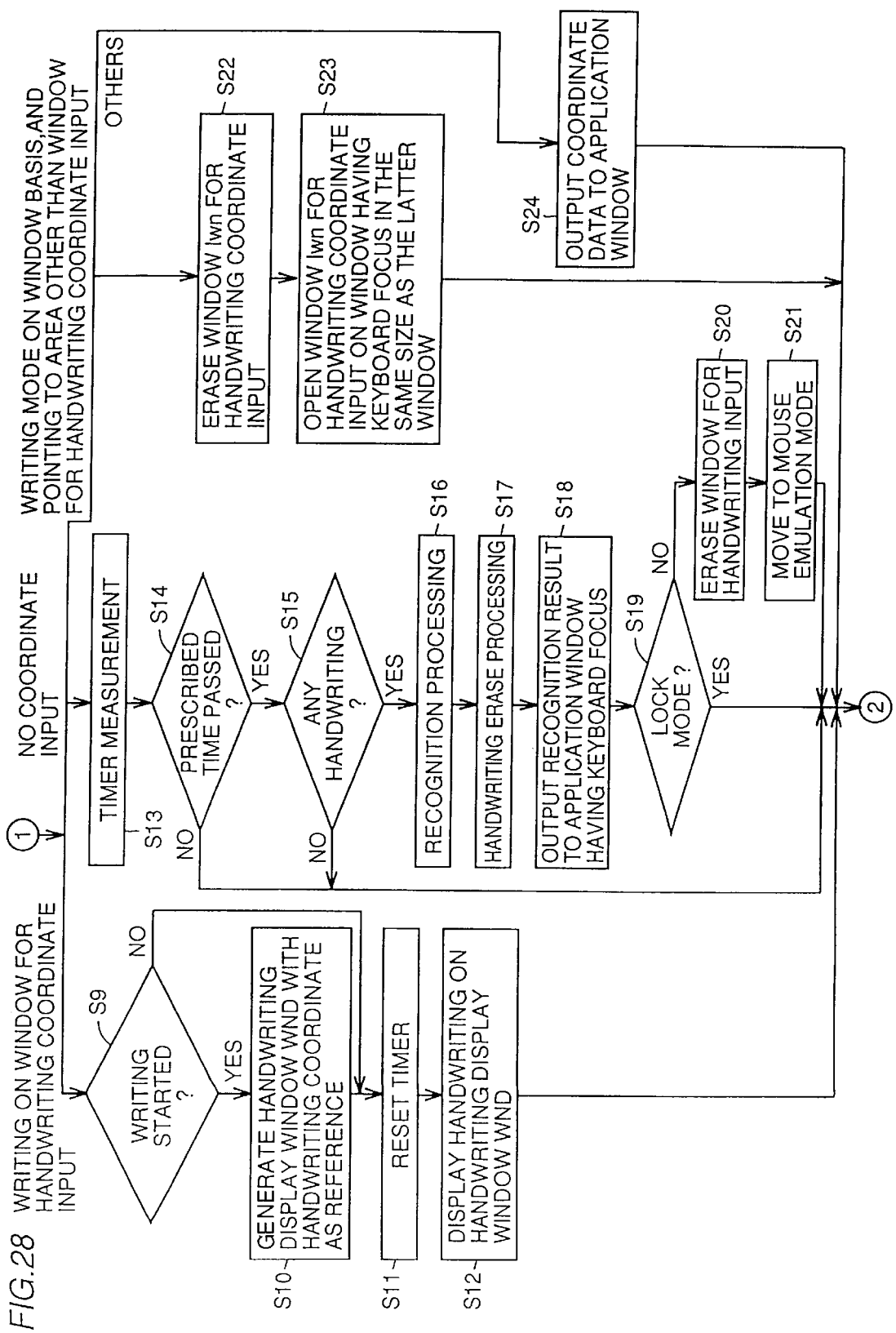

FIGS. 27 and 28 are a flow chart for explaining main operation of this embodiment. First, referring to FIG. 27, if there is coordinate input at step S1, the data is input. Then, at step S2, the following operation is determined according to presence or absence of the coordinate input and the coordinate value. In the case of coordinate input by a menu instruction in the character input mode, it is determined whether the operation mode is the writing mode of the whole screen or the writing mode on the window basis at step S3. In the case of the writing mode of the whole screen, the window Idsp for handwriting coordinate input of the screen size is generated at step S4. In the case of the writing mode on the window basis, the window Iwn for handwriting coordinate input is generated on a window having a keyboard focus in the same size as that of the latter window.

In the case of coordinate input in the mouse emulation mode, it is determined whether the operation mode is the writing mode of the whole screen or the writing mode on the window basis at step S6. In the case of the writing mode of the whole screen, the window Idsp is erased at step S7. In the case of the writing mode on the window basis, the window Iwn is erased at step S8.

Then, referring to FIG. 28, in the case of coordinate input by writing on the windows Idsp and Iwn, it is determined whether or not the writing has just been started at step S9. If the writing has just been started, the handwriting display window WN2 is generated with a handwriting coordinate (start point) as a reference at step S10. At step S11, a timer for determining end of writing operation is reset. Then, at step S12, the handwriting is displayed on the handwriting display window WND. Other than the case of start, step S10 is skipped. At step S11, the timer for determining end of writing operation is reset, and at step S12, the handwriting is displayed on the handwriting display window WND.

When there is no coordinate input, timer measurement is carried out at step S13. Timer measurement is carried out at step S13 whenever there is no coordinate input, in order to detect no operation for a prescribed time. Then, at step S14, it is determined whether or not the prescribed time has passed. At step S15, it is determined whether or not there is any handwriting. When there is a handwriting and the prescribed time has passed, that is, when no operation for the prescribed time after writing is detected, end of writing operation is determined, and the processing of step S16 and et seq. is carried out.

When end of writing operation is determined, recognition processing is carried out to handwriting coordinate data at step S16. At step S17, handwriting erase processing is carried out. More specifically, the handwriting display window WNd is erased, and the re-drawing request is sent to the application program. Then, at step S18, the recognition result is output to the application window having a keyboard focus. After that, at step S19, it is determined whether or not the operation mode is the lock mode. If the operation mode is the character input mode and the character input mode is not the lock mode, the window for handwriting coordinate input is erased at step S20, and the operation mode moves to the mouse emulation mode at step S21.

When pointing is carried out to an area outside the window for handwriting coordinate input in the writing mode on the window basis, that is, when the position of the keyboard focus is changed, the window Iwn is once erased at step S22. Then, at step S23, the window Iwn for handwriting coordinate input is newly opened on the window having a keyboard focus. In the other cases (coordinate input in the mouse emulation mode), the coordinate data is output to the application mode at step S24.

In the above embodiment, switching is carried out between the writing mode of the whole screen and the writing mode on the window basis by instruction of a window area, not shown, on the screen. However, switching may be carried out between the above modes by instruction of a fixed area outside the screen on the tablet. Alternatively, the operation mode may be fixed in advance to either the writing mode of the whole screen or the writing mode on the window basis.

Further, in this embodiment, a window having a keyboard focus at the time of pen input is fixed. However, a window at the touch position at the time of pen input may be set as a widow having a keyboard focus. More specifically, from the standpoint of convenience on the user side, it is considered that a character written in a certain window is naturally input to the window. As described above, by setting a window having a position of character input to a window having a keyboard focus, the operation performance is improved.

Figure 29:
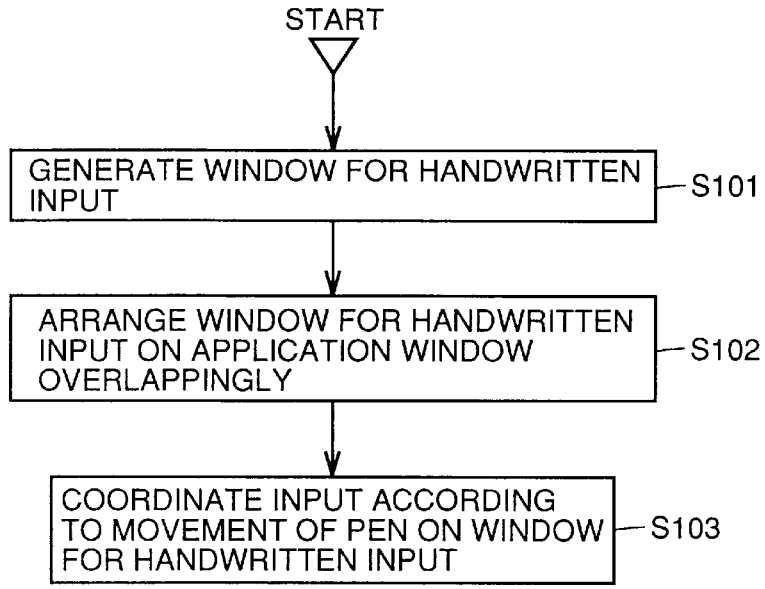
FIG. 29 is a flow chart for explaining first display operation of a window for handwritten input according to this embodiment.

Operation of the handwritten character input device of this embodiment will now be described in more detail. FIG. 29 is a flow chart for explaining first display operation of a window for handwritten input.

Referring to FIG. 29, first at step S101, a window for handwritten input is generated. The window for handwritten input is a transparent window or a permeable window. More specifically, as the window for handwritten input used in this embodiment, any window may be used through which the user can visually confirm the content of an application window, displayed by an application program, displayed therebehind. Alternatively, the display content of the application window may be visually confirmed through the window for handwritten input equivalently by displaying the content displayed by the application window on the window for handwritten input, as described hereinafter. The above described windows Idsp, Idsp2, Iwn, Iwn2, Iarwn1, and the like correspond to the window for handwritten input.

Then, at step S102, the window for handwritten input is arranged on the application window overlappingly. The above described windows WN, WN2, ARwn1, and the like correspond to the application window.

Then, at step S103, a coordinate is input according to movement of a pen on the window for handwritten input.

By the above operation, a handwritten character can be input with a pen without changing an application program using a keyboard and a mouse as an input device. As a result, a character or an editing symbol can be directly written at an arbitrary position on the application window displayed by the application program or on the display screen to carry out input and editing easily.

Figure 30:
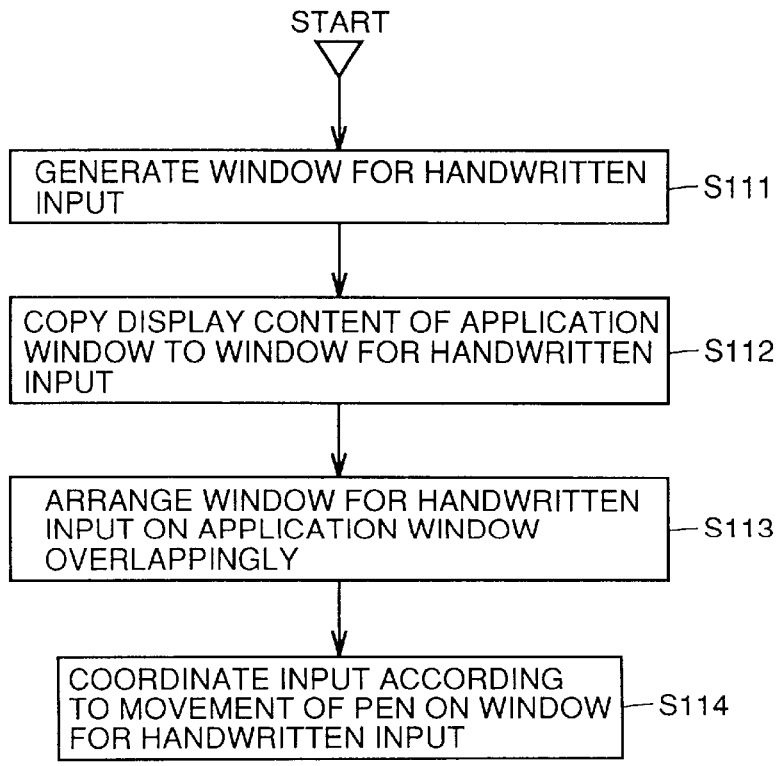
FIG. 30 is a flow chart for explaining second display operation of the window for handwritten input according to this embodiment.

Description will now be given of operation when the same screen content as that of an application window is displayed on a window for handwritten input. FIG. 30 is a flow chart for explaining second display operation of a window for handwritten input.

Referring to FIG. 30, first at step S111, a window for handwritten input is generated. As this window for handwritten input, an opaque window is used in the initial state. Then, at step S112, the display content of an application window is copied to the window for handwritten input. This is equivalent to a state where the window for handwritten input becomes transparent. Then, at step S113, the window for handwritten input is arranged on the application window overlappingly. Finally, at step S114, a coordinate is input according to movement of a pen on the window for handwritten input. It should be noted that step S113 may be carried out before step S112.

By the above operation, even when the window for handwritten input is not transparent, the same effect as the case of a transparent window can be obtained.

Operation will now be described for matching an area of a window for handwritten input with an area of an application window with reference to a flow chart of FIG. 31.

Referring to FIG. 31, first at step S121, a window for handwritten input is generated. This window for handwritten input is a permeable window, which corresponds to the above described window Iwn.

Then, at step S122, an area of an application window is checked, and an area of the window for handwritten input is matched with the area of the application window. Here, the application window corresponds to the above described windows WN and WN2.

Then, at step S123, the window for handwritten input is arranged on the application window overlappingly. Finally, at step S124, a coordinate is input according to movement of a pen on the window for handwritten input.

By the above described operation, the area of the window for handwritten input and the area of the application window can be matched.

Operation of setting a window for handwritten input in the whole area of a display screen will now be described with reference to a flow chart of FIG. 32.

Referring to FIG. 32, first at step S131, a window for handwritten input is generated. Here, the window for handwritten input is a permeable window, which corresponds to the above described window Iwn.

Then, at step S132, the whole area of a display screen is checked, and an area of the window for handwritten input is matched with the display area of the whole display screen. Then, at step S133, the window for handwritten input is arranged on the whole display screen overlappingly. Finally, at step S134, a coordinate is input according to movement of a pen on the window for handwritten input.

By the above described operation, the window for handwritten input can be displayed in the whole area of the display screen. Therefore, the user can write a character by hand at an arbitrary position on the display screen, making the operation easier.

A combination of the operations of FIGS. 29 to 32 will now be described with reference to a flow chart of FIG. 33.

Figure 33:
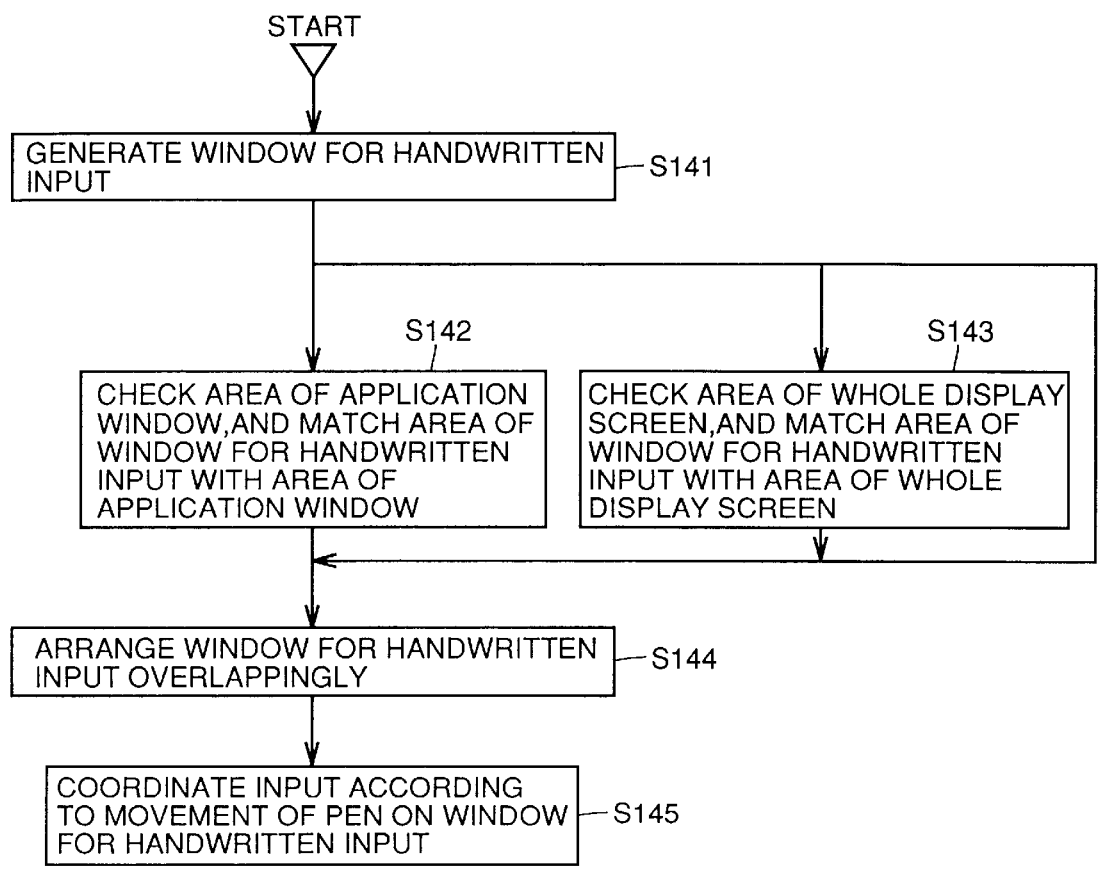
FIG. 33 is a flow chart for explaining operation when respective operations shown in FIGS. 29 to 32 are combined.

Referring to FIG. 33, first at step S141, a window for handwritten input is generated. Here, the window for handwritten input is a transparent window, which corresponds to the above described window Iwn.

Then, one of the following three kinds of operation is carried out. First at step S142, the area of an application window is checked, and an area of the window for handwritten input is matched with the area of the application window. Here, the application window corresponds to the above described windows WN and WN2. Alternatively, at step S143 instead of step S142, an area of the whole display screen is checked, and the area of the window for handwritten input is matched with the area of the whole display screen. Alternatively, the procedure skips the above described steps S142 and S143, and goes to step S144.

Then, at step S144, the window for handwritten input set at the above described step S142 or S143 is arranged on the application window or the whole display screen overlappingly. Finally, at step S145, a coordinate is input according to movement of a pen on the window for handwritten input.

By the above described operation, the combination of the operations shown in FIGS. 29 to 32 can be carried out.

Operation of setting a handwriting display area based on a writing start position in a window for handwritten input will now be described with reference to a flow chart of FIG. 34.

Figure 34:
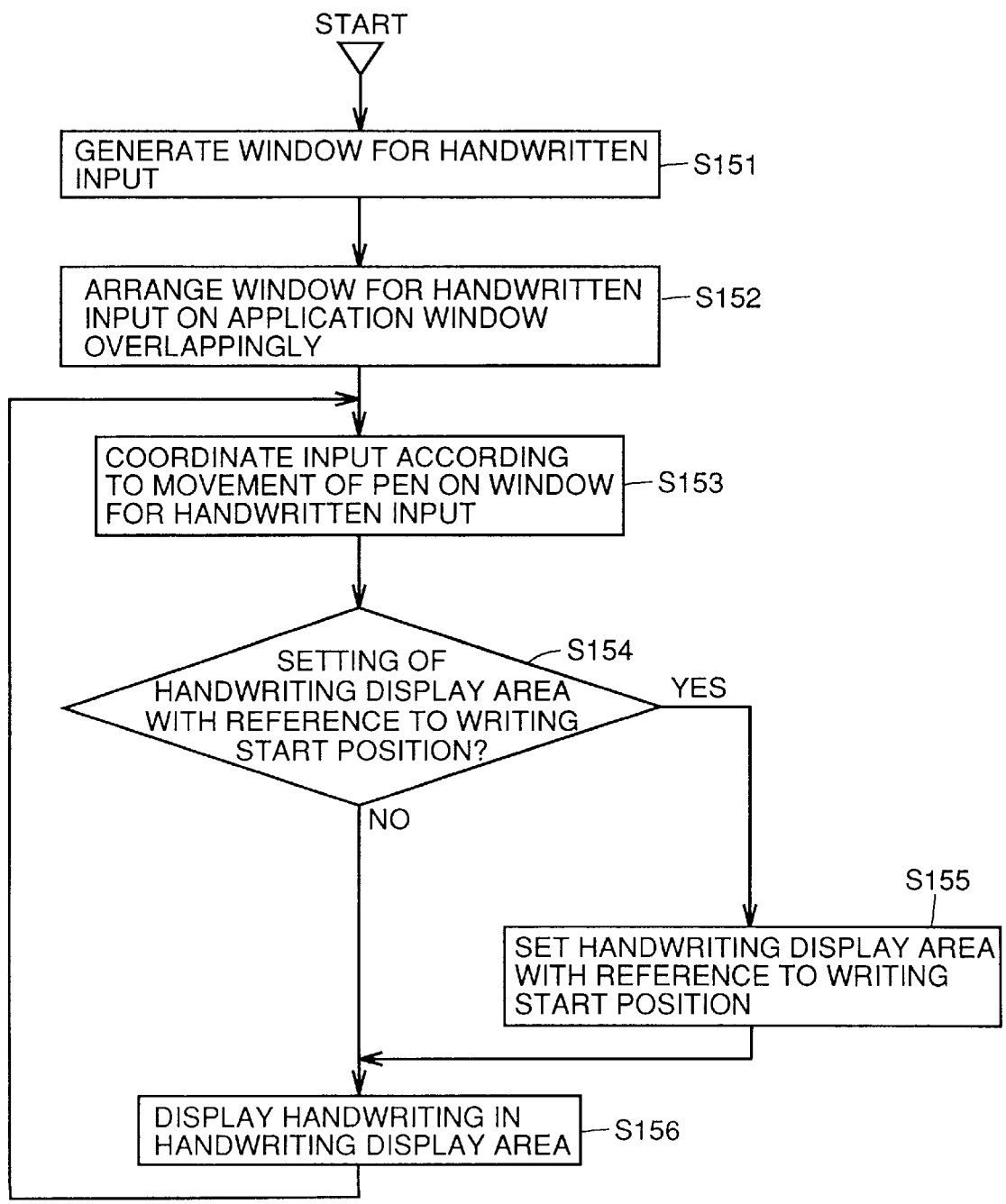
FIG. 34 is a flow chart for explaining setting operation when a handwriting display area is set according to a writing start position on the window for handwritten input according to this embodiment.

Referring to FIG. 34, first at step S151, a window for handwritten input is generated. Here, the window for handwritten input is a permeable window, which corresponds to the above described window Iwn.

Then, at step S152, the window for handwritten input is arranged on an application window overlappingly. Here, the application window corresponds to the above described window WN.

Then, at step S153, a coordinate is input according to movement of a pen on the window for handwritten input.

Then, at step S154, it is determined whether or not a handwriting display area is set according to a writing start position in the window for handwritten input. When it is set, the procedure goes to step S155, and when it is not set, the procedure goes to step S156.

When it is determined that the area is set according to the writing start position at step S154, the handwriting display area is set, when the user starts writing after arranging the window for handwritten input, with reference to the writing start position, at step S155. Here, the handwriting display area corresponds to the above described handwriting display area DA.

Then, at step S156, a handwriting is displayed in the handwriting display area. After display, the procedure goes to step S153, and continues the processing thereafter.

By the above described operation, the handwriting display area can be set based on the writing start position, further improving the operation performance.

Figure 35:
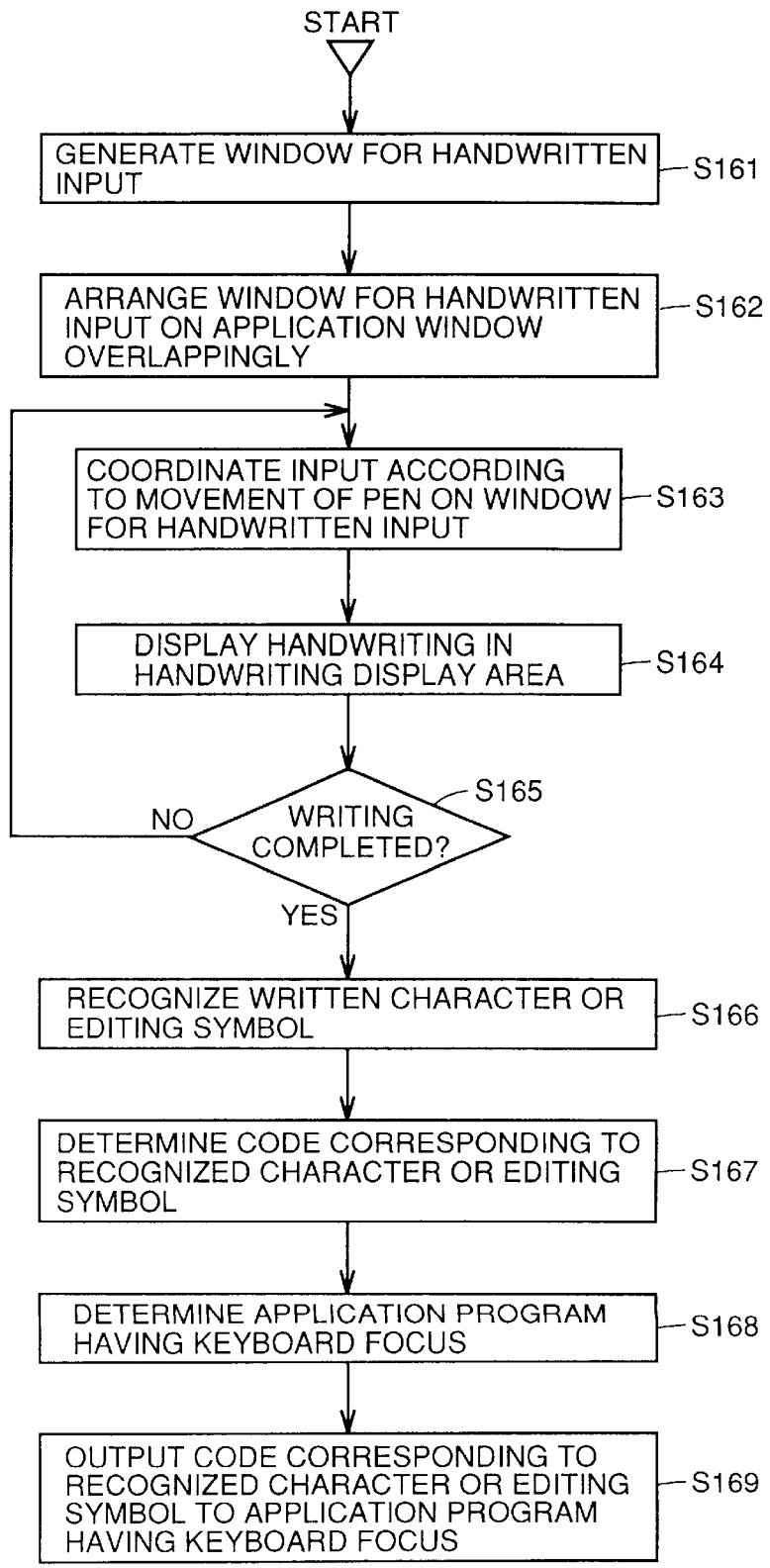
FIG. 35 is a flow chart for explaining output operation for outputting a code corresponding to a character or an editing symbol to an application program having a keyboard focus according to this embodiment.

Operation will be described of outputting a handwritten character input with a pen to an application program, prepared for mouse input and keyboard input, having a keyboard focus without changing the application program. FIG. 35 is a flow chart for explaining operation of outputting each code corresponding to a handwritten character to an application program having a keyboard focus.

Referring to FIG. 35, first at step S161, a window for handwritten input is generated. Here, the window for handwritten input is a permeable window, which corresponds to the above described window Iwn.

Then, at step S162, the window for handwritten input is arranged on an application window overlappingly. Here, the application window corresponds to the above described window WN.

Then, at step S163, a coordinate is input according to movement of a pen on the window for handwritten input.

By the above described steps S161 to S163, it is possible to detect a character or an editing symbol written with a pen at an arbitrary position on a display screen, and to input the coordinate.

Then, at step S164, a handwriting is displayed on a handwriting display area. Here, the handwriting display area corresponds to the above described handwriting display area DA.

Then, at step S165, it is determined whether or not writing is completed. More specifically, it is determined whether or not a prescribed time has passed. When it is determined that writing is completed, the procedure goes to step S166. When it is determined that writing is not completed, the procedure goes to step S163, and continues the processing thereafter.

When it is determined that writing is completed at step S165, a written character or a written editing symbol is recognized at step S166. Then, at step S167, a code corresponding to the recognized character or editing symbol is determined. It should be noted that this code is of the same specification as that of key input.

Then, at step S168, an application program having a keyboard focus is determined. More specifically, an application program (application window) accepting key input is determined. Note that step S168 has only to be carried out before step S169. Step S168 may be carried out before any step preceding step S167. More specifically, determination of an application program having a keyboard focus has only to be carried out before output of a code corresponding to the recognized character or editing symbol. This holds also in each of the following flow charts.

Then, at step S169, a code corresponding to the recognized character or editing symbol is output to the application program having a keyboard focus.

By the above described operation, a handwritten character can be automatically input to the application program having a keyboard focus. Since a handwritten character can be input with a pen without changing an application program not corresponding to pen input, the operation performance is improved.

Description will now be given of operation when writing is carried out at an arbitrary position in the whole area of a display screen with an application program having a keyboard focus fixed with reference to a flow chart of FIGS. 36 and 37.

Figure 36:
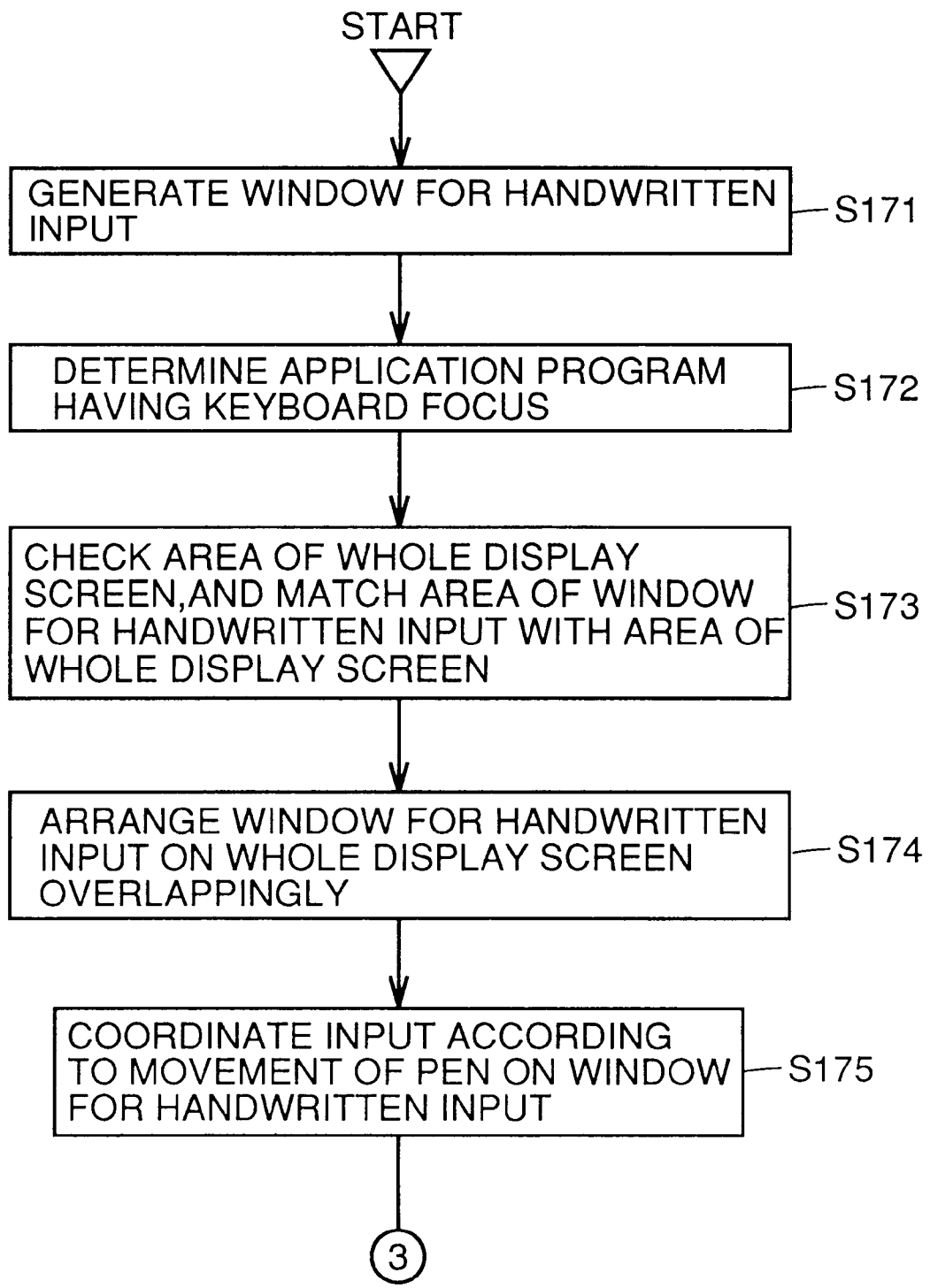
FIGS. 36 and 37 are flow charts for explaining operation when a handwritten character is input from an arbitrary position of a display screen with a keyboard focus fixed, according to this embodiment.

Referring to FIG. 36, first at step S171, a window for handwritten input is generated. Here, the window for handwritten input is a permeable window, which corresponds to the above described window Iwn.

Then, at step S172, an application program having a keyboard focus is determined. Then, at step S173, the whole area of a display screen is checked, and an area of the window for handwritten input is matched with the whole area of the display screen. Then, at step S174, the window for handwritten input is arranged on the whole display screen overlappingly. Then, at step S175, a coordinate is input according to movement of a pen on the window for handwritten input.

By the above described steps S171 to S175, a character or an editing symbol can be written with a pen at the right position of the display screen, and the handwritten character can be detected. Further, since the application program having a keyboard focus is fixed (a keyboard focus is not changed) by the steps S172 to S175, writing can be carried out at an arbitrary position on the display screen.

Figure 37:
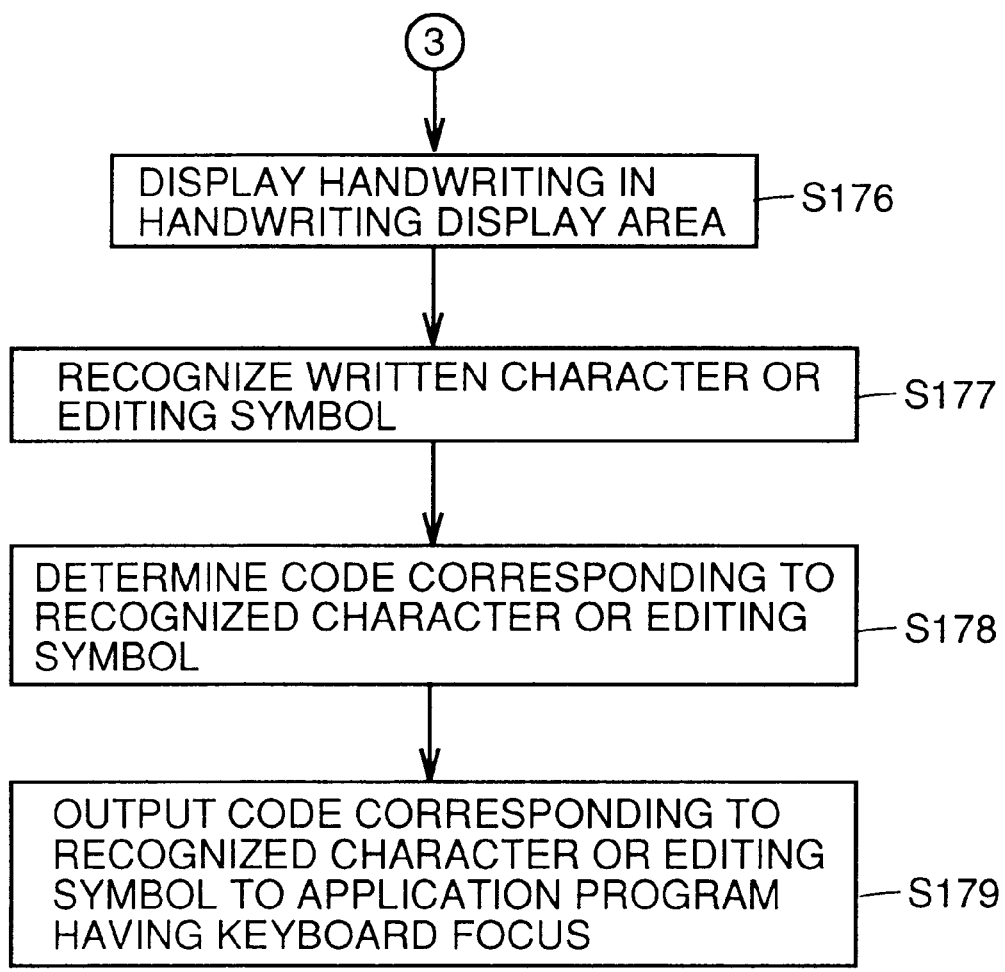

Referring to FIG. 37, at step S176, a handwriting is displayed in a handwriting display area. Here, the handwriting display area corresponds to the above described handwriting display area DA. Then, at step S177, the written character or editing symbol is recognized. Then, at step S178, a code (code of the same specification as that of key input) corresponding to the recognized character or editing symbol is determined. Finally, at step S179, the code corresponding to the recognized character or editing symbol is output to the application program having a keyboard focus.

By the above described operation, a character or an editing symbol can be written at an arbitrary position on the display screen with the position of a keyboard focus fixed. Therefore, even if a character or an editing symbol is written outside the application window having a keyboard focus, or across the application window having a keyboard focus, the keyboard focus does not move, and input and editing can be carried out at a position intended by the writer.

Operation of carrying out writing at an arbitrary position of an application window displayed by an application program having a keyboard focus will now be described with reference to a flow chart of FIGS. 38 and 39.

Figure 38:
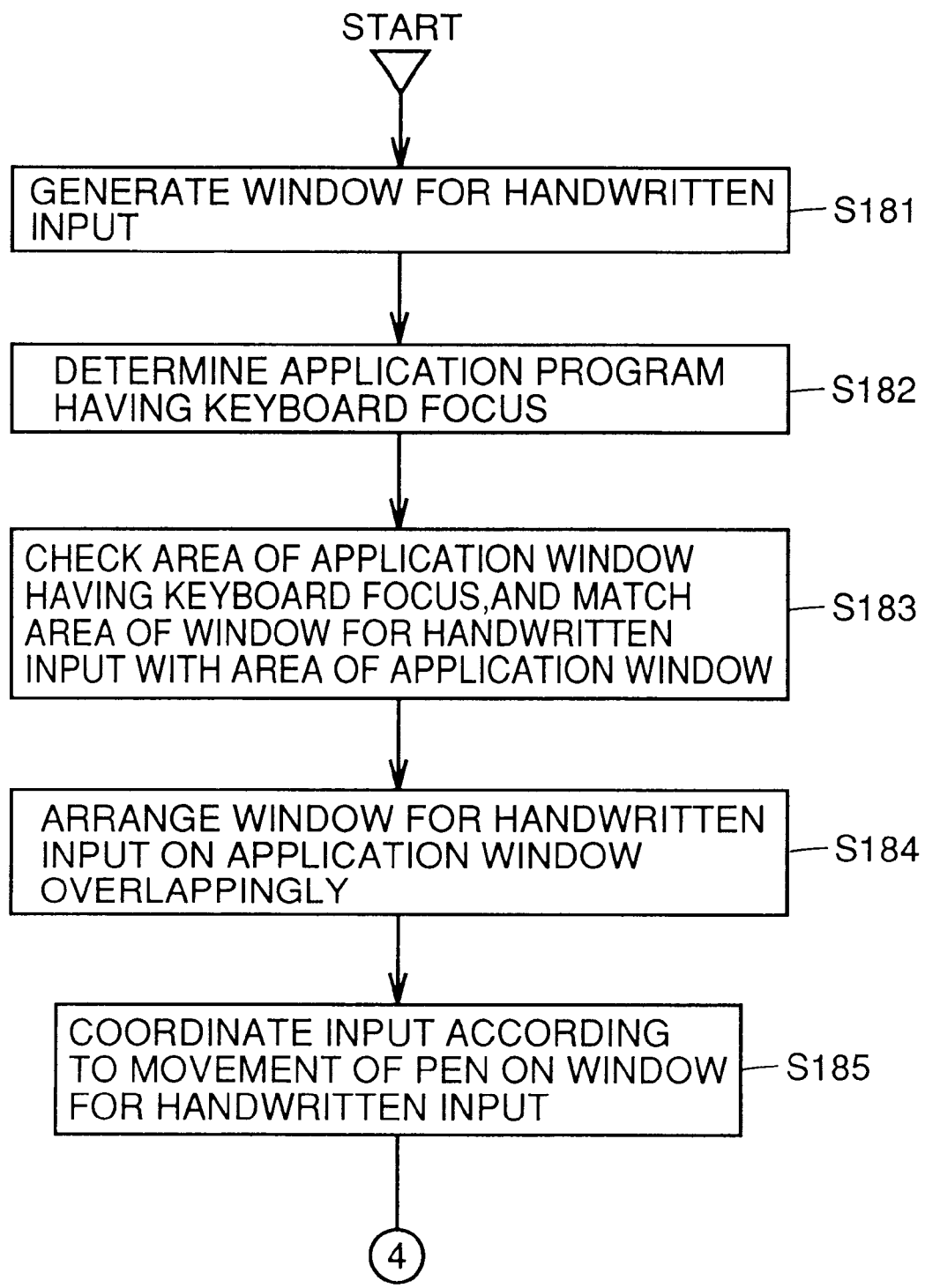
FIGS. 38 and 39 are flow charts for explaining operation when a handwritten character is input from an arbitrary position on a window of an application program having a keyboard focus according to this embodiment.

Referring to FIG. 38, first at step S181, a window for handwritten input is generated. Here, the window for handwritten input is a permeable window, which corresponds to the above described window Iwn.

Then, at step S182, an application program having a keyboard focus is determined. Then, at step S183, an area of the application window having a keyboard focus is checked, and an area of the window for handwritten input is matched with the area of the application window. Here, the application window corresponds to the above described windows WN and WN2.

Then, at step S184, the window for handwritten input is arranged on the application window overlappingly. Finally, a coordinate is input according to movement of a pen on the window for handwritten input.

By the above described steps S181 to S185, a character or an editing symbol written with a pen at an arbitrary position on the display screen can be detected. Further, by the steps S182 to S184, writing can be carried out at an arbitrary position of the application window displayed by the application program having a keyboard focus.

Figure 39:
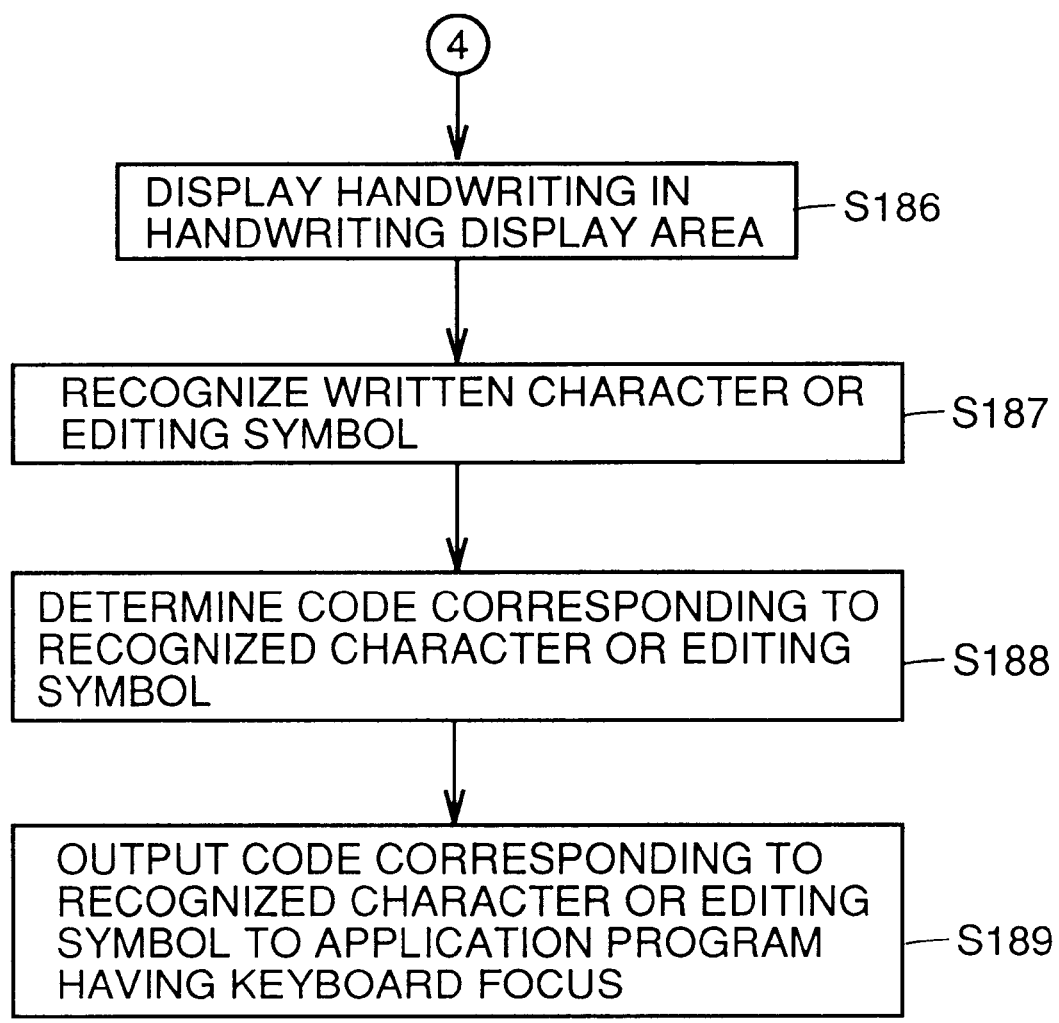

Then, the processings of steps S186 to S189 shown in FIG. 39 are carried out. Since these processings are the same as those of the steps S176 to S179 shown in FIG. 37, the detailed description will not be repeated.

By the above described processings, a character can be written by hand at an arbitrary position on the application window displayed by the application program having a keyboard focus. Therefore, when it is intended to carry out input and editing on a certain application window, the user has only to write a character or an editing symbol on the window. Further, when it is intended to carry out input and editing on another window, by touching the window with a pen, the keyboard focus moves to the window. It is possible to easily change a window on which input and editing are carried out.

Operation of storing the position of a mouse cursor before writing and returning the mouse cursor to the stored position after writing will now be described with reference to a flow chart of FIG. 40.

Figure 40:
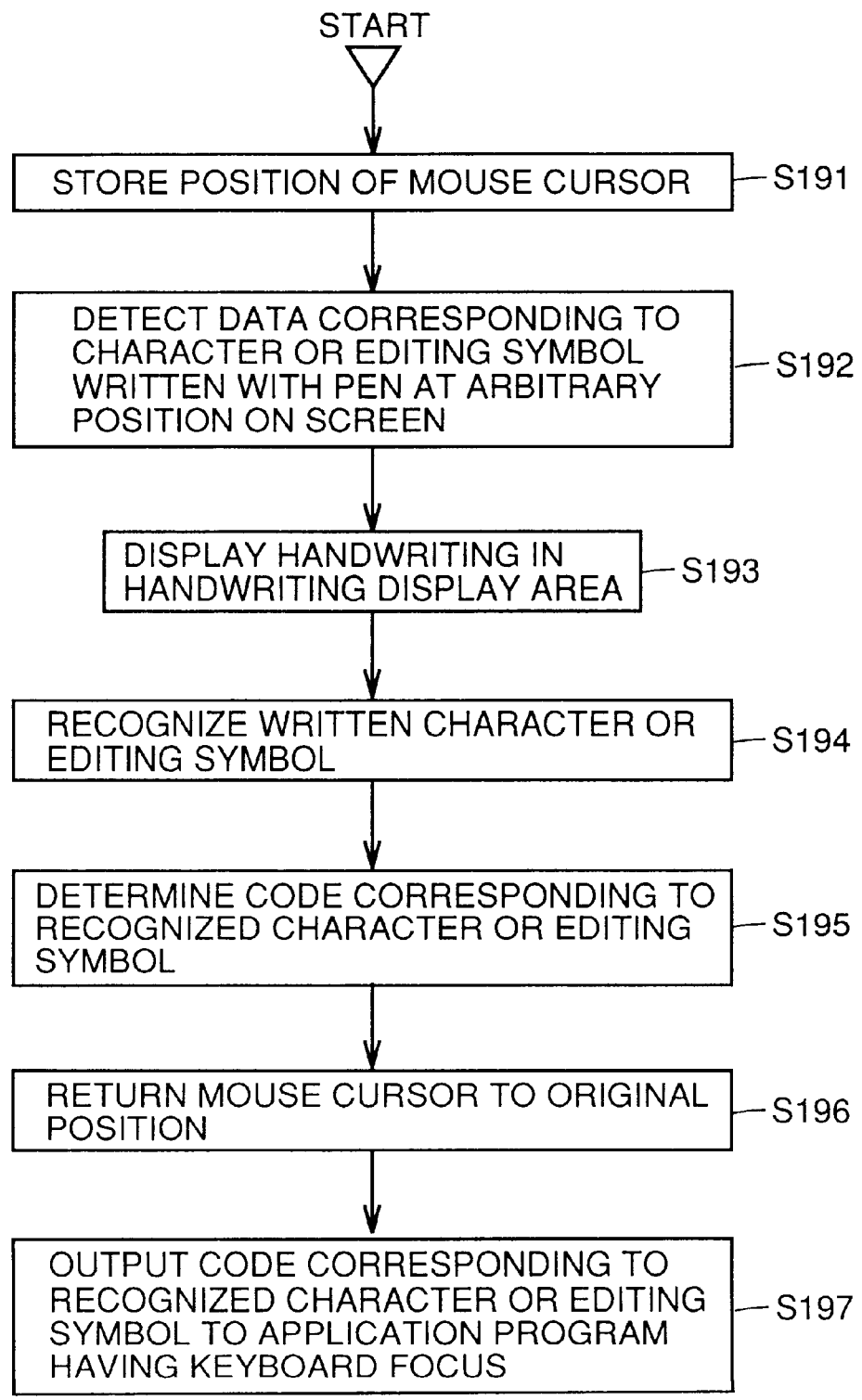
FIG. 40 is a flow chart for explaining moving operation of a mouse cursor according to this embodiment.

Referring to FIG. 40, first at step S191, the position of a mouse cursor is stored. Then, at step S192, data corresponding to a character or an editing symbol written with a pen at an arbitrary position on a display screen is detected. Then, at step S193, a handwriting is displayed in a handwriting display area. Here, the handwriting display area corresponds to the above described handwriting display area DA.

Then, at step S194, the written character or editing symbol is recognized. Then, at step S195, a code (code of the same specification as that of key input) corresponding to the recognized character or editing symbol is determined.

Then, at step S196, the mouse cursor is returned to the original position (position stored at step S191). Finally, at step S197, the code corresponding to the recognized character or editing symbol is output to an application program having a keyboard focus.

By the above described operation, even if writing of a character or an editing symbol causes the mouse cursor to move to the writing position, the mouse cursor can be returned after writing to the stored mouse cursor position before writing. Therefore, even for an application program which determines a position of input or editing by combining the keyboard focus and the mouse cursor and which sets a cursor for character editing at the determined position, the position of input or editing is not erroneously changed by writing. As a result, input or editing of a character can be carried out at a position intended by the user, further improving the operation performance.

Operation of selecting between an unlock mode and a lock mode will be described with reference to a flow chart of FIG. 41. In the unlock mode, the operation mode changes into a mouse emulation mode after a character train or an editing symbol is written in a character/editing symbol input mode. In the lock mode, the character/editing symbol input mode continues even after a character train or an editing symbol is written in the character/editing symbol input mode.

Figure 41:
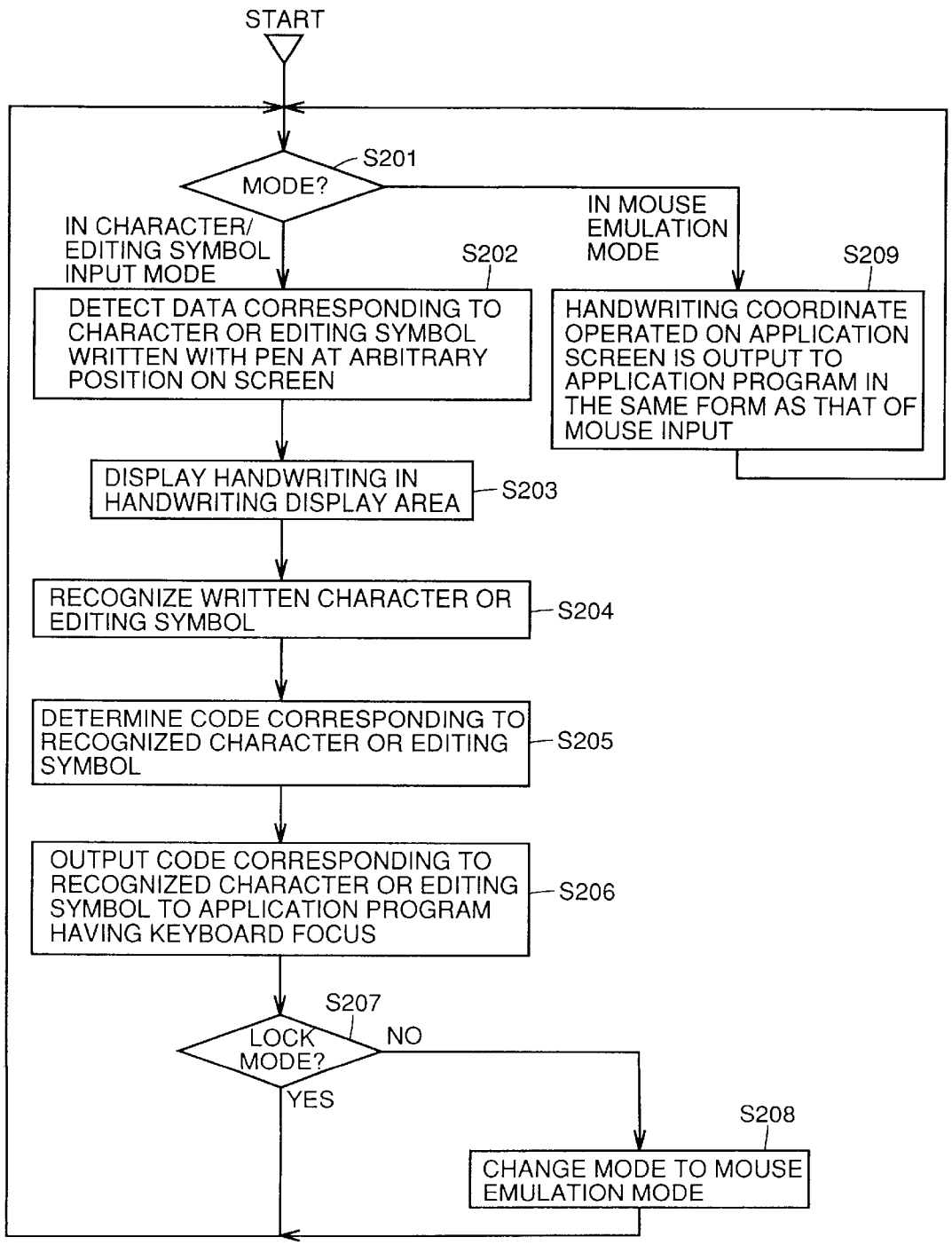
FIG. 41 is a flow chart for explaining selecting operation for selecting an unlock mode or a lock mode according to this embodiment.

Referring to FIG. 41, first at step S201, the current mode is confirmed. When the current mode is a character/editing symbol input mode, the procedure goes to step S202. When the current mode is a mouse emulation mode, the procedure goes to step S209.

When the current mode is the character/editing symbol input mode, data corresponding to a character or an editing symbol written with a pen at an arbitrary position on a display screen is detected at step S202. Then, at step S203, a handwriting is displayed in a handwriting display area. Here, the handwriting display area corresponds to the above described handwriting display area DA.

Then, at step S204, the written character or editing symbol is recognized. Then, at step S205, a code (code of the same specification as that of key input) corresponding to the recognized character or editing symbol is determined. Then, at step S206, the code corresponding to the recognized character or editing symbol is output to an application program having a keyboard focus.

Then, at step S207, it is determined whether the mode is a lock mode or an unlock mode. When the mode is the lock mode, the procedure goes to step S201 still in the character/editing symbol input mode, and the processing thereafter is continued. On the other hand, when the mode is the unlock mode, the mode of the device is changed into the mouse emulation mode at step S208. The procedure goes to step S201, and the processing thereafter is continued.

When it is determined that the mode is the mouse emulation mode at step S201, a handwriting coordinate operated on an application window is output to the application program in the same form as that of mouse input at step S209. After output, the procedure goes to step S201, and the processing thereafter is continued.

By the above described operation, in switching between the character/editing symbol input mode and the mouse emulation mode, the lock mode or unlock mode of the character/editing symbol input mode can be selected. Therefore, when the lock mode is selected, the character/editing symbol input mode continues even after writing a character train or an editing symbol, and carrying out input and editing. As a result, when input and editing of a number of characters are carried out at different times, operation of the respective modes can be carried out simply by writing a character and an editing symbol. Further, when the unlock mode is selected, the mode is automatically changed into the mouse emulation mode after writing a character train or an editing symbol, and carrying out input and editing. Therefore, when operation other than writing, such as menu selection of an application program and cursor movement by pointing, is carried out after character input and editing, operation such as pointing can be carried out immediately after writing of a character or an editing symbol without changing the mode, thereby further improving the operation performance.

Operation of excluding a specific area on a display screen from a writing area of a character or an editing symbol will now be described with reference to a flow chart of FIGS. 42 and 43.

Figure 42:
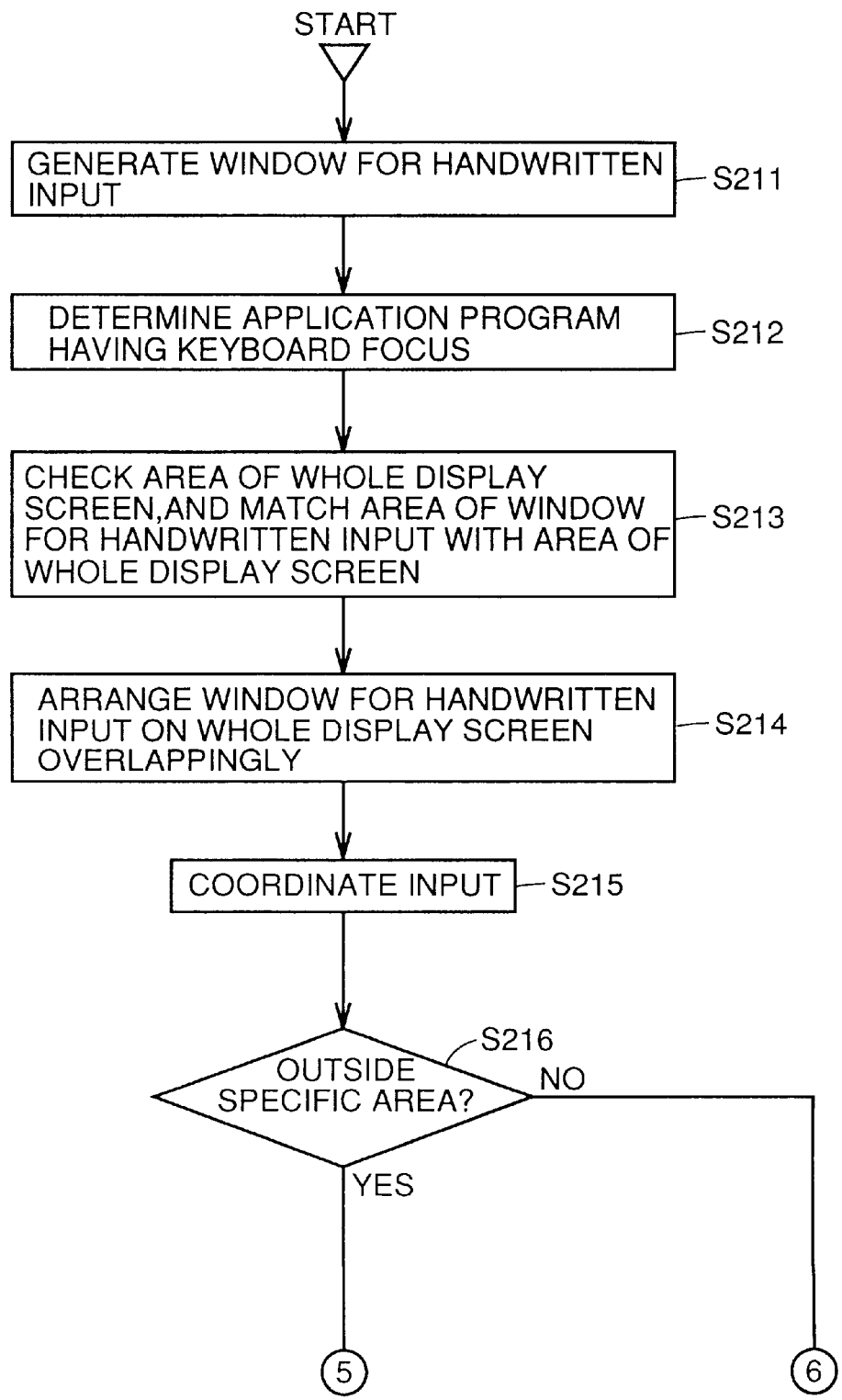
FIGS. 42 and 43 are flow charts for explaining operation for excluding a specific area on a display screen from an area for writing, according to this embodiment.

Referring to FIG. 42, first at step S211, a window for handwritten input is generated. Here, the window for handwritten input is a permeable window, which corresponds to the above described window Iwn.

Then, at step S212, an application program having a keyboard focus is determined. Then at step S213, the whole area of a display screen is checked, and an area of the window for handwritten input is matched with the area of the whole display screen. Then, at step S214, the window for handwritten input is arranged on the whole display screen overlappingly. Then, at step S215, a coordinate is input according to movement of a pen on the window for handwritten input. By the above described steps S211 to S215, data corresponding to a character or an editing symbol written with a pen at an arbitrary position on the display screen is detected.

Then, at step S216, it is determined whether or not the position of the input coordinate is outside a specific area. When it is outside the specific area, the procedure goes to step S217. When it is within the specific area, the procedure goes to step S221. Here, the specific area is a menu area (window) for switching between a character/editing symbol input mode and a mouse emulation mode, for example, which corresponds to the above described menu windows MM, MC, ML, and the like.

Figure 43:
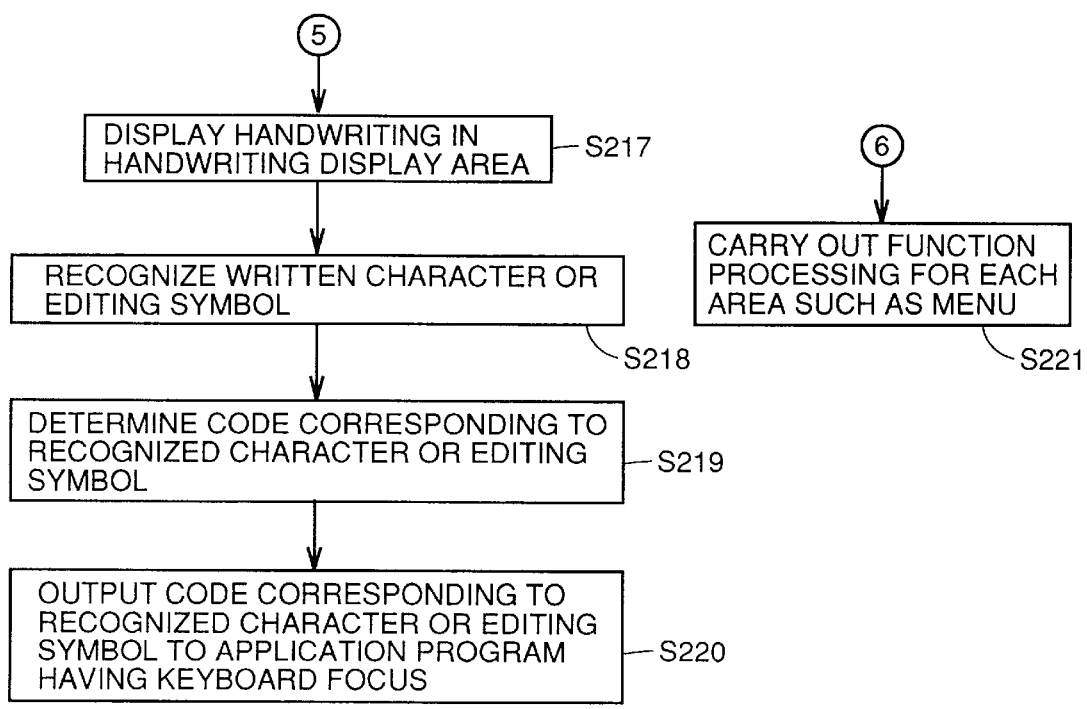

Referring to FIG. 43, when the position of the input coordinate is outside the specific area, a handwriting is displayed in a handwriting display area at step S217. Here, the handwriting display area corresponds to the above described handwriting display area DA. Then, at step S218, the written character or editing symbol is recognized. Then, at step S219, a code (code of the same specification as that of key input) corresponding to the recognized character or editing symbol is determined. Then, at step S220, the code corresponding to the recognized character or editing symbol is output to an application program having a keyboard focus.

On the other hand, when the position of the input coordinate is within the specific area, the processing corresponding to a function of each area such as a menu is carried out at step S221.

By the above described operation, the specific area on the display screen can be excluded from the writing area of a character or an editing symbol. Therefore, by displaying a menu for selecting the character/editing symbol input mode or the mouse emulation mode, and setting the menu area to the specific area, for example, the menu can be selected even if the writing area and the menu area are overlapped with each other in the character/editing symbol input mode.

Figure 44:
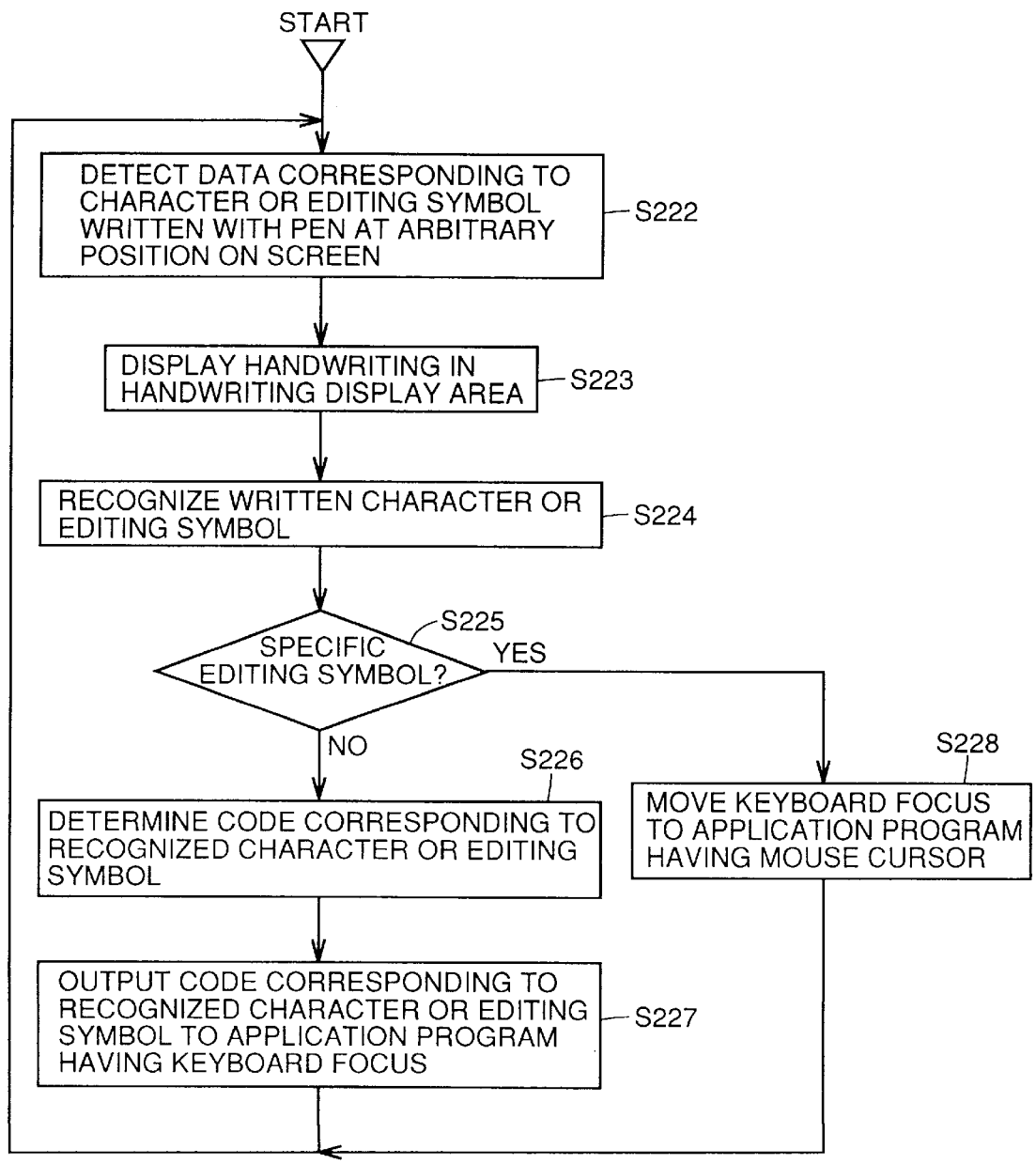
FIG. 44 is a flow chart for explaining moving operation of a keyboard focus in a character/editing symbol input mode.

When a specific editing symbol for movement of a mouse cursor is recognized in a character/editing symbol input mode, the mouse cursor is moved to the position at which the editing symbol is written, and a keyboard focus is moved to an application program having the moved mouse cursor. FIG. 44 is a flow chart for explaining the operation.

Referring to FIG. 44, first at step S222, data corresponding to a character or an editing symbol written with a pen at an arbitrary position on a display screen is detected. Then, at step S223, a handwriting is displayed in a handwriting display area. Here, the handwriting display area corresponds to the above described handwriting display area DA. Then, at step S224, the written character or editing symbol is recognized.

Then, at step S225, it is determined whether or not the written character or editing symbol is a specific editing symbol. When it is not a specific editing symbol, the procedure goes to step S226. When it is a specific editing symbol, the procedure goes to step S228.

When it is not a specific editing symbol, a code (code of the same specification as that of key input) corresponding to the recognized character or editing symbol is determined at step S226.

Then, at step S227, the code corresponding to the recognized character or editing symbol is output to an application program having a keyboard focus. After output, the procedure goes to step S222, and the processing thereafter is continued.

On the other hand, when it is a specific editing symbol, a keyboard focus is moved to an application window displayed by an application program having a mouse cursor at step S228. After movement, the procedure goes to step S222, and the processing thereafter is continued.

By the above described processing, when a specific editing symbol for movement of a mouse cursor is written after a character is written in a character/editing symbol input mode, the mouse cursor is moved to the writing position of the editing symbol. Generally, the application program regards the position of the mouse cursor as the editing position. Therefore, when character input and editing at another position are carried out after writing of a character, the application program can be operated simply by writing a character or an editing symbol. Therefore, the switching operation from the character/editing symbol input mode to the mouse emulation mode and the switching operation from the mouse emulation mode to the character/editing symbol input mode are unnecessitated, thereby simplifying the operation.

Operation of setting a handwriting display area of a prescribed size allowing writing of several characters at a prescribed writing start position at the time of start of writing, erasing the handwriting display area after completion of the writing recognition processing, and re-drawing the handwriting display area will now be described with reference to a flow chart of FIGS. 45 and 46.

Figure 45:
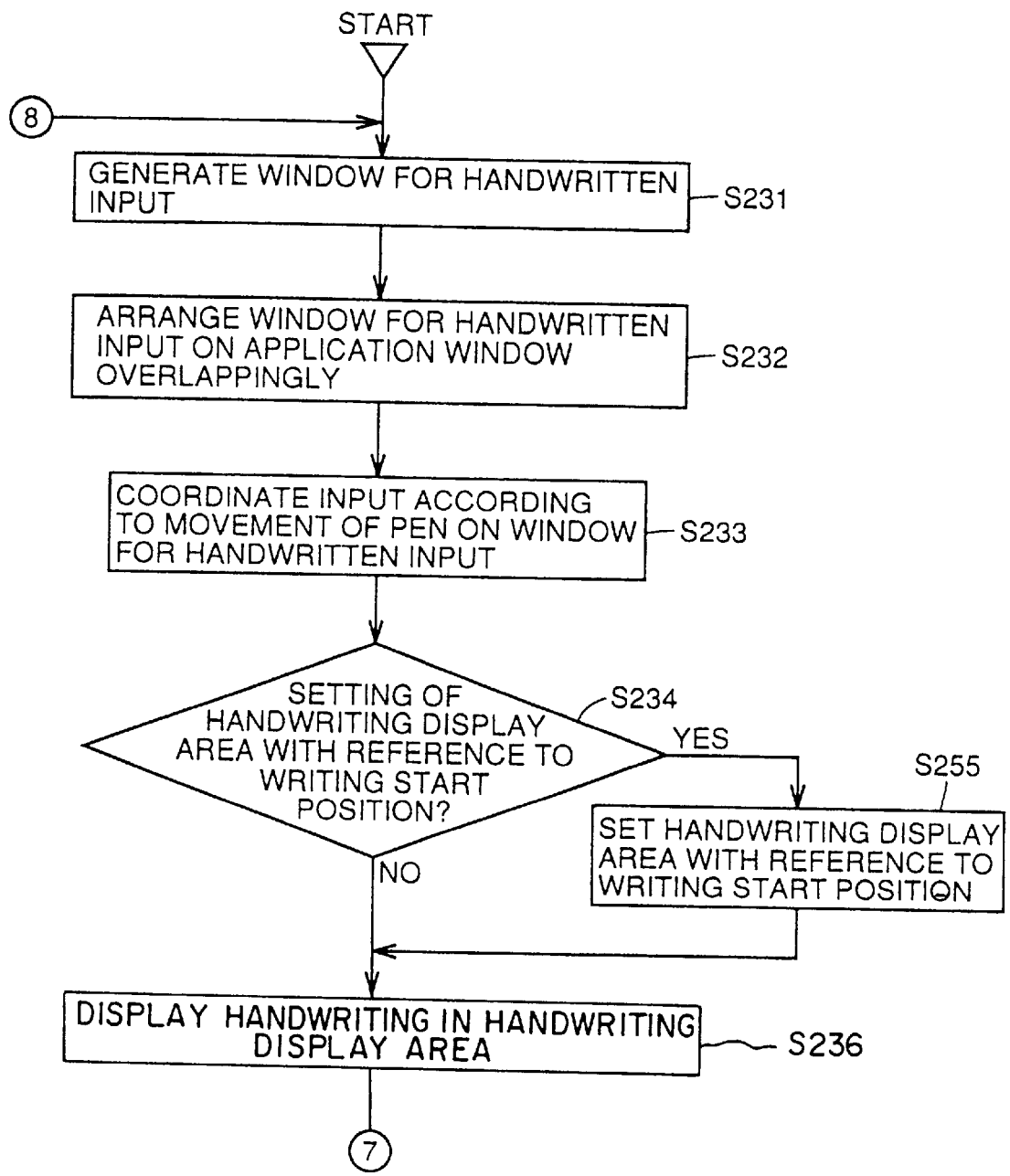
FIGS. 45 and 46 are flow charts for explaining re-drawing operation of a handwriting display area according to this embodiment.
Figure 46:
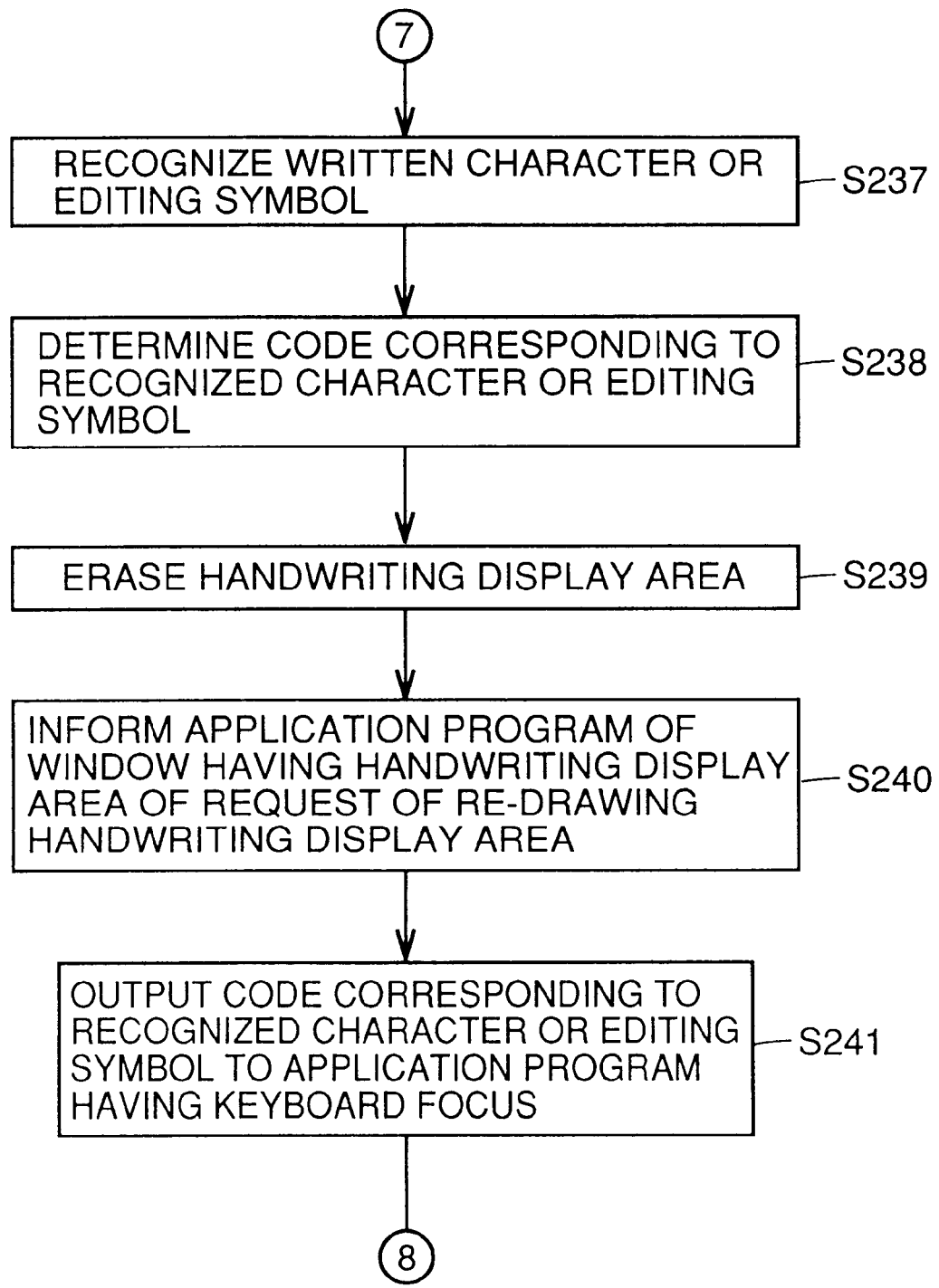

Since steps S231 to S236 shown in FIG. 45 are similar to steps S151 to S156 shown in FIG. 34, the detailed description of each step will not be repeated. After step S236 of FIG. 45, the procedure goes to step S237 shown in FIG. 46, and the written character or editing symbol is recognized. Then, at step S238, a code (code of the same specification as that of key input) corresponding to the recognized character or editing symbol is determined at step S238. Then, at step S239, the handwriting display area is erased.

Then, at step S240, a request for re-drawing the handwriting display area, that is, a request for returning the screen of an application window to its original state before handwriting display is sent to an application program of a window having the handwriting display area. As a result, the application program re-draws the handwriting display area, and the handwriting display area is displayed as if only the handwriting were erased. Finally at step S241, the code corresponding to the recognized character or editing symbol is output to the application program having a keyboard focus. After output, the procedure goes to step S231 shown in FIG. 45, and the processing thereafter is continued.

As described above, by limiting the size of the handwriting display area to an area for several characters, a handwriting is displayed only in the limited area, and re-drawing of the screen is carried out. As a result, time required for re-drawing is reduced, and change of the screen by re-drawing is decreased. Therefore, flicker of the screen by re-drawing is reduced, thereby protecting the user from getting tired in using the device.

Operation of resetting, when a character is written outside a handwriting display area, the handwriting display area to a size including a position at which the character is written will now be described with reference to a flow chart of FIGS. 47 and 48.

Figure 47:
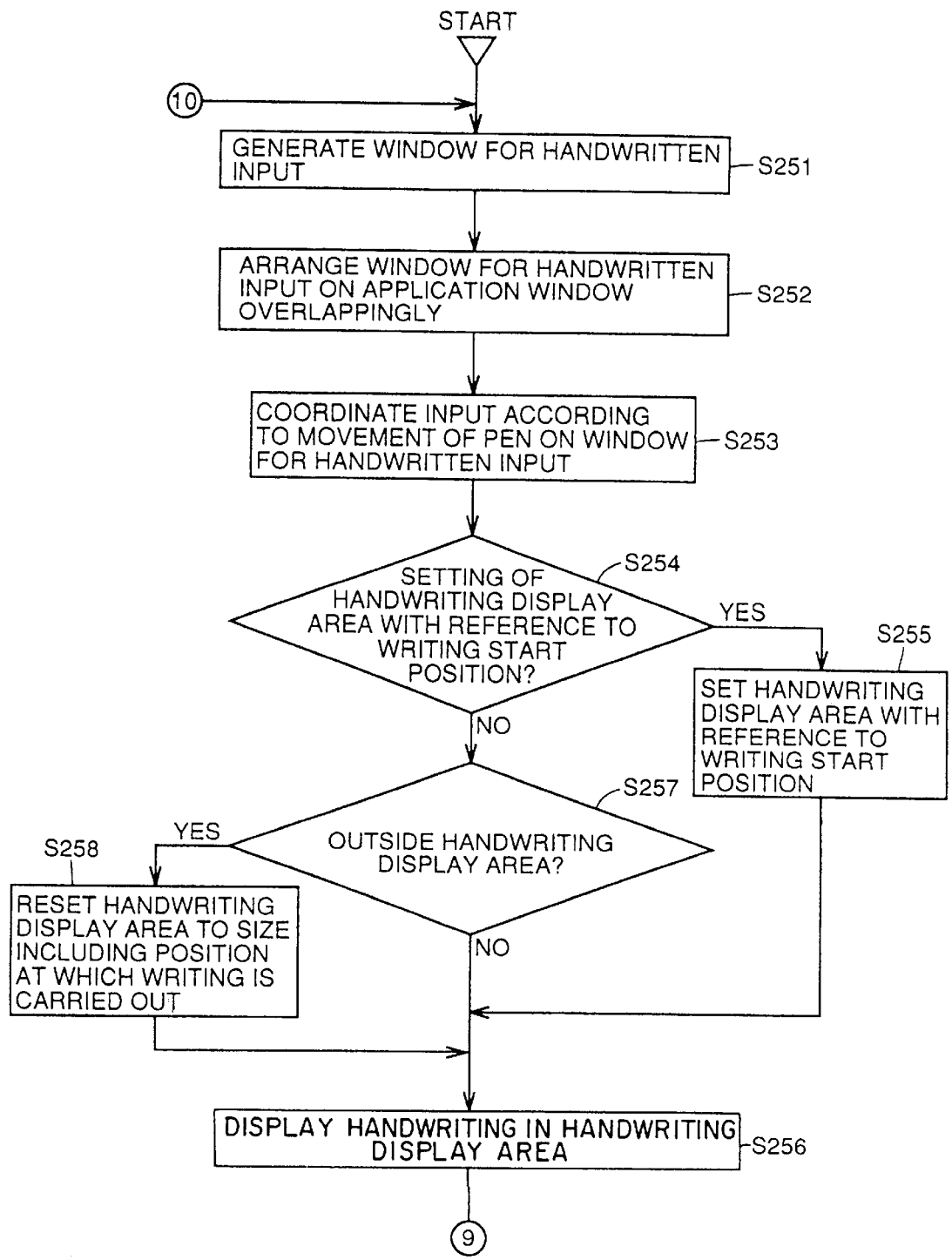
FIGS. 47 and 48 are flow charts for explaining resetting operation of a handwriting display area.

Since steps S251 to S256 shown in FIG. 47 are the same as steps S151 to S156 shown in FIG. 34, the detailed description thereof will not be repeated. Only the difference will be described.

Referring to FIG. 47, when it is determined that a handwriting display area is not set based on a writing start position at step S254, it is determined whether or not a writing position is outside the handwriting display area. When it is outside the handwriting display area, the procedure goes to step S258, and otherwise, goes to step S256 and continues the processing thereafter.

When it is determined that it is outside the handwriting display area, the handwriting display area is reset to a size including a position at which a character is written at step S258. After resetting, the procedure goes to step S256, and continues the processing thereafter.

Figure 48:
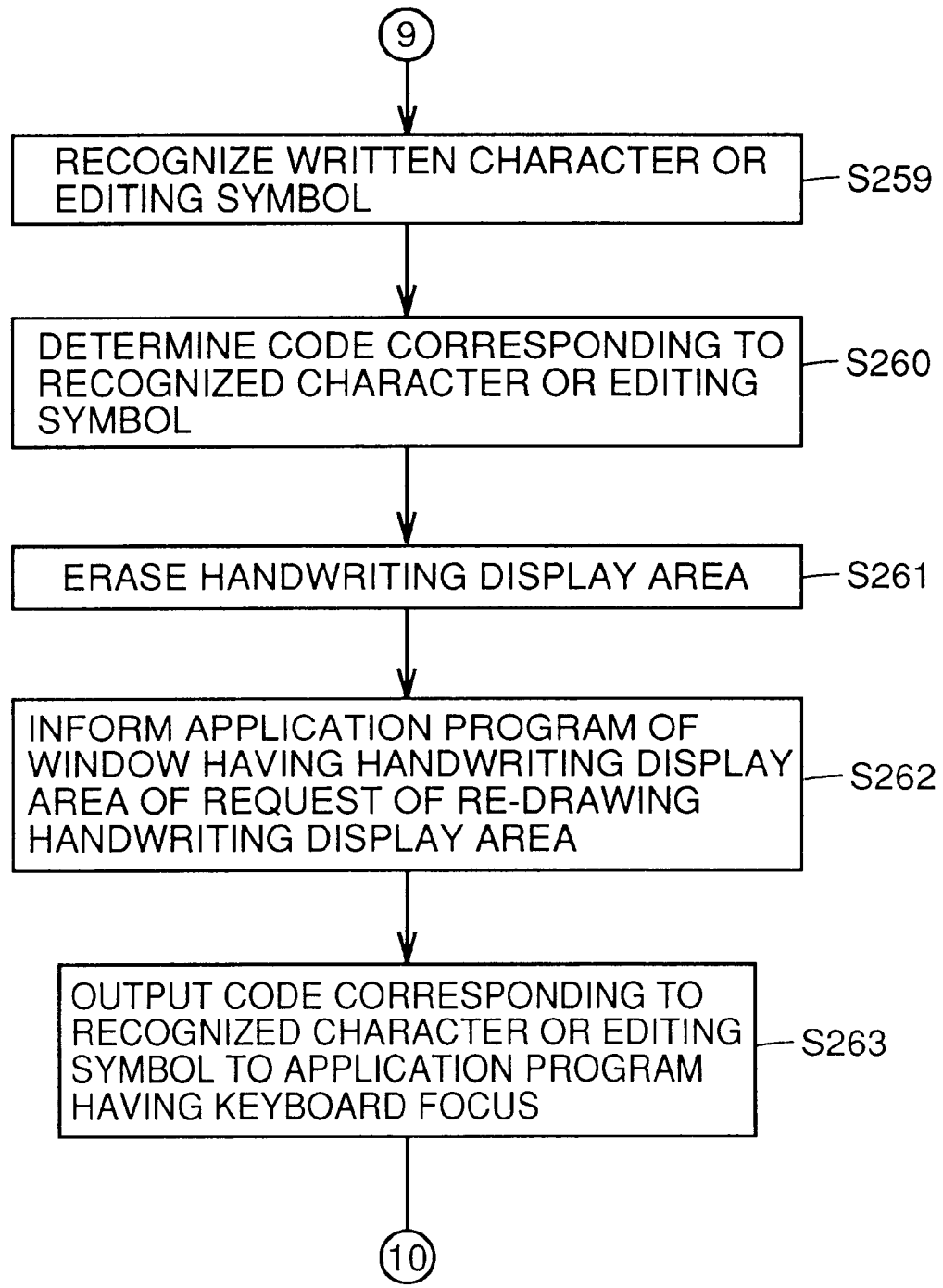

After the processing of step S256 is completed, the procedure goes to step S259 shown in FIG. 48. Since steps S259 to S263 shown in FIG. 48 are the same as steps S237 to S241 shown in FIG. 46, the detailed description thereof will not be repeated.

By the above described operation, even if the size of the handwriting display area is limited in advance to an area of several characters, when a character is written outside the handwriting display area, the handwriting display area can be reset to a size including the writing position. Therefore, a problem is avoided that a handwriting is not displayed because of too small a handwriting display area, improving the operation performance.

Description will now be given of operation of allowing, when the size of an application window displayed by an application program having a keyboard focus is smaller than a prescribed size, writing of a character or an editing symbol at an arbitrary position of a parent window of the application window with reference to a flow chart of FIG. 49.

Figure 49:
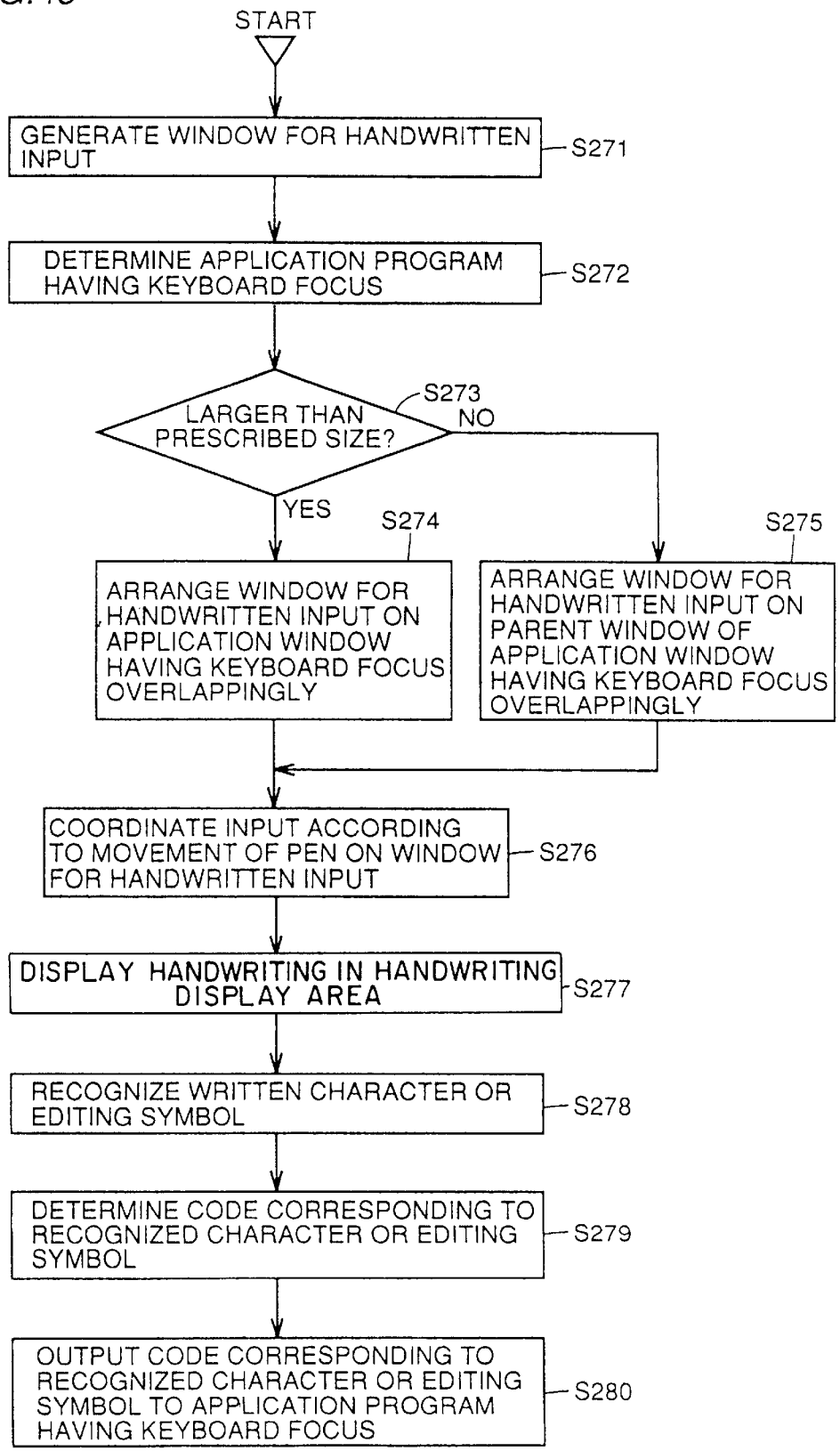
FIG. 49 is a flow chart for explaining operation for changing a window for handwritten input to a parent window according to this embodiment.

Referring to FIG. 49, first at step S271, a window for handwritten input is generated. Here, the window for handwritten input is a permeable window, which corresponds to the above described window Iwn.

Then, at step S272, an application program having a keyboard focus is determined. Then, at step S273, it is determined whether or not the application window having a keyboard focus is larger than a prescribed size. When it is larger than the prescribed size, the procedure goes to step S274, and when it is smaller than the prescribed size, the procedure goes to step S275.

When the application window is larger than the prescribed size, the window for handwritten input is arranged on the application window having a keyboard focus overlappingly. Here, the application window corresponds to the above described window ARap.

On the other hand, when the application window is smaller than the prescribed size, the window for handwritten input is arranged on a parent window of the application window having a keyboard focus overlappingly at step S275. Here, the application window corresponds to the above described window ARap, and the parent window corresponds to the above described window WN.

Since steps S276 to S281 thereafter are the same as steps S175 to S179 shown in FIGS. 36 and 37, the description thereof will not be repeated.

By the above described operation, when writing is carried out on the application window of the application program, and the screen of the application window of the application program having a keyboard focus is smaller than the prescribed size, writing can be carried out at an arbitrary position of the parent window of the application window. Therefore, even if the size of a window accepting input and editing is small and it is difficult to write a character or an editing symbol in this small window, the character or the editing symbol can be written in a parent window (window displayed by the same application program) including the window. Therefore, writing operation is not limited by the size of the window.

Operation of recognizing a written character, once displaying the recognized character at a writing position, and then erasing the character will now be described with reference to a flow chart of FIG. 50.

Figure 50:
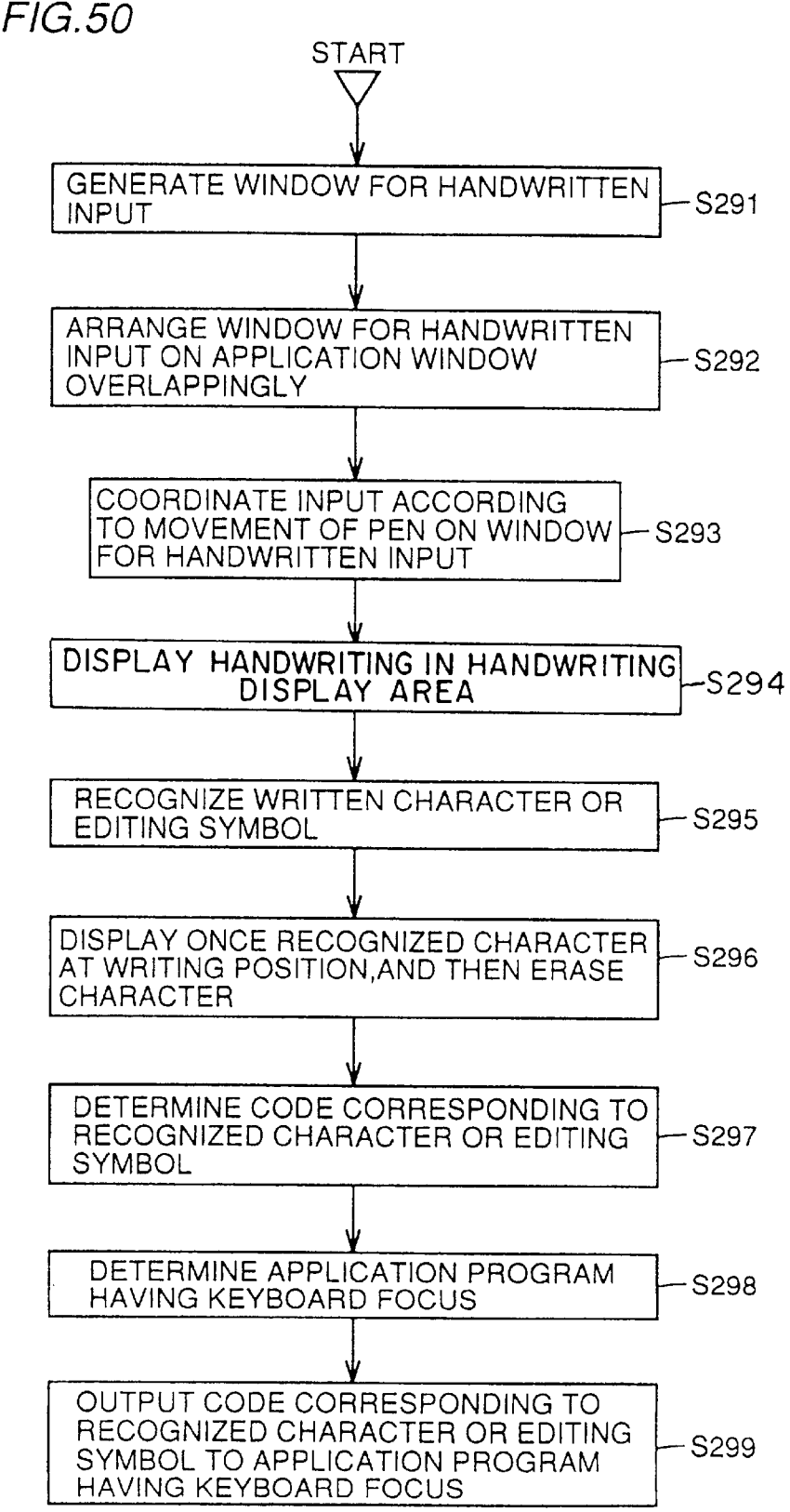
FIG. 50 is a flow chart for explaining display operation of a written character or the like according to this embodiment.

Since steps S291 to S295 shown in FIG. 50 are the same as steps S161 to S164 and S166 shown in FIG. 35, the description thereof will not be repeated. After the processing at step S295 is completed, a recognized character is once displayed at a writing position, and then erased at step S296.

Since steps S297 to S299 thereafter are the same as steps S167 to S169 shown in FIG. 35, the description thereof will not be repeated.

By the above processing, since an input character is once displayed at the writing position at the time of recognition, the result of recognition can be easily confirmed.

Operation of determining, when a character or editing symbol is input at a position distant by a prescribed distance or more from a position at which the character or editing symbol is written, end of the writing operation will now be described with reference to a flow chart of FIGS. 51 and 52.

Figure 51:
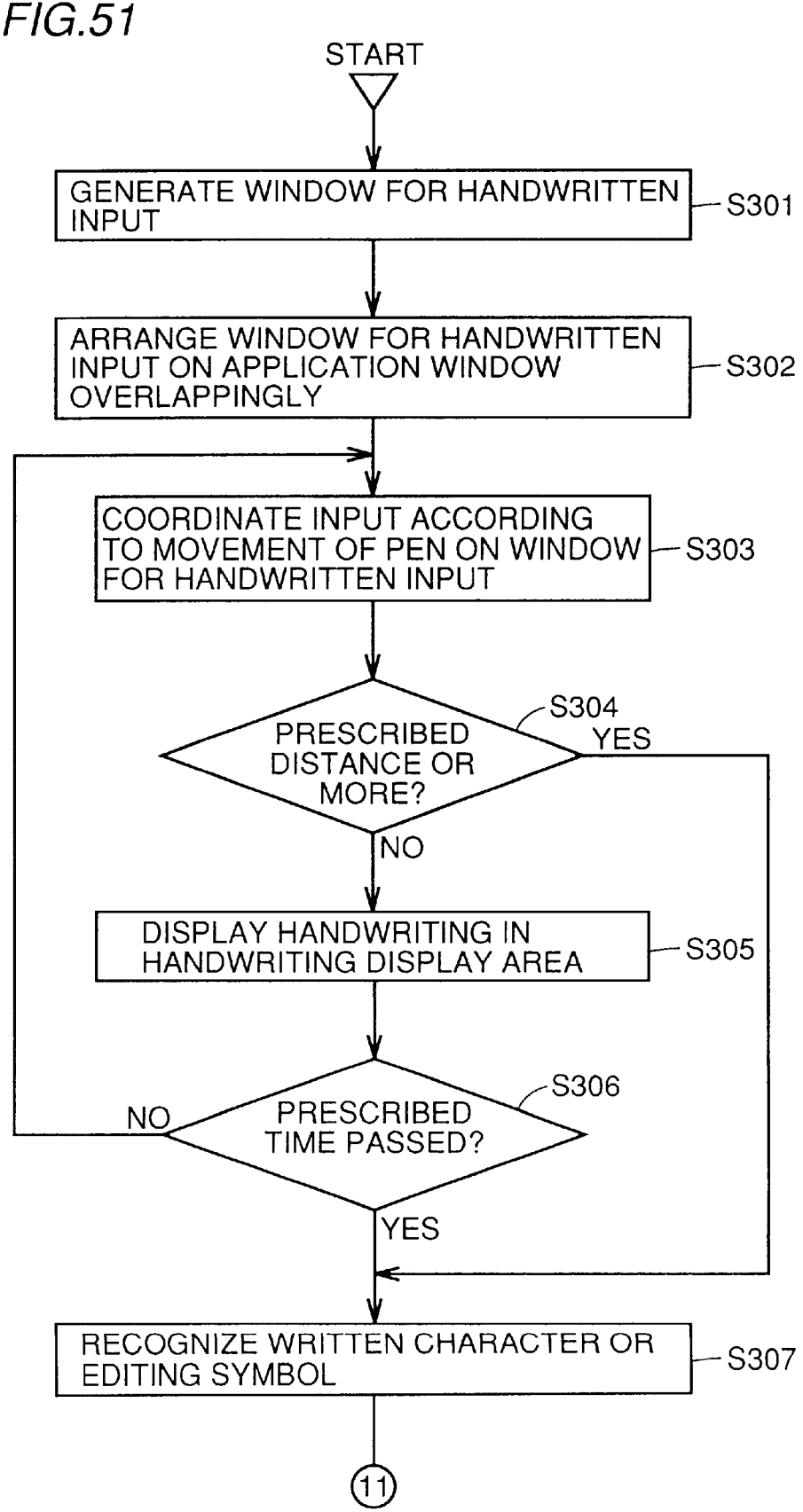
FIGS. 51 and 52 are flow charts for explaining operation for determining completion of writing operation according to this embodiment.
Figure 52:
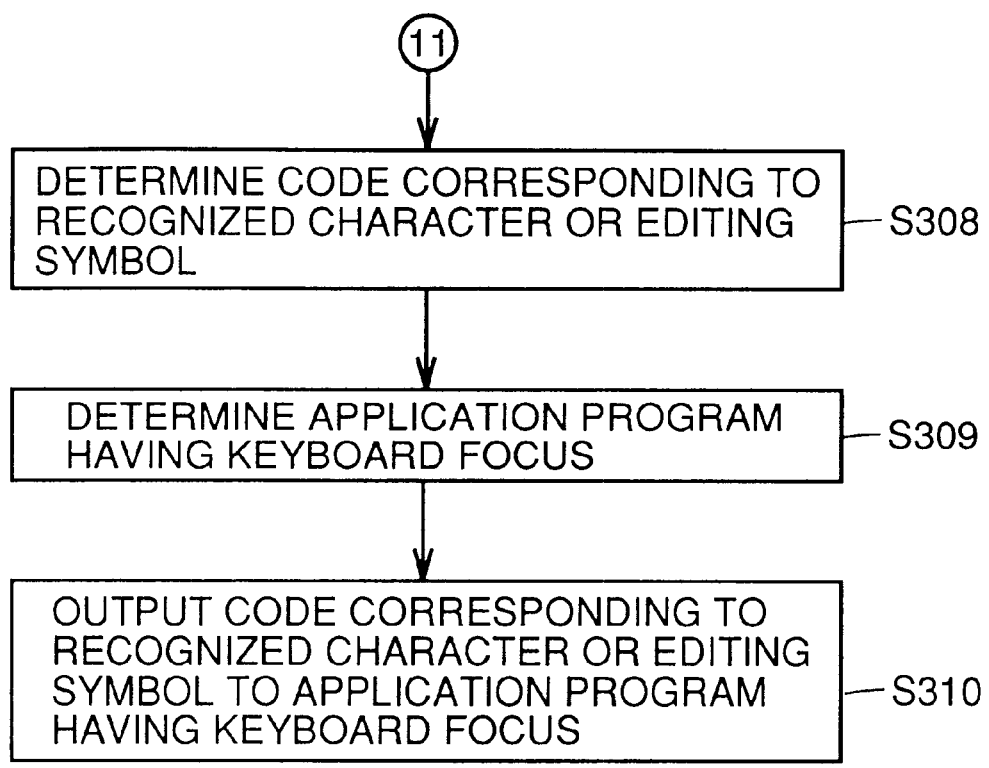

Steps S301 to S303, S305, and S307 to S310 shown in FIGS. 51 and 52 are the same as steps S291 to S295 and steps S297 to S299 shown in FIG. 50. Therefore, the detailed description thereof will not be repeated. Steps S304 and S306 which indicate different processing will be described.

After step S303, it is determined whether or not coordinate input is distant from a position at which a character or an editing symbol is written by a prescribed distance or more is determined at step S304. When it is distant, the procedure goes to step S307, and when it is not distant, the procedure goes to step S305.

After the processing of step S305 is completed, it is determined whether or not a prescribed time has passed at step S306. If the prescribed time has passed, the procedure goes to step S307, and continues the processing thereafter.

By the above described processing, when a position at which a character or an editing symbol is written is distant from coordinate input by a prescribed distance or more, it is determined that writing operation is completed, and the character or editing symbol is recognized immediately. Therefore, as compared to instruction of end of writing operation by detecting no other operation for a prescribed time, responsiveness of display of the recognition result after writing is significantly improved. Further, as compared to instruction of end of writing by instructing a specific menu, an operation position can be arbitrarily determined on the display screen. Therefore, the degree of freedom of operation is increased, and operation is facilitated.

Note that a system program for handwritten input is included in FEP in this embodiment. However, this program may be included in OS.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A handwritten character input device recognizing a handwritten character and outputting a code corresponding to the recognized handwritten character to a prescribed application program, comprising:

input means for inputting a handwritten character;

display means for displaying a first window displayed by said application program on a prescribed display screen; and setting means for setting a second window in the whole area of said display screen allowing input of a handwritten character at an area overlapping said first window with a display content of said first window viewable through said second window.

2. The handwritten character input device according to claim 1, wherein said application program includes an application program not adapted to handwritten input.

3. The handwritten character input device according to claim 1, wherein an area of said second window is matched with an area of said first window.

4. The handwritten character input device according to claim 1, wherein said second window includes a transparent window.

5. The handwritten character input device according to claim 1, wherein said second window includes a permeable window.

6. The handwritten character input device according to claim 1, wherein said second window displays a display content of said second window in an area overlapping with said first window.

7. The handwritten character input device according to claim 1, further comprising:

determining means for determining a setting position of a handwriting display area in which a handwriting is displayed according to a writing start position of the handwritten character written with said input means on said second window; and position setting means for setting said handwriting display area at the position determined by said determining means.

8. A handwritten character input device recognizing a handwritten character and outputting a code corresponding to the recognized handwritten character to a prescribed application program of a plurality of application programs, comprising:

pen type input means for inputting a handwritten character;

identifying means for identifying the handwritten character written with said input means and generating a code corresponding to the identified handwritten character;

output means for outputting the code generated by said identifying means to a certain application program having a keyboard focus of said plurality of application programs;

fixing means for fixing a keyboard focus to a prescribed application program of said plurality of application programs; and setting means for setting a window allowing input of a handwritten character in an entire display area of a prescribed display screen.

9. A handwritten character input device recognizing a handwritten character and outputting a code corresponding to the recognized handwritten character to a prescribed application program of a plurality of application programs, comprising:

pen type input means for inputting a handwritten character;

identifying means for identifying the handwritten character written with said input means and generating a code corresponding to the identified handwritten character;

output means for outputting the code generated by said identifying means to a certain application program having a keyboard focus of said plurality of application programs;

display means for displaying a first window displayed by said application program having a keyboard focus on a prescribed display screen; and setting means for setting a second window allowing input of a handwritten character in an entire display area of said first window with a display content of said first window viewable through said second window.

10. A handwritten character input device recognizing a handwritten character and outputting a code corresponding to the recognized handwritten character to a prescribed application program of a plurality of application programs, comprising:

pen type input means for inputting a handwritten character;

identifying means for identifying the handwritten character written with said input means and generating a code corresponding to the identified handwritten character;

output means for outputting the code generated by said identifying means to a certain application program having a keyboard focus of said plurality of application programs, wherein said handwritten character input device includes two operation modes of a mouse emulation mode for outputting handwriting coordinate data to an application program in the same form as that of mouse input and a character/editing symbol input mode for outputting a code corresponding to said handwriting coordinate data, and wherein said handwritten character input device further comprises selecting means for selecting, after an editing symbol is input by said pen type input means in said character/editing symbol input mode, an unlock mode changing said operation mode to said mouse emulation mode.

11. A handwritten character input device recognizing a handwritten character and outputting a code corresponding to the recognized handwritten character to a prescribed application program of a plurality of application programs, comprising:

pen type input means for inputting a handwritten character;

identifying means for identifying the handwritten character written with said input means and generating a code corresponding to the identified handwritten character;

output means for outputting the code generated by said identifying means to a certain application program having a keyboard focus of said plurality of application programs; wherein said handwritten character input device includes two operation modes of a mouse emulation mode for outputting handwriting coordinate data to an application program in the same form as that of mouse input and a character/editing symbol input mode for outputting a code corresponding to said handwriting coordinate data, and said handwritten character input device further comprises moving means for moving, when a mouse cursor movement editing symbol instructing movement of a mouse cursor is input by said pen-type input means in said character/editing symbol input mode, said mouse cursor to a position to which said mouse cursor movement editing symbol is written, and moving a keyboard focus to an application program displaying a window having the moved mouse cursor.

12. A handwritten character input device recognizing a handwritten character and outputting a code corresponding to the recognized handwritten character to a prescribed application program of a plurality of application programs, comprising:

pen type input means for inputting a handwritten character;

identifying means for identifying the handwritten character written with said input means and generating a code corresponding to the identified handwritten character;

output means for outputting the code generated by said identifying means to a certain application program having a keyboard focus of said plurality of application programs;

setting means for setting a position of a handwriting display area in which a handwriting is displayed according to a writing start position of a handwritten character input by said pen type input means;

re-drawing request means for erasing said handwriting display area after identifying the handwritten character by said identifying means and requesting re-drawing of a display area to an application program displaying a window including said handwriting display area; and changing means for changing, when the handwritten character input by said input means is written outside said handwriting display area, a size of said handwrting display area so as to include a position at which the handwritten character is written.

13. A handwritten character input device recognizing a handwritten character and outputting a code corresponding to the recognized handwritten character to a prescribed application program of a plurality of application programs, comprising:

pen type input means for inputting a handwritten character;

identifying means for identifying the handwritten character written with said input means and generating a code corresponding to the identified handwritten character;

output means for outputting the code generated by said identifying means to a certain application program having a keyboard focus of said plurality of application programs; and setting means for setting, when a window displayed by an application program having a keyboard focus is smaller than a prescribed size, a window allowing input of a handwritten character at an arbitrary position of a parent window of said window displayed by the application program.

14. A handwritten character input device recognizing a handwritten character and outputting a code corresponding to the recognized handwritten character to a prescribed application program of a plurality of application programs, comprising:

pen type input means for inputting a handwritten character;

identifying means for identifying the handwritten character written with said input means and generating a code corresponding to the identified handwritten character;

output means for outputting the code generated by said identifying means to a certain application program having a keyboard focus of said plurality of application programs; and determining means for determining, when coordinate input is detected at a position distant from a position of the handwritten character input by said input means by at least a prescribed distance, that a writing operation is completed.

15. A computer program product comprising:

a computer readable medium having computer readable program code means embodied therein for causing a computer to implement, as a front end processor, functions of recognizing a handwritten character and outputting a code corresponding to the recognized handwritten character to a prescribed application program not adapted to handwritten input, said computer readable program code means in said computer program product including input means for inputting a handwritten character, display means for displaying a first window displayed by said application program on a prescribed display screen, and setting means for setting a second window allowing input of a handwritten character at an area overlapping said first window with a display content of said first window viewable through said second window.

16. A computer program product comprising:

a computer readable medium having computer readable program code means embodied therein for causing a computer to implement, as a front end processor, functions of recognizing a handwritten character and outputting a code corresponding to the recognized handwritten character to a prescribed application program of a plurality of application programs not adapted to handwritten input, said computer readable program code means in said computer program product including input means for inputting a handwritten character, identifying means for identifying the handwritten character written with said input means and generating a code corresponding to the identified handwritten character, output means for outputting the code generated by said identifying means to a certain application program having a keyboard focus of said plurality of application programs, and setting means for setting a window allowing input of a handwritten character in an entire display area of a prescribed display screen.

17. A handwritten character input device, comprising:

pen type coordinate input means for inputting handwriting coordinate data;

display means formed integrally with said coordinate input means and having a prescribed display screen;

handwriting display means for displaying a handwriting at a writing position on said display screen using said handwriting coordinate data;

identifying means for identifying at least a character and an editing symbol from said handwriting coordinate data;

handwriting erasing means for erasing the handwriting displayed by said handwriting display means; and output means for outputting a code corresponding to the character when the character is identified by said identifying means to an application program having a keyboard focus and for outputting a code corresponding to the editing symbol when the editing symbol is identified by said identifying means to the application program, wherein, when the code corresponding to the editing symbol is output to the application program, said display means is responsive to the application program to affect said display screen in a manner other than displaying the editing symbol, and wherein, when the code corresponding to the editing symbol is output to the application program, said display means is responsive to the application program to change a location of a cursor or a pointer.

18. The handwritten character device of claim 17, wherein the code corresponding to the editing symbol corresponds to a return command code, and said display means changes the location of the cursor to a subsequent line of said display screen.

19. The handwritten character device of claim 17, wherein the code corresponding to the editing symbol corresponds to a coordinate associated with the editing symbol and the coordinate is output to the application program in a format of a mouse output.

* * * * *